(12) United States Patent
Lin et al.

(10) Patent No.: US 11,815,661 B2
(45) Date of Patent: Nov. 14, 2023

(54) IMAGING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Cheng-Chen Lin, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 531 days.

(21) Appl. No.: 16/915,949

(22) Filed: Jun. 29, 2020

(65) Prior Publication Data

US 2021/0278636 A1    Sep. 9, 2021

Related U.S. Application Data

(60) Provisional application No. 62/985,232, filed on Mar. 4, 2020.

(51) Int. Cl.
G02B 13/00    (2006.01)
G02B 9/64    (2006.01)

(52) U.S. Cl.
CPC ........... G02B 13/0045 (2013.01); G02B 9/64 (2013.01)

(58) Field of Classification Search
CPC .............................. G02B 13/0045; G02B 9/64
See application file for complete search history.

(56) References Cited

U.S. PATENT DOCUMENTS

| 4,726,666 | A | 2/1988 | Ota et al. |
| 7,656,593 | B2 | 2/2010 | Do |
| 8,014,083 | B2 | 9/2011 | Do |
| 2015/0070783 | A1* | 3/2015 | Hashimoto ............ G06T 5/002 |
| | | | 359/708 |
| 2017/0307858 | A1 | 10/2017 | Chen |
| 2019/0049705 | A1 | 2/2019 | Cook |
| 2020/0209593 | A1 | 7/2020 | Hirano |
| 2020/0209594 | A1 | 7/2020 | Hirano |
| 2020/0241243 | A1 | 7/2020 | Hirano |

(Continued)

FOREIGN PATENT DOCUMENTS

| CN | 101365975 A | 2/2009 |
| CN | 101553748 A | 10/2009 |

(Continued)

OTHER PUBLICATIONS

TW Office Action in Application No. 109110470 dated Mar. 5, 2021.

*Primary Examiner* — George G. King
(74) *Attorney, Agent, or Firm* — Maschoff Brennan

(57) ABSTRACT

An imaging optical lens assembly includes nine lens elements which are, in order from an object side to an image side along an optical path: a first lens element, a second lens element, a third lens element, a fourth lens element, a fifth lens element, a sixth lens element, a seventh lens element, an eighth lens element and a ninth lens element. Each of the nine lens elements has an object-side surface facing toward the object side and an image-side surface facing toward the image side. The first lens element has positive refractive power. The second lens element has negative refractive power. The image-side surface of the ninth lens element is concave in a paraxial region thereof and has at least one inflection point.

31 Claims, 36 Drawing Sheets

(56) References Cited

U.S. PATENT DOCUMENTS

| | | | |
|---|---|---|---|
| 2020/0271898 A1 | 8/2020 | Hirano | |
| 2020/0393652 A1 | 12/2020 | Kuo | |
| 2020/0393653 A1* | 12/2020 | Chen | G02B 13/0045 |
| 2021/0018724 A1 | 1/2021 | Hsu et al. | |
| 2021/0048629 A1 | 2/2021 | Kuo | |

FOREIGN PATENT DOCUMENTS

| | | |
|---|---|---|
| CN | 110716293 A | 1/2020 |
| JP | H11-52240 A | 2/1999 |
| JP | H11-64730 A | 3/1999 |
| JP | H11-119095 A | 4/1999 |
| TW | 201802518 A | 1/2018 |
| TW | 1684807 B | 2/2020 |

* cited by examiner

IMAGING OPTICAL LENS ASSEMBLY, IMAGE CAPTURING UNIT AND ELECTRONIC DEVICE

RELATED APPLICATIONS

This application claims priority to U.S. Provisional Application 62/985,232, filed on Mar. 4, 2020, which is incorporated by reference herein in its entirety.

BACKGROUND

Technical Field

The present disclosure relates to an imaging optical lens assembly, an image capturing unit and an electronic device, more particularly to an imaging optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical lens assembly includes nine lens elements. The nine lens elements are, in order from an object side to an image side along an optical path, a first lens element, a second lens element, a third lens element, a fourth lens element, a fifth lens element, a sixth lens element, a seventh lens element, an eighth lens element and a ninth lens element. Each of the nine lens elements has an object-side surface facing toward the object side and an image-side surface facing toward the image side.

The first lens element has positive refractive power. The second lens element has negative refractive power. The image-side surface of the ninth lens element is concave in a paraxial region thereof and has at least one inflection point.

When a curvature radius of the object-side surface of the ninth lens element is R17, and a curvature radius of the image-side surface of the ninth lens element is R18, the following condition is satisfied:

$$-0.90 < (R17+R18)/(R17-R18) < 2.50.$$

According to another aspect of the present disclosure, an imaging optical lens assembly includes nine lens elements. The nine lens elements are, in order from an object side to an image side along an optical path, a first lens element, a second lens element, a third lens element, a fourth lens element, a fifth lens element, a sixth lens element, a seventh lens element, an eighth lens element and a ninth lens element. Each of the nine lens elements has an object-side surface facing toward the object side and an image-side surface facing toward the image side.

The first lens element has positive refractive power. The ninth lens element has negative refractive power. The object-side surface of the ninth lens element is concave in a paraxial region thereof. The image-side surface of the ninth lens element is concave in a paraxial region thereof and has at least one inflection point.

When a curvature radius of the object-side surface of the ninth lens element is R17, a curvature radius of the image-side surface of the ninth lens element is R18, a maximum value among central thicknesses of all lens elements of the imaging optical lens assembly is CTmax, and a minimum value among central thicknesses of all lens elements of the imaging optical lens assembly is CTmin, the following conditions are satisfied:

$$-0.90 < (R17+R18)/(R17-R18) < 0.55; \text{ and}$$

$$1.0 < CTmax/CTmin < 6.0.$$

According to another aspect of the present disclosure, an imaging optical lens assembly includes three lens groups. The three lens groups are, in order from an object side to an image side along an optical path, a first lens group, a second lens group and a third lens group. The first lens group includes three lens elements. The second lens group includes three lens elements. The third lens group includes three lens elements. Each of all lens elements of the imaging optical lens assembly has an object-side surface facing toward the object side and an image-side surface facing toward the image side.

The three lens elements of the first lens group include a first lens element located closest to the object side and a second lens element located adjacent to the first lens element on an image side of the first lens element. The first lens element has positive refractive power. The second lens element has negative refractive power. At least one lens surface of at least one lens element of the second lens group has at least one inflection point. The three lens elements of the third lens group include a last lens element located closest to the image side. The image-side surface of the last lens element is concave in a paraxial region thereof and has at least one inflection point.

There is an air lens element located between the last lens element and a lens element located adjacent to the last lens element on an object side of the last lens element. When a curvature radius of an object-side surface of the air lens element is Rao, and a curvature radius of an image-side surface of the air lens element is Rai, the following condition is satisfied:

$$-25.0 < (Rao+Rai)/(Rao-Rai) < 10.0.$$

According to another aspect of the present disclosure, an image capturing unit includes one of the aforementioned imaging optical lens assemblies and an image sensor, wherein the image sensor is disposed on an image surface of the imaging optical lens assembly and has 40 million pixels or more.

According to another aspect of the present disclosure, an electronic device includes at least two image capturing units, wherein the at least two image capturing units are disposed on the same side of the electronic device. The at least two image capturing units include a first image capturing unit and a second image capturing unit. The first image capturing unit includes one of the aforementioned imaging optical lens assemblies and an image sensor, wherein the image sensor is disposed on an image surface of the imaging optical lens assembly. The second image capturing unit includes an optical lens assembly and an image sensor, wherein the image sensor is disposed on an image surface of the optical lens assembly. A maximum field of view of the first image capturing unit and a maximum field of view of the second image capturing unit differ by at least 20 degrees.

According to another aspect of the present disclosure, an electronic device includes at least three image capturing units. The at least three image capturing units include a first image capturing unit, a second image capturing unit and a third image capturing unit.

The first image capturing unit includes a first optical lens assembly and an image sensor, wherein the image sensor is disposed on an image surface of the first optical lens assembly. The first optical lens assembly includes three lens groups. The three lens groups are, in order from an object side to an image side along an optical path, a first lens group, a second lens group and a third lens group. The first lens group includes at least two lens elements. The second lens group includes at least three lens elements. At least one lens surface of at least one lens element of the second lens group is aspheric. The third lens group includes at least three lens elements. At least one lens surface of at least one lens element of the third lens group has at least one inflection point. At least four lens elements of the first optical lens assembly are made of plastic material. Half of a maximum field of view of the first optical lens assembly is larger than 35 degrees.

When an Abbe number of one lens element of the first optical lens assembly is Vi, a refractive index of the said lens element is Ni, and a minimum value of Vi/Ni is (Vi/Ni)min, at least one lens element of the first optical lens assembly satisfies the following condition:

$$7.0<(Vi/Ni)min<11.80.$$

The second image capturing unit includes a second optical lens assembly and an image sensor, wherein the image sensor is disposed on an image surface of the second optical lens assembly. Half of a maximum field of view of the second optical lens assembly is smaller than 25 degrees.

The third image capturing unit includes a third optical lens assembly, a reflector and an image sensor, wherein the image sensor is disposed on an image surface of the third optical lens assembly. Half of a maximum field of view of the third optical lens assembly is smaller than 18 degrees.

BRIEF DESCRIPTION OF THE DRAWINGS

The disclosure can be better understood by reading the following detailed description of the embodiments, with reference made to the accompanying drawings as follows.

DETAILED DESCRIPTION

An imaging optical lens assembly can include three lens groups. The three lens groups are, in order from an object side to an image side along an optical path, a first lens group, a second lens group and a third lens group. The first lens group can include at least two lens elements, the second lens group can include at least three lens elements, and the third lens group can include at least three lens elements. Each of all lens elements of the imaging optical lens assembly has an object-side surface facing toward the object side and an image-side surface facing toward the image side.

At least four lens elements of the imaging optical lens assembly can be made of plastic material. Therefore, it is favorable for effectively reducing manufacturing costs and increasing manufacturing speed so as to increase productivity and design flexibility, which is favorable for correcting off-axis aberrations. Moreover, all lens elements of the third lens group can be made of plastic material. Half of a maximum field of view of the imaging optical lens assembly can be larger than 35 degrees. Therefore, it is favorable for satisfying public's needs so as to increase market acceptance.

The object-side surface of each of at least two lens elements of the first lens group can be convex in a paraxial region thereof, and the image-side surface of each of the at least two lens elements of the first lens group can be concave in a paraxial region thereof. Therefore, it is favorable for correcting coma and astigmatism.

At least one of the object-side surface and the image-side surface of at least one lens element of the second lens group can be aspheric. Therefore, it is favorable for effectively correcting system aberrations and controlling the overall thickness of the second lens group so as to prevent having an overly large size.

Figure 31:
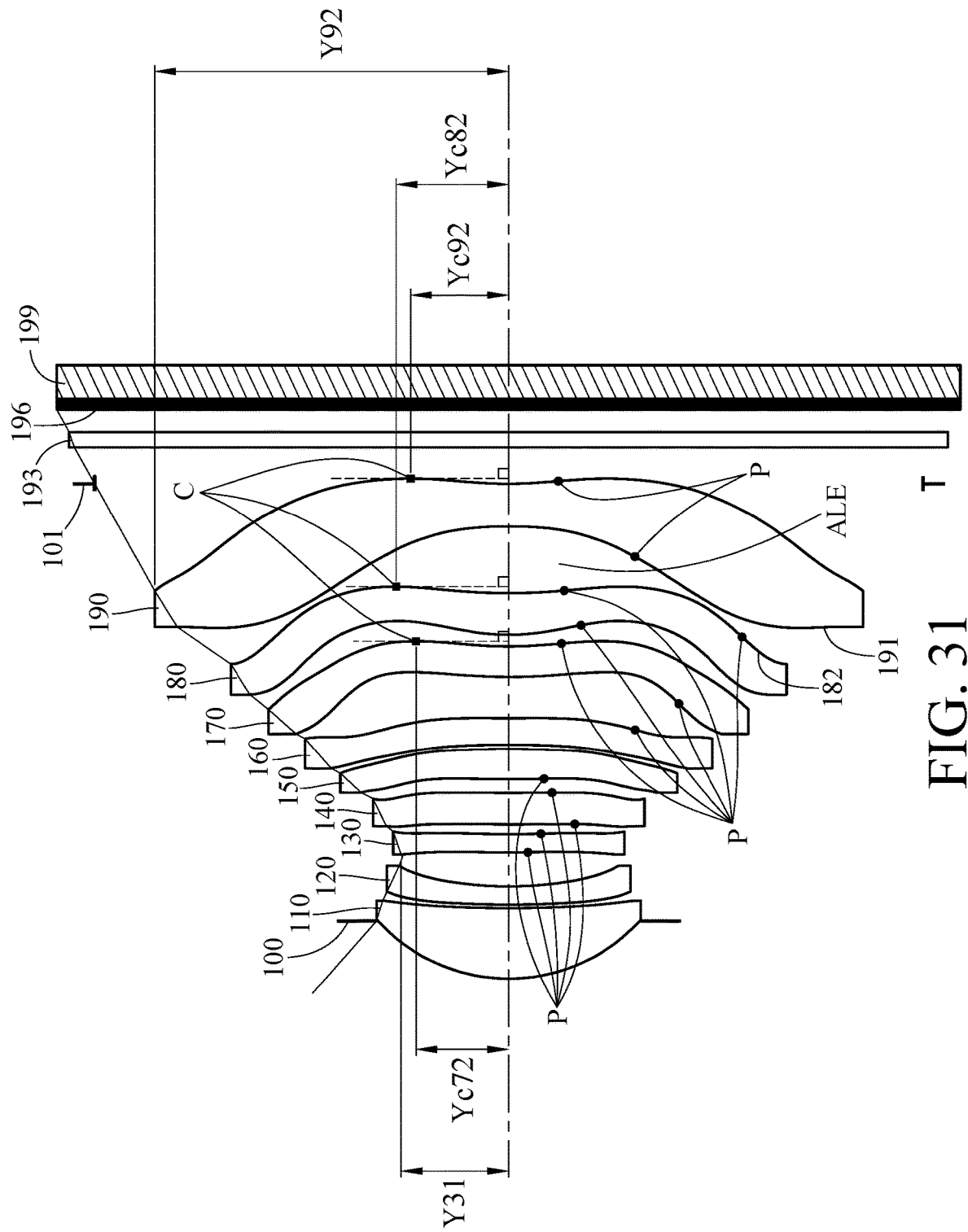
FIG. 31 shows a schematic view of Y31, Y92, Yc72, Yc82, Yc92, several inflection points and critical points of the lens elements and an air lens element ALE according to the 1st embodiment of the present disclosure.

The object-side surface of each of at least two lens elements of the third lens group can be convex in a paraxial region thereof, and the image-side surface of each of the at least two lens elements of the third lens group can be concave in a paraxial region thereof. Therefore, it is favorable for increasing the effective radii of lens elements on the image side of the imaging optical lens assembly so as to correct aberrations on the periphery of the image surface. At least two lens surfaces of all lens elements of the third lens group can have at least one critical point in an off-axis region thereof, wherein the at least two lens surfaces can be provided on the same lens element or on different lens elements. Therefore, it is favorable for correcting off-axis aberrations and field curvature. Please refer to FIG. 31, which shows a schematic view of critical points C of the seventh lens element 170, the eighth lens element 180 and the ninth lens element 190 in off-axis regions thereof according to the 1st embodiment of the present disclosure. The critical points on the image-side surface of the seventh lens element, the image-side surface of the eighth lens element and the image-side surface of the ninth lens element in FIG. 31 are only exemplary. The other lens surfaces of all lens elements may also have one or more non-axial critical points.

It is noted that among all lens elements of the imaging optical lens assembly, a lens element located closest to the object side is defined as an object-side lens element, and a lens element located closest to the image side is defined as an image-side lens element or a last lens element. In one aspect of the present disclosure, the first lens group can include three lens elements, the second lens group can include three lens elements, and the third lens group can include three lens elements. That is, there can be a total of nine lens elements in the imaging optical lens assembly. The nine lens elements are, in order from the object side to the image side along the optical path, a first lens element, a second lens element, a third lens element, a fourth lens element, a fifth lens element, a sixth lens element, a seventh lens element, an eighth lens element and a ninth lens element. In other words, the first lens element located closest to the object side is the object-side lens element, and the ninth lens element located closest to the image side is the image-side lens element or the last lens element. Furthermore, each of the nine lens elements has the object-side surface facing toward the object side and the image-side surface facing toward the image side.

The first lens element can have positive refractive power. Therefore, it is favorable for providing significant light convergence so as to effectively reduce the size of the imaging optical lens assembly and thus meet the requirement of compactness. The object-side surface of the first lens element can be convex in a paraxial region thereof. Therefore, it is favorable for reducing the incident angle on the object-side surface of the first lens element so as to prevent total reflection.

The second lens element can have negative refractive power. Therefore, it is favorable for correcting aberrations generated by the first lens element so as to correct spherical and chromatic aberrations. The object-side surface of the second lens element can be convex in a paraxial region thereof, and the image-side surface of the second lens element can be concave in a paraxial region thereof. Therefore, it is favorable for effectively correcting aberrations generated by the first lens element so as to improve image quality.

The image-side surface of the third lens element can be concave in a paraxial region thereof. Therefore, it is favorable for balancing between the field of view and the size of the imaging optical lens assembly so as to meet product specifications.

The sixth lens element can have negative refractive power. Therefore, it is favorable for balancing the refractive power arrangement of the imaging optical lens assembly so as to achieve proper image quality.

The object-side surface of the seventh lens element can be convex in a paraxial region thereof, and the image-side surface of the seventh lens element can be concave in a paraxial region thereof. Therefore, it is favorable for controlling light rays in both tangential and sagittal directions so as to correct astigmatism.

The eighth lens element can have positive refractive power. Therefore, it is favorable for obtaining a balance with the refractive power of the ninth lens element so as to correct overall aberrations. The image-side surface of the eighth lens element can be concave in a paraxial region thereof. Therefore, it is favorable for reducing the back focal length so as to prevent the imaging optical lens assembly being overly large. In one aspect of the present disclosure, the object-side surface of the eighth lens element can be convex in a paraxial region thereof, and the image-side surface of the eighth lens element can be concave in the paraxial region thereof. Therefore, it is favorable for increasing effective radius of the eighth lens element so as to correct peripheral light rays.

The ninth lens element can have negative refractive power. Therefore, it is favorable for achieving compactness so as to become applicable to an electronic device of limited size. The image-side surface of the ninth lens element can be concave in a paraxial region thereof. Therefore, it is favorable for reducing the back focal length so as to satisfy the requirement of compactness. In one aspect of the present disclosure, the object-side surface of the ninth lens element can be concave in a paraxial region thereof, and the image-side surface of the ninth lens element can be concave in the paraxial region thereof. Therefore, it is favorable for maintaining good image quality at different object distances.

According to the present disclosure, among the first through the ninth lens elements, there is no additional physical lens element disposed between each two adjacent lens elements. However, there can be other types of optical elements such as an air lens element and a light-blocking element located between adjacent lens elements.

According to the present disclosure, at least one of the object-side surface and the image-side surface of each of at least three lens elements of the imaging optical lens assembly can have at least one inflection point. Therefore, it is favorable for correcting field curvature so as to provide the feature of compactness and flatten the Petzval surface. Moreover, at least one of the object-side surface and the image-side surface of at least one lens element of the second lens group can have at least one inflection point. Therefore, it is favorable for correcting aberrations at an off-axis field of view. Moreover, at least one of the object-side surface and the image-side surface of at least one lens element of the third lens group can have at least one inflection point. Therefore, it is favorable for correcting off-axis aberrations and reducing the size of the imaging optical lens assembly. Moreover, the image-side surface of the eighth lens element can have at least two inflection points. Therefore, it is favorable for adjusting light convergence at the off-axis field of view and improving peripheral image quality of close-up picture. Moreover, the image-side surface of the ninth lens element can have at least one inflection point. Therefore, it is favorable for correcting off-axis aberrations and reducing the size of the imaging optical lens assembly. Moreover, the image-side surface of the ninth lens element can have at least two inflection points. Therefore, it is favorable for adjusting light convergence at the off-axis field of view and improving peripheral image quality of close-up picture. Please refer to FIG. 31, which shows a schematic view of inflection points P of several lens elements according to the 1st embodiment of the present disclosure. The inflection points on the third through ninth lens elements 130-190 in FIG. 31 are only exemplary. The other lens elements may also have one or more inflection points.

When a curvature radius of the object-side surface of the ninth lens element is R17, and a curvature radius of the image-side surface of the ninth lens element is R18, the following condition can be satisfied: $-0.90<(R17+R18)/(R17-R18)<2.50$. Therefore, it is favorable for adjusting the lens shape of the ninth lens element so as to better control light passing through the image-side surface of the ninth lens element and improve image quality. Moreover, the following condition can also be satisfied: $-0.90<(R17+R18)/(R17-R18)<0.55$. Moreover, the following condition can also be satisfied: $-0.70<(R17+R18)/(R17-R18)<0.43$. Moreover, the following condition can also be satisfied: $-0.50<(R17+R18)/(R17-R18)<1.50$.

When a maximum value among central thicknesses of all lens elements of the imaging optical lens assembly is CTmax, and a minimum value among central thicknesses of all lens elements of the imaging optical lens assembly is CTmin, the following condition can be satisfied: $1.0<CTmax/CTmin<6.0$. Therefore, it is favorable for controlling the quality and stability in molding the lens elements. Moreover, the following condition can also be satisfied: $2.50<CTmax/CTmin<5.0$.

According to the present disclosure, there can be an air lens element located between the eighth lens element and the ninth lens element. It is noted that an air lens element is provided in a space between two adjacent physical lens elements, the air therebetween acts as the transmission medium, and two adjacent lens surfaces of the two adjacent physical lens elements act as refractive interfaces to converge light and correct periphery image. In the case of an air lens element provided on an object side of the last lens element, light beams in different fields of view can converge on the image side, thereby optimizing the focusing on the image surface. When a curvature radius of an object-side surface of the air lens element is Rao, and a curvature radius of an image-side surface of the air lens element is Rai, the following condition can be satisfied: $-25.0<(Rao+Rai)/(Rao-Rai)<10.0$. Therefore, it is favorable for optimizing imaging quality at different object distances. Moreover, the following condition can also be satisfied: $-15.0<(Rao+Rai)/(Rao-Rai)<0.50$. Moreover, the following condition can also be satisfied: $-1.50<(Rao+Rai)/(Rao-Rai)<0.50$. Please refer to FIG. 31, which shows a schematic view of the air lens element ALE located between the eighth lens element 180 and the ninth lens element 190 (i.e. between the image-side surface 182 of the eighth lens element 180 and the object-side surface 191 of the ninth lens element 190; or, on the object side of the ninth lens element 190) according to the 1st embodiment of the present disclosure.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, a refractive index of the i-th lens element is Ni, and a minimum value of Vi/Ni is (Vi/Ni)min, the following condition can be satisfied: $7.0<(Vi/Ni)min<11.80$, wherein i=1, 2, 3, 4, 5, 6, 7, 8 or 9. Therefore, it is favorable for adjusting images effectively so as to correct aberrations. Moreover, the following condition can also be satisfied: $9.0<(Vi/Ni)min<11.50$, wherein i=1, 2, 3, 4, 5, 6, 7, 8 or 9.

When the Abbe number of the sixth lens element is V6, the following condition can be satisfied: $10.0<V6<40.0$. Therefore, it is favorable for properly correcting chromatic aberration by the sixth lens element so as to prevent imaging position shifting caused by light of different wavelengths. Moreover, the following condition can also be satisfied: 30.0<V6<40.0.

When the Abbe number of the seventh lens element is V7, the following condition can be satisfied: 10.0<V7<40.0. Therefore, it is favorable for correcting chromatic aberration and balancing curvature radii of the sixth lens element, thereby improving image quality. Moreover, the following condition can also be satisfied: 30.0<V7<40.0.

When a focal length of the imaging optical lens assembly is f, and a focal length of the eighth lens element is f8, the following condition can be satisfied: 0.65<f/f8<1.50. Therefore, it is favorable for controlling light on the image side of the imaging optical lens assembly so as to achieve good image quality.

When the curvature radius of the object-side surface of the ninth lens element is R17, and the curvature radius of the image-side surface of the ninth lens element is R18, the following condition can be satisfied: 0.25<|R17/R18|<2.50. Therefore, it is favorable for arranging the curvature radii of the ninth lens element so as to balance the refraction capability thereof on the both object-side and image-side surfaces. Moreover, the following condition can also be satisfied: 0.80<|R17/R18|<2.0.

When an axial distance between the object-side surface of the first lens element and an image surface is TL, and a maximum image height of the imaging optical lens assembly (half of a diagonal length of an effective photosensitive area of an image sensor) is ImgH, the following condition can be satisfied: 0.50<TL/ImgH<1.55. Therefore, it is favorable for reducing the total track length of the imaging optical lens assembly while ensuring sufficient light receiving area so as to prevent vignetting generated at the image periphery. Moreover, the following condition can also be satisfied: 0.90<TL/ImgH<1.35.

When the maximum image height of the imaging optical lens assembly is ImgH, and an axial distance between the image-side surface of the ninth lens element and the image surface is BL, the following condition can be satisfied: 5.0<ImgH/BL<20.0. Therefore, it is favorable for effectively reducing the back focal length while having a large light receiving range.

When the focal length of the imaging optical lens assembly is f, and a focal length of the first lens element is f1, the following condition can be satisfied: 0.40<f/f1<3.80. Therefore, it is favorable for providing sufficient light convergence on the object side of the imaging optical lens assembly by the first lens element and preventing overly large aberrations caused by an overly large curvature radius. Moreover, the following condition can also be satisfied: 0.80<f/f1<1.80.

When a maximum effective radius of the object-side surface of the third lens element is Y31, and a maximum effective radius of the image-side surface of the ninth lens element is Y92, the following condition can be satisfied: 2.80<Y92/Y31<4.50. Therefore, it is favorable for effectively controlling the ratio of effective radii of lens elements so as to increase the field of view and the image height. Moreover, the following condition can also be satisfied: 3.0<Y92/Y31<4.0. Please refer to FIG. 31, which shows a schematic view of Y31 and Y92 according to the 1st embodiment of the present disclosure.

When the Abbe number of the first lens element is V1, the Abbe number of the second lens element is V2, and the Abbe number of the third lens element is V3, the following condition can be satisfied: 0.10<(V2+V3)/V1<0.90. Therefore, it is favorable for enhancing the density difference between the materials of lens elements on the object side and air and increasing light path control in limited space.

When an entrance pupil diameter of the imaging optical lens assembly is EPD, and the axial distance between the image-side surface of the ninth lens element and the image surface is BL, the following condition can be satisfied: 3.2<EPD/BL<18.0. Therefore, it is favorable for maintaining a proper back focal length for assembling in limited space while ensuring sufficient incident light in the imaging optical lens assembly so as to meet product specifications.

When a vertical distance between a non-axial critical point on the image-side surface of the seventh lens element and an optical axis is Yc72, and the focal length of the imaging optical lens assembly is f, the following condition can be satisfied: 0.02<Yc72/f<0.80. Therefore, it is favorable for correcting off-axis aberrations on the image side of the imaging optical lens assembly while reducing distortion and field curvature. Please refer to FIG. 31, which shows a schematic view of Yc72 according to the 1st embodiment of the present disclosure.

When a vertical distance between a non-axial critical point on the image-side surface of the eighth lens element and the optical axis is Yc82, and the focal length of the imaging optical lens assembly is f, the following condition can be satisfied: 0.02<Yc82/f<0.80. Therefore, it is favorable for providing good image quality at different object distances. Please refer to FIG. 31, which shows a schematic view of Yc82 according to the 1st embodiment of the present disclosure.

When a vertical distance between a non-axial critical point on the image-side surface of the ninth lens element and the optical axis is Yc92, and the focal length of the imaging optical lens assembly is f, the following condition can be satisfied: 0.02<Yc92/f<0.80. Therefore, it is favorable for effectively preventing distortion and maintaining brightness at the periphery area of the image surface. Please refer to FIG. 31, which shows a schematic view of Yc92 according to the 1st embodiment of the present disclosure.

Each of at least four lens elements of the imaging optical lens assembly can have the Abbe number smaller than 40.0. Therefore, it is favorable for ensuring sufficient light control of the material arrangement of lens elements so as to balance focus positions of different wavelengths, thereby preventing image overlaps.

When the axial distance between the image-side surface of the ninth lens element and the image surface is BL, and an axial distance between the object-side surface of the first lens element and the image-side surface of the ninth lens element is TD, the following condition can be satisfied: 0<BL/TD<0.25. Therefore, it is favorable for reducing the back focal length so as to control the total track length of the imaging optical lens assembly. Moreover, the following condition can also be satisfied: 0.03<BL/TD<0.18.

When the focal length of the imaging optical lens assembly is f, and the entrance pupil diameter of the imaging optical lens assembly is EPD, the following condition can be satisfied: 0.80<f/EPD<2.0. Therefore, it is favorable for effectively controlling the aperture diameter and the amount of incident light so as to increase image brightness. Moreover, the following condition can also be satisfied: 1.20<f/EPD<1.80.

When a minimum value among Abbe numbers of all lens elements of the imaging optical lens assembly is Vmin, the following condition can be satisfied: 8.0<Vmin<20.0. Therefore, it is favorable for controlling the light path and balancing light convergence of different wavelengths so as to correct chromatic aberration. Moreover, the following condition can also be satisfied: 5.0<Vmin<19.0.

When a sum of axial distances between each of all adjacent lens elements of the imaging optical lens assembly is ΣAT, the axial distance between the second lens element and the third lens element is T23, and the axial distance between the eighth lens element and the ninth lens element is T89, the following condition can be satisfied: 1.20<ΣAT/(T23+T89)<2.50. Therefore, it is favorable for adjusting the space configuration so as to obtain a balance between the size and the assembly yield rate of the imaging optical lens assembly.

When a refractive power of the first lens element is P1, a refractive power of the second lens element is P2, a refractive power of the third lens element is P3, a refractive power of the fourth lens element is P4, a refractive power of the fifth lens element is P5, a refractive power of the sixth lens element is P6, a refractive power of the seventh lens element is P7, a refractive power of the eighth lens element is P8, and a refractive power of the ninth lens element is P9, the following condition can be satisfied: 0.10<(|P2|+| P3|+|P4|+| P5|+|P6|−|P7|)/(|P1|+|P8|+|P9|)<1.0. Therefore, it is favorable for balancing the refractive power of the object and image sides of the imaging optical lens assembly so as to increase symmetry and reduce sensitivity. The refractive power of one lens element is a ratio of the focal length of the imaging optical lens assembly to the focal length of the said lens element.

When a maximum value among refractive indices of all lens elements of the imaging optical lens assembly is Nmax, the following condition can be satisfied: 1.66<Nmax<1.78. Therefore, it is favorable for reducing the difficulty of manufacturing lens elements so as to improve the commercialization possibility of the imaging optical lens assembly. Moreover, the following condition can also be satisfied: 1.67<Nmax<1.72.

When the maximum image height of the imaging optical lens assembly is ImgH, the following condition can be satisfied: 4.50 [mm]<ImgH<10.0 [mm]. Therefore, it is favorable for providing a sufficient light receiving area and image brightness so as to meet the specifications. Moreover, the following condition can also be satisfied: 5.80 [mm]<ImgH<9.0 [mm].

When the axial distance between the object-side surface of the first lens element and the image-side surface of the ninth lens element is TD, the axial distance between the image-side surface of the ninth lens element and the image surface is BL, and the maximum image height of the imaging optical lens assembly is ImgH, the following condition can be satisfied: 0.05<(TD×BL)/(ImgH×ImgH)<0.30. Therefore, it is favorable for balancing between the axial and the off-axis dimensions of the imaging optical lens assembly so as to increase space utilization. Moreover, the following condition can also be satisfied: 0.16<(TD×BL)/(ImgH×ImgH)≤0.20.

When the axial distance between the object-side surface of the first lens element and the image surface is TL, the following condition can be satisfied: 4.0 [mm]<TL<10.0 [mm]. Therefore, it is favorable for controlling the total track length so as to expand product application range, thereby meeting market requirement nowadays.

When a sum of central thicknesses of all lens elements of the imaging optical lens assembly is ΣCT, and the sum of axial distances between each of all adjacent lens elements of the imaging optical lens assembly is ΣAT, the following condition can be satisfied: 1.20<ΣCT/ΣAT<2.0. Therefore, it is favorable for balancing between central thicknesses and axial distances so as to increase yield rates in assembling lens elements.

When the axial distance between the object-side surface of the first lens element and the image surface is TL, and the focal length of the imaging optical lens assembly is f, the following condition can be satisfied: 0.80<TL/f<1.30. Therefore, it is favorable for balancing the total track length and controlling the field of view so as to meet product application requirements.

According to the present disclosure, the imaging optical lens assembly further includes an aperture stop. When an axial distance between the aperture stop and the image surface is SL, and the axial distance between the object-side surface of the first lens element and the image surface is TL, the following condition can be satisfied: 0.73<SL/TL<0.95. Therefore, it is favorable for adjusting the position of the aperture stop so as to control the size of the imaging optical lens assembly.

When the focal length of the imaging optical lens assembly is f, a curvature radius of an object-side surface of one lens element of the imaging optical lens assembly is Ro, and a curvature radius of an image-side surface of the said lens element is Ri, at least one lens element of the imaging optical lens assembly can satisfy the following condition: |f/Ro|+|f/Ri|<0.50. Therefore, it is favorable for ensuring at least one correction lens element without an overly large curvature radius in the imaging optical lens assembly so as to balance aberrations generated by lens elements next to the said at least one correction lens element. Moreover, at least one lens element of the imaging optical lens assembly can also satisfy the following condition: |f/Ro|+|f/Ri|<0.20.

When the maximum image height of the imaging optical lens assembly is ImgH, and the maximum value among central thicknesses of all lens elements of the imaging optical lens assembly is CTmax, the following condition can be satisfied: 5.0<ImgH/CTmax<15.0. Therefore, it is favorable for controlling the ratio of thicknesses of lens elements to the total length of the imaging optical lens assembly so as to increase assembly quality and yield rate. Moreover, the following condition can also be satisfied: 6.0<ImgH/CTmax<10.0.

According to the present disclosure, the aforementioned features and conditions can be utilized in numerous combinations so as to achieve corresponding effects.

According to the present disclosure, the lens elements of the imaging optical lens assembly can be made of either glass or plastic material. When the lens elements are made of glass material, the refractive power distribution of the imaging optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the imaging optical lens assembly can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging optical lens assembly, based on the corresponding image sensor, can be flat or curved, especially a curved surface being concave facing towards the object side of the imaging optical lens assembly.

According to the present disclosure, an image correction unit, such as a field flattener, can be optionally disposed between the lens element closest to the image side of the imaging optical lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 32:
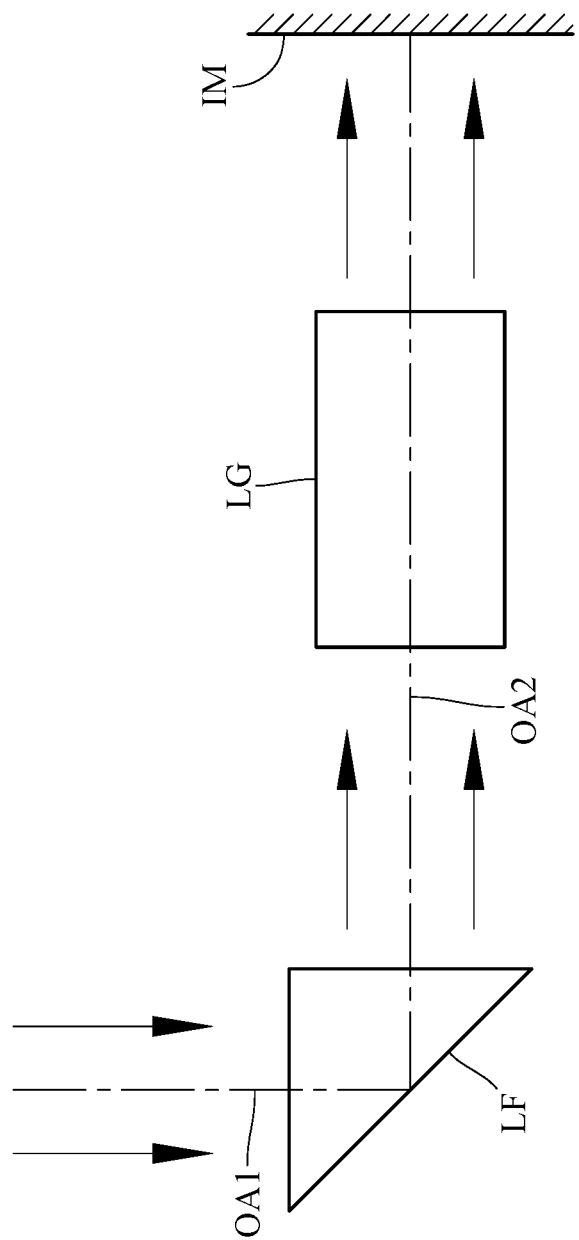
FIG. 32 shows a schematic view of a configuration of a reflector in an imaging optical lens assembly according to one embodiment of the present disclosure.
Figure 33:
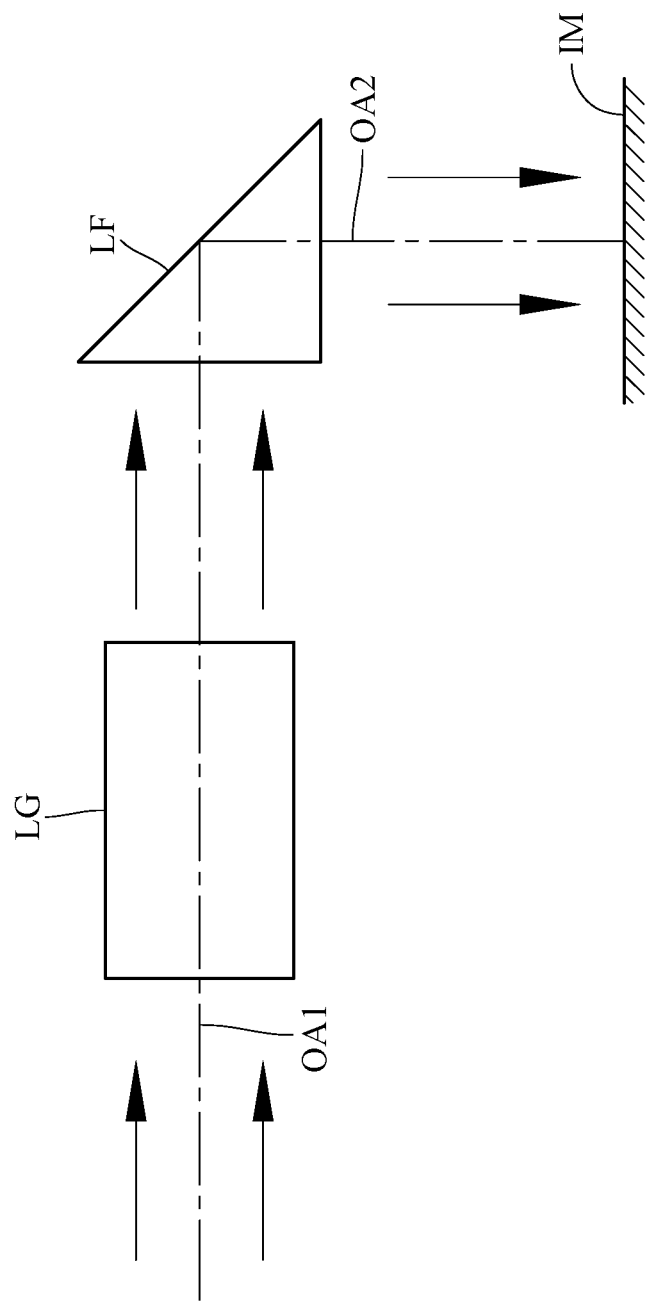
FIG. 33 shows a schematic view of another configuration of a reflector in an imaging optical lens assembly according to one embodiment of the present disclosure.
Figure 34:
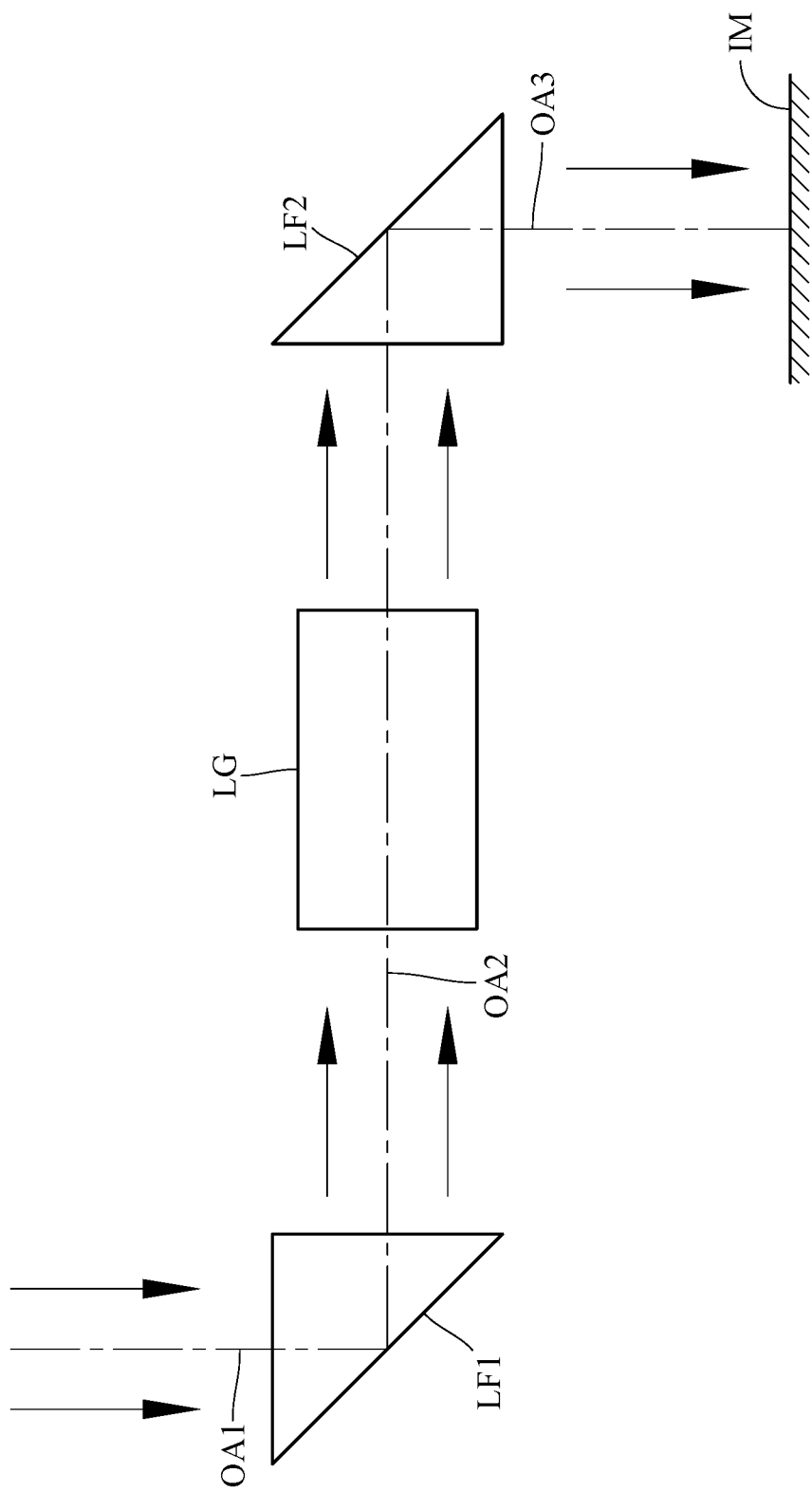
FIG. 34 shows a schematic view of a configuration of two reflectors in an imaging optical lens assembly according to one embodiment of the present disclosure.
Figure 35:
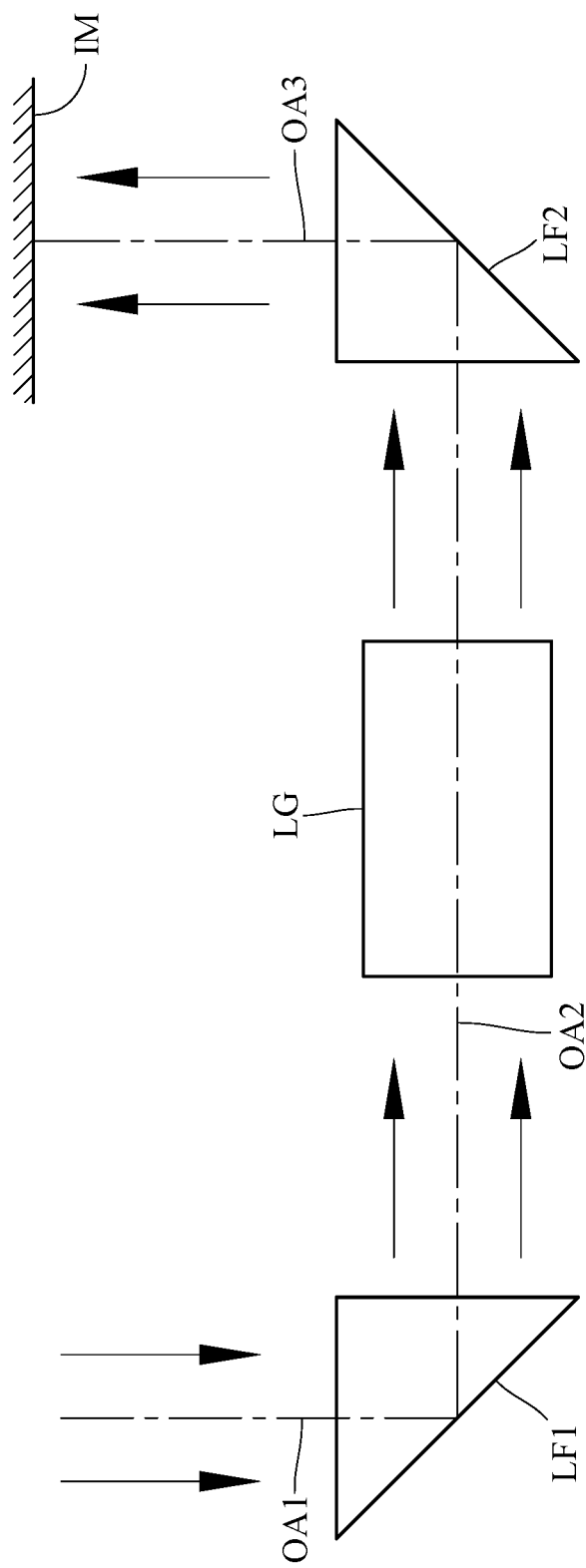
FIG. 35 shows a schematic view of another configuration of two reflectors in an imaging optical lens assembly according to one embodiment of the present disclosure.
Figure 36:
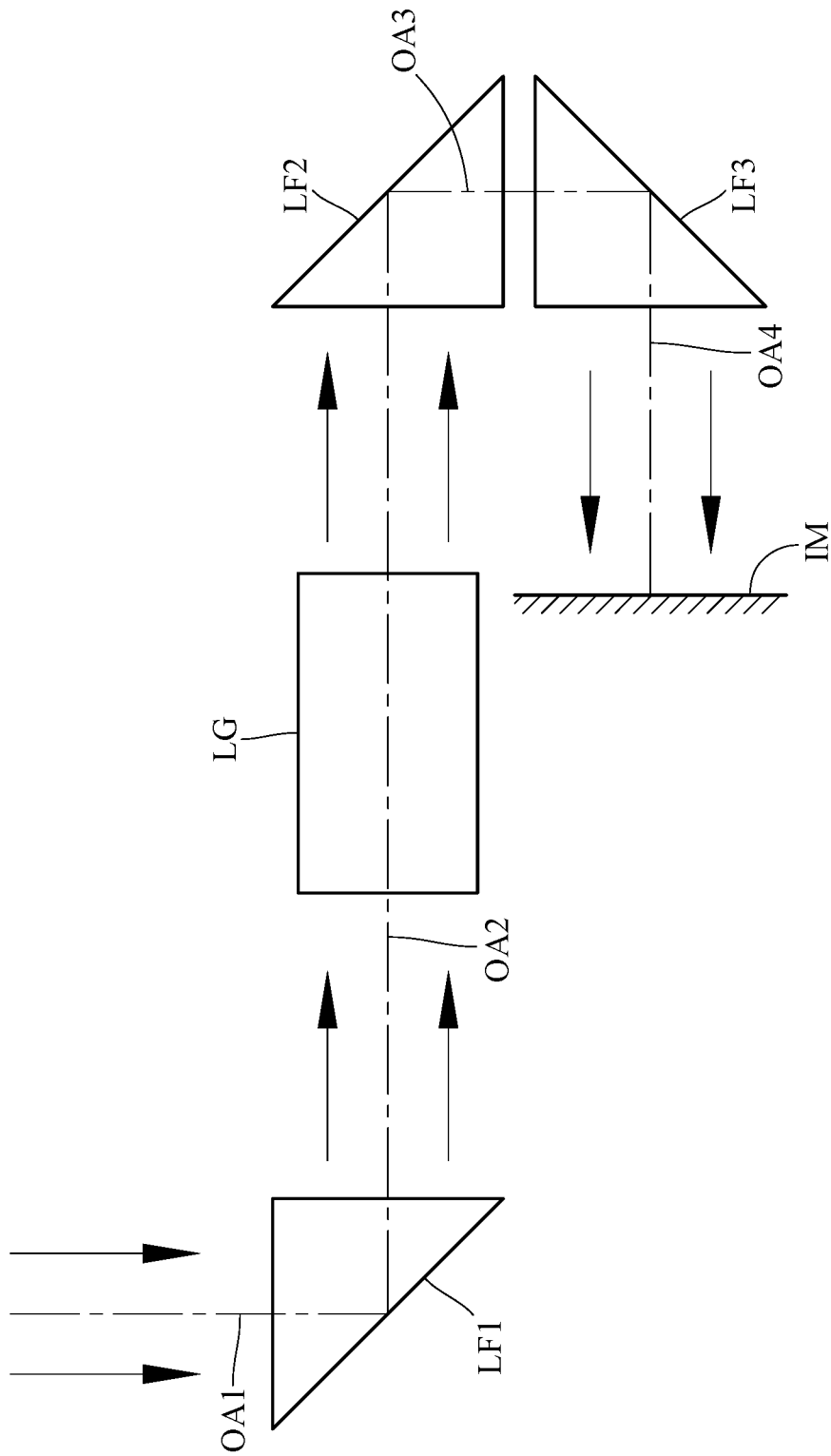
FIG. 36 shows a schematic view of a configuration of three reflectors in an imaging optical lens assembly according to one embodiment of the present disclosure.

According to the present disclosure, at least one reflector having light-folding function, such as a prism or a mirror, can be optionally disposed between an imaged object and the image surface on the imaging optical path, such that the imaging optical lens assembly can be more flexible in space arrangement, and therefore the dimensions of an electronic device is not restricted by the total track length of the imaging optical lens assembly. Specifically, please refer to FIG. 32 and FIG. 33. FIG. 32 shows a schematic view of a configuration of a reflector in an imaging optical lens assembly according to one embodiment of the present disclosure, and FIG. 33 shows a schematic view of another configuration of a reflector in an imaging optical lens assembly according to one embodiment of the present disclosure. In FIG. 32 and FIG. 33, the imaging optical lens assembly can have, in order from an imaged object (not shown in figures) to an image surface IM along an optical path, a first optical axis OA1, a reflector LF and a second optical axis OA2. The reflector LF can be disposed between the imaged object and a lens group LG of the imaging optical lens assembly as shown in FIG. 32 or disposed between a lens group LG of the imaging optical lens assembly and the image surface IM as shown in FIG. 33. Further, please refer to FIG. 34 and FIG. 35. FIG. 34 shows a schematic view of a configuration of two reflectors in an imaging optical lens assembly according to one embodiment of the present disclosure, and FIG. 35 shows a schematic view of another configuration of two reflectors in an imaging optical lens assembly according to one embodiment of the present disclosure. In FIG. 34 and FIG. 35, the imaging optical lens assembly can have, in order from an imaged object (not shown in figures) to an image surface IM along an optical path, a first optical axis OA1, a first reflector LF1, a second optical axis OA2, a second reflector LF2 and a third optical axis OA3. The first reflector LF1 is disposed between the imaged object and a lens group LG of the imaging optical lens assembly, the second reflector LF2 is disposed between the lens group LG of the imaging optical lens assembly and the image surface IM, and the travelling direction of light on the first optical axis OA1 can be the same direction as the travelling direction of light on the third optical axis OA3 as shown in FIG. 34 or can be opposite to the travelling direction of light on the third optical axis OA3 as shown in FIG. 35. Furthermore, please refer to FIG. 36, which shows a schematic view of a configuration of three reflectors in an imaging optical lens assembly according to one embodiment of the present disclosure. In FIG. 36, the imaging optical lens assembly can have, in order from an imaged object (not shown in figure) to an image surface IM along an optical path, a first optical axis OA1, a first reflector LF1, a second optical axis OA2, a second reflector LF2, a third optical axis OA3, a third reflector LF3 and a fourth optical axis OA4. The first reflector LF1 is disposed between the imaged object and a lens group LG of the imaging optical lens assembly, the second reflector LF2 and the reflector LF3 are disposed between the lens group LG of the imaging optical lens assembly and the image surface IM. The imaging optical lens assembly can be optionally provided with four or more reflectors, and the present disclosure is not limited to the type, amount and position of the reflectors of the embodiments disclosed in the aforementioned figures.

According to the present disclosure, the imaging optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens assembly and thereby provides a wider field of view for the same.

According to the present disclosure, the imaging optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
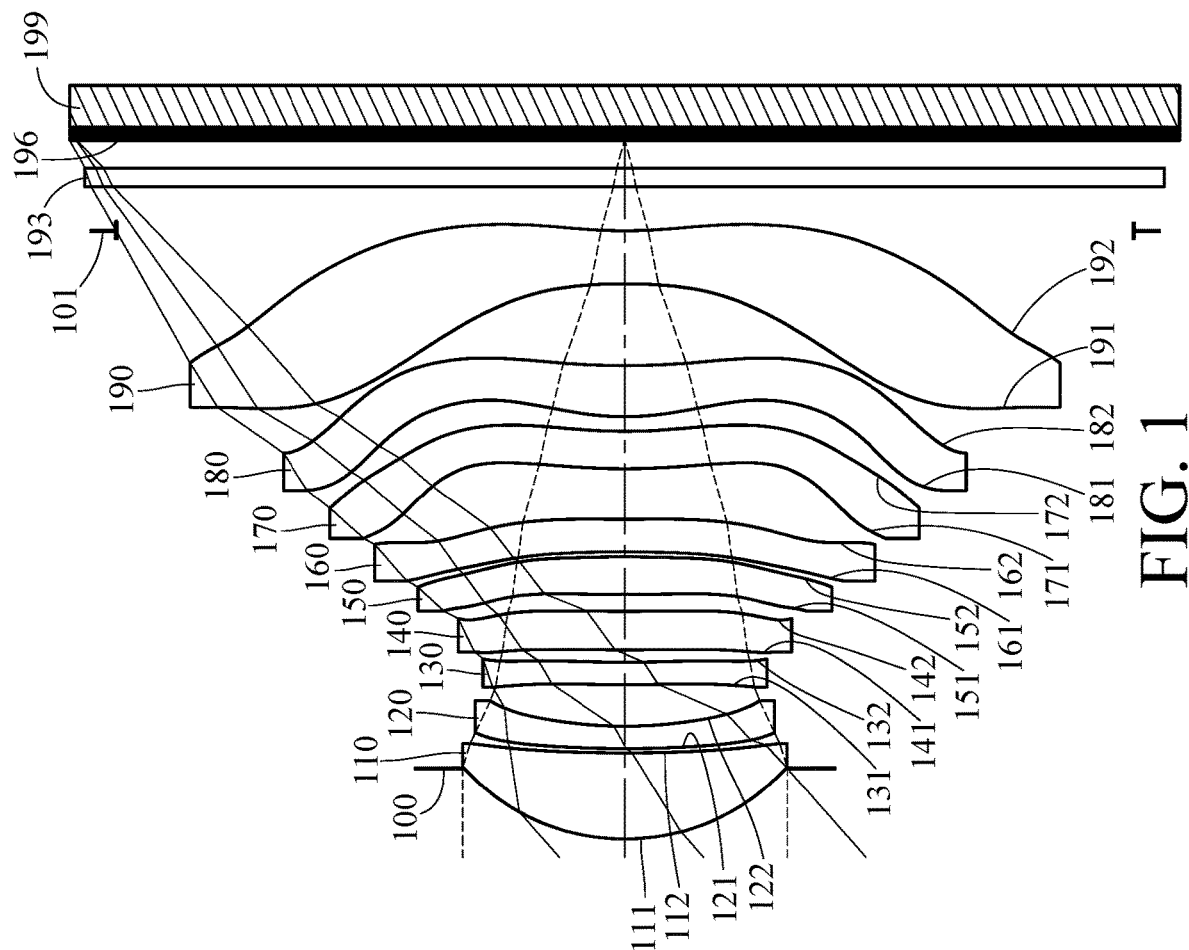
FIG. 1 is a schematic view of an image capturing unit according to the 1st embodiment of the present disclosure.
Figure 2:
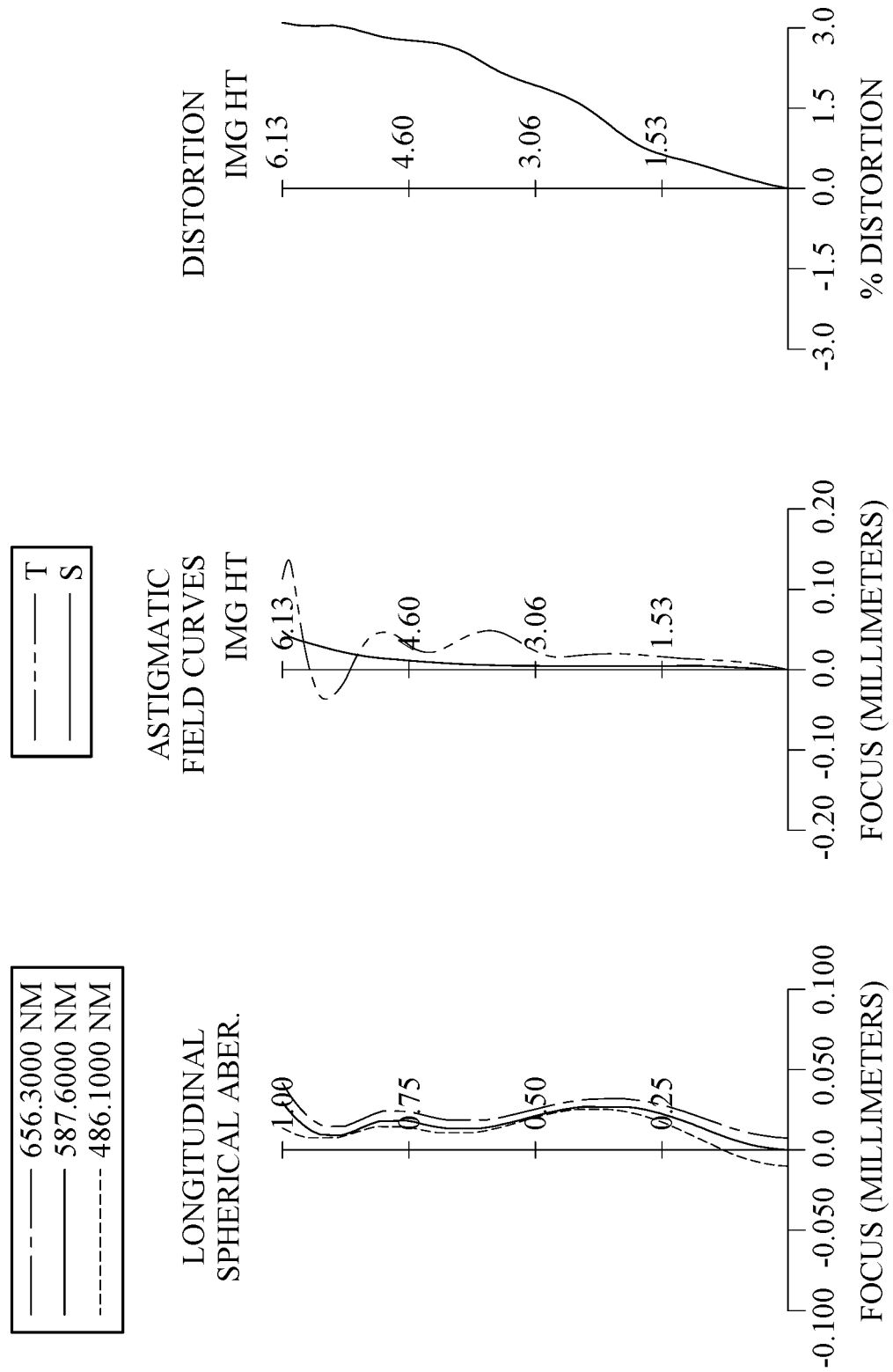
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging optical lens assembly (its reference numeral is omitted) of the present disclosure and an image sensor 199. The imaging optical lens assembly includes, in order from an object side to an image side along an optical path, an aperture stop 100, a first lens element 110, a second lens element 120, a third lens element 130, a fourth lens element 140, a fifth lens element 150, a sixth lens element 160, a seventh lens element 170, an eighth lens element 180, a ninth lens element 190, a stop 101, a filter 193 and an image surface 196. In addition, the imaging optical lens assembly has a configuration of a first lens group (the first lens element 110, the second lens element 120 and the third lens element 130), a second lens group (the fourth lens element 140, the fifth lens element 150 and the sixth lens element 160) and a third lens group (the seventh lens element 170, the eighth lens element 180 and the ninth lens element 190). The imaging optical lens assembly includes nine lens elements (110, 120, 130, 140, 150, 160, 170, 180 and 190) with no additional lens element disposed between each of the adjacent nine lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has one inflection point. The image-side surface 112 of the first lens element 110 has one inflection point.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has one inflection point. The image-side surface 132 of the third lens element 130 has two inflection points.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has two inflection points. The image-side surface 142 of the fourth lens element 140 has two inflection points.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has three inflection points. The image-side surface 152 of the fifth lens element 150 has two inflection points.

The sixth lens element 160 with negative refractive power has an object-side surface 161 being concave in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has two inflection points. The image-side surface 162 of the sixth lens element 160 has three inflection points.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has three inflection points. The image-side surface 172 of the seventh lens element 170 has two inflection points. The object-side surface 171 of the seventh lens element 170 has at least one critical point in an off-axis region thereof. The image-side surface 172 of the seventh lens element 170 has at least one critical point in an off-axis region thereof.

The eighth lens element 180 with positive refractive power has an object-side surface 181 being convex in a paraxial region thereof and an image-side surface 182 being concave in a paraxial region thereof. The eighth lens element 180 is made of plastic material and has the object-side surface 181 and the image-side surface 182 being both aspheric. The object-side surface 181 of the eighth lens element 180 has two inflection points. The image-side surface 182 of the eighth lens element 180 has two inflection points. The object-side surface 181 of the eighth lens element 180 has at least one critical point in an off-axis region thereof. The image-side surface 182 of the eighth lens element 180 has at least one critical point in an off-axis region thereof.

The ninth lens element 190 with negative refractive power has an object-side surface 191 being concave in a paraxial region thereof and an image-side surface 192 being concave in a paraxial region thereof. The ninth lens element 190 is made of plastic material and has the object-side surface 191 and the image-side surface 192 being both aspheric. The object-side surface 191 of the ninth lens element 190 has two inflection points. The image-side surface 192 of the ninth lens element 190 has three inflection points. The object-side surface 191 of the ninth lens element 190 has at least one critical point in an off-axis region thereof. The image-side surface 192 of the ninth lens element 190 has at least one critical point in an off-axis region thereof.

The filter 193 is made of glass material and located between the stop 101 and the image surface 196, and will not affect the focal length of the imaging optical lens assembly. The image sensor 199 is disposed on or near the image surface 196 of the imaging optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the imaging optical lens assembly of the image capturing unit according to the 1st embodiment, when a focal length of the imaging optical lens assembly is f, an f-number of the imaging optical lens assembly is Fno, and half of a maximum field of view of the imaging optical lens assembly is HFOV, these parameters have the following values: f=6.74 millimeters (mm), Fno=1.86, HFOV=41.3 degrees (deg.).

When an Abbe number of the sixth lens element 160 is V6, the following condition is satisfied: V6=39.5.

When an Abbe number of the seventh lens element 170 is V7, the following condition is satisfied: V7=36.1.

When a minimum value among Abbe numbers of all lens elements of the imaging optical lens assembly is Vmin, the following condition is satisfied: Vmin=18.4. In this embodiment, among the first through ninth lens elements (110-190), an Abbe number of the third lens element 130 is smaller than Abbe numbers of the other lens elements, and Vmin is equal to the Abbe number of the third lens element 130.

When a maximum value among refractive indices of all lens elements of the imaging optical lens assembly is Nmax, the following condition is satisfied: Nmax=1.686. In this embodiment, among the first through ninth lens elements (110-190), a refractive index of the third lens element 130 is larger than refractive indices of the other lens elements, and Nmax is equal to the refractive index of the third lens element 130.

When the Abbe number of the first lens element 110 is V1, the Abbe number of the second lens element 120 is V2, the Abbe number of the third lens element 130 is V3, the Abbe number of the fourth lens element 140 is V4, the Abbe number of the fifth lens element 150 is V5, the Abbe number of the sixth lens element 160 is V6, the Abbe number of the seventh lens element 170 is V7, the Abbe number of the eighth lens element 180 is V8, the Abbe number of the ninth lens element 190 is V9, an Abbe number of the i-th lens element is Vi, the refractive index of the first lens element 110 is N1, the refractive index of the second lens element 120 is N2, the refractive index of the third lens element 130 is N3, the refractive index of the fourth lens element 140 is N4, the refractive index of the fifth lens element 150 is N5, the refractive index of the sixth lens element 160 is N6, the refractive index of the seventh lens element 170 is N7, the refractive index of the eighth lens element 180 is N8, the refractive index of the ninth lens element 190 is N9, a refractive index of the i-th lens element is Ni, and a minimum value of Vi/Ni is (Vi/Ni)min, the following conditions are satisfied: V1/N1=36.31; V2/N2=11.94; V3/N3=10.91; V4/N4=36.27; V5/N5=36.27; V6/N6=25.30; V7/N7=22.91; V8/N8=35.53; V9/N9=36.27; and (Vi/Ni)min=10.91, wherein i=1, 2, 3, 4, 5, 6, 7, 8 or 9. In this embodiment, among the first through ninth lens elements (110-190), a ratio of the Abbe number to the refractive index of the third lens element 130 is smaller than ratios of Abbe numbers to refractive indices of the other lens elements, and (Vi/Ni)min is equal to the ratio of the Abbe number to the refractive index of the third lens element 130.

When the Abbe number of the first lens element 110 is V1, the Abbe number of the second lens element 120 is V2, and the Abbe number of the third lens element 130 is V3, the following condition is satisfied: (V2+V3)/V1=0.68.

When a maximum value among central thicknesses of all lens elements of the imaging optical lens assembly is CTmax, and a minimum value among central thicknesses of all lens elements of the imaging optical lens assembly is CTmin, the following condition is satisfied: CTmax/CTmin=3.87. In this embodiment, among the first through ninth lens elements (110-190), the central thickness of the first lens element 110 is larger than central thicknesses of the other lens elements, and CTmax is equal to the central thickness of the first lens element 110; the central thickness of the second lens element 120 is smaller than central thicknesses of the other lens elements, and CTmin is equal to the central thickness of the second lens element 120.

When a sum of central thicknesses of all lens elements of the imaging optical lens assembly is ΣCT, and a sum of axial distances between each of all adjacent lens elements of the imaging optical lens assembly is ΣAT, the following condition is satisfied: ΣCT/ΣAT=1.68. In this embodiment, ΣCT is a sum of central thicknesses of the first lens element 110, the second lens element 120, the third lens element 130, the fourth lens element 140, the fifth lens element 150, the sixth lens element 160, the seventh lens element 170, the eighth lens element 180 and the ninth lens element 190; ΣAT is a sum of axial distances between the first lens element 110 and the second lens element 120, the second lens element 120 and the third lens element 130, the third lens element 130 and the fourth lens element 140, the fourth lens element 140 and the fifth lens element 150, the fifth lens element 150 and the sixth lens element 160, the sixth lens element 160 and the seventh lens element 170, the seventh lens element 170 and the eighth lens element 180, and the eighth lens element 180 and the ninth lens element 190; an axial distance between two adjacent lens elements is a distance in a paraxial region between two adjacent lens surfaces of the two adjacent lens elements.

When the sum of axial distances between each of all adjacent lens elements of the imaging optical lens assembly is ΣAT, the axial distance between the second lens element and the third lens element is T23, and the axial distance between the eighth lens element and the ninth lens element is T89, the following condition is satisfied: ΣAT/(T23+T89)=1.84.

When a maximum image height of the imaging optical lens assembly is ImgH, and the maximum value among central thicknesses of all lens elements of the imaging optical lens assembly is CTmax, the following condition is satisfied: ImgH/CTmax=6.34.

There is an air lens element ALE located between the eighth lens element 180 and the ninth lens element 190. When a curvature radius of an object-side surface of the air lens element ALE is Rao, and a curvature radius of an image-side surface of the air lens element ALE is Rai, the following condition is satisfied: (Rao+Rai)/(Rao−Rai)=0.16.

When a curvature radius of the object-side surface 191 of the ninth lens element 190 is R17, and a curvature radius of the image-side surface 192 of the ninth lens element 190 is R18, the following condition is satisfied: (R17+R18)/(R17−R18)=0.17.

When the curvature radius of the object-side surface 191 of the ninth lens element 190 is R17, and the curvature radius of the image-side surface 192 of the ninth lens element 190 is R18, the following condition is satisfied: |R17/R18|=1.40.

When the focal length of the imaging optical lens assembly is f, and a focal length of the first lens element 110 is f1, the following condition is satisfied: f/f1=1.28.

When the focal length of the imaging optical lens assembly is f, and a focal length of the eighth lens element 180 is f8, the following condition is satisfied: f/f8=−0.90.

When a refractive power of the first lens element 110 is P1, a refractive power of the second lens element 120 is P2, a refractive power of the third lens element 130 is P3, a refractive power of the fourth lens element 140 is P4, a refractive power of the fifth lens element 150 is P5, a refractive power of the sixth lens element 160 is P6, a refractive power of the seventh lens element 170 is P7, a refractive power of the eighth lens element 180 is P8, and a refractive power of the ninth lens element 190 is P9, the following condition is satisfied: (|P2|+|P3|+|P4|+|P5|+|P6|+|P7|)/(|P1|+|P8|+|P9|)=0.49.

When an axial distance between the object-side surface 111 of the first lens element 110 and the image-side surface 192 of the ninth lens element 190 is TD, an axial distance between the image-side surface 192 of the ninth lens element 190 and the image surface 196 is BL, and the maximum image height of the imaging optical lens assembly is ImgH, the following condition is satisfied: (TD×BL)/(ImgH×ImgH)=0.18.

When the axial distance between the image-side surface 192 of the ninth lens element 190 and the image surface 196 is BL, and the axial distance between the object-side surface 111 of the first lens element 110 and the image-side surface 192 of the ninth lens element 190 is TD, the following condition is satisfied: BL/TD=0.15.

When the maximum image height of the imaging optical lens assembly is ImgH, and the axial distance between the image-side surface 192 of the ninth lens element 190 and the image surface 196 is BL, the following condition is satisfied: ImgH/BL=6.03.

When an entrance pupil diameter of the imaging optical lens assembly is EPD, and the axial distance between the image-side surface 192 of the ninth lens element 190 and the image surface 196 is BL, the following condition is satisfied: EPD/BL=3.56.

When the focal length of the imaging optical lens assembly is f, and the entrance pupil diameter of the imaging optical lens assembly is EPD, the following condition is satisfied: f/EPD=1.86.

When a maximum effective radius of the object-side surface 131 of the third lens element 130 is Y31, and a maximum effective radius of the image-side surface 192 of the ninth lens element 190 is Y92, the following condition is satisfied: Y92/Y31=3.29.

When a vertical distance between a non-axial critical point on the image-side surface 172 of the seventh lens element 172 and the optical axis is Yc72, and the focal length of the imaging optical lens assembly is f, the following condition is satisfied: Yc72/f=0.19.

When a vertical distance between a non-axial critical point on the image-side surface 182 of the eighth lens element 182 and the optical axis is Yc82, and the focal length of the imaging optical lens assembly is f, the following condition is satisfied: Yc82/f=0.23.

When a vertical distance between a non-axial critical point on the image-side surface 192 of the ninth lens element 192 and the optical axis is Yc92, and the focal length of the imaging optical lens assembly is f, the following condition is satisfied: Yc92/f=0.20.

When an axial distance between the aperture stop 100 and the image surface 196 is SL, and an axial distance between the object-side surface 111 of the first lens element 110 and the image surface 196 is TL, the following condition is satisfied: SL/TL=0.90.

When the axial distance between the object-side surface 111 of the first lens element 110 and the image surface 196 is TL, and the focal length of the imaging optical lens assembly is f, the following condition is satisfied: TL/f=1.16.

When the axial distance between the object-side surface 111 of the first lens element 110 and the image surface 196 is TL, and the maximum image height of the imaging optical lens assembly is ImgH, the following condition is satisfied: TL/ImgH=1.28.

When the maximum image height of the imaging optical lens assembly is ImgH, the following condition is satisfied: ImgH=6.13 [mm].

When the axial distance between the object-side surface 111 of the first lens element 110 and the image surface 196 is TL, the following condition is satisfied: TL=7.82 [mm].

When the focal length of the imaging optical lens assembly is f, a curvature radius of the object-side surface 111 of the first lens element 110 is R1, a curvature radius of the image-side surface 112 of the first lens element 110 is R2, a curvature radius of the object-side surface 121 of the second lens element 120 is R3, a curvature radius of the image-side surface 122 of the second lens element 120 is R4, a curvature radius of the object-side surface 131 of the third lens element 130 is R5, a curvature radius of the image-side surface 132 of the third lens element 130 is R6, a curvature radius of the object-side surface 141 of the fourth lens element 140 is R7, a curvature radius of the image-side surface 142 of the fourth lens element 140 is R8, a curvature radius of the object-side surface 151 of the fifth lens element 150 is R9, a curvature radius of the image-side surface 152 of the fifth lens element 150 is R10, a curvature radius of the object-side surface 161 of the sixth lens element 160 is R11, a curvature radius of the image-side surface 162 of the sixth lens element 160 is R12, a curvature radius of the object-side surface 171 of the seventh lens element 170 is R13, a curvature radius of the image-side surface 172 of the seventh lens element 170 is R14, a curvature radius of the object-side surface 181 of the eighth lens element 180 is R15, a curvature radius of the image-side surface 182 of the eighth lens element 180 is R16, the curvature radius of the object-side surface 191 of the ninth lens element 190 is R17, the curvature radius of the image-side surface 192 of the ninth lens element 190 is R18, a curvature radius of an object-side surface of one lens element of the imaging optical lens assembly is Ro, and a curvature radius of an image-side surface of the said lens element is Ri, the following conditions are satisfied: |f/R1|+|f/R2|=3.16; |f/R3|+|f/R4|=1.96; |f/R5|+|f/R6|=0.94; |f/R7|+|f/R8|=0.28; |f/R9|+|f/R10|=0.91; |f/R11|+|f/R12|=0.74; |f/R13|+|f/R14|=2.08; |f/R15|+|f/R16|=3.04; and |f/R17|+|f/R18|=2.39, wherein the fourth lens element 140 satisfies the following condition: |f/Ro|+|f/Ri|<0.50.

The detailed optical data of the 1st embodiment are shown in Table 1 and the aspheric surface data are shown in Table 2 below.

TABLE 1

1st Embodiment f = 6.74 mm, Fno = 1.86, HFOV = 41.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.795 | | | | |
| 2 | Lens 1 | 2.477 | (ASP) | 0.967 | Plastic | 1.545 | 56.1 | 5.28 |
| 3 | | 15.336 | (ASP) | 0.048 | | | | |
| 4 | Lens 2 | 11.387 | (ASP) | 0.250 | Plastic | 1.667 | 19.9 | −13.25 |
| 5 | | 4.929 | (ASP) | 0.465 | | | | |
| 6 | Lens 3 | 15.352 | (ASP) | 0.251 | Plastic | 1.686 | 18.4 | −170.00 |
| 7 | | 13.476 | (ASP) | 0.136 | | | | |
| 8 | Lens 4 | 58.824 | (ASP) | 0.431 | Plastic | 1.544 | 56.0 | −225.32 |
| 9 | | 39.646 | (ASP) | 0.190 | | | | |
| 10 | Lens 5 | 28.621 | (ASP) | 0.416 | Plastic | 1.544 | 56.0 | 13.70 |
| 11 | | −10.030 | (ASP) | 0.059 | | | | |
| 12 | Lens 6 | −11.871 | (ASP) | 0.364 | Plastic | 1.561 | 39.5 | −16.23 |
| 13 | | 39.635 | (ASP) | 0.568 | | | | |
| 14 | Lens 7 | 8.083 | (ASP) | 0.418 | Plastic | 1.576 | 36.1 | −30.15 |
| 15 | | 5.412 | (ASP) | 0.161 | | | | |
| 16 | Lens 8 | 2.906 | (ASP) | 0.572 | Plastic | 1.545 | 54.9 | 7.51 |
| 17 | | 9.317 | (ASP) | 0.914 | | | | |
| 18 | Lens 9 | −6.767 | (ASP) | 0.589 | Plastic | 1.544 | 56.0 | −5.10 |
| 19 | | 4.848 | (ASP) | 0.000 | | | | |
| 20 | Stop | Plano | | 0.500 | | | | |
| 21 | Filter | Plano | | 0.210 | Glass | 1.517 | 64.2 | — |
| 22 | | Plano | | 0.307 | | | | |
| 23 | Image | Plano | | — | | | | |

Note:
Reference wavelength is 587.6 nm (d-line).
An effective radius of the stop 101 (Surface 20) is 5.680 mm.

TABLE 2

Aspheric Coefficients

| Surface # | 2 | 3 | 4 | 5 | 6 |
|---|---|---|---|---|---|
| k = | −4.2810E−01 | −4.0775E+01 | 3.7009E+00 | 5.8698E+00 | −1.7279E+00 |
| A4 = | 3.2179E−03 | −1.6245E−02 | −2.6645E−02 | −1.8657E−02 | −3.0658E−02 |
| A6 = | 4.6981E−03 | 2.5987E−02 | 3.6413E−02 | 1.7851E−02 | 4.2636E−03 |
| A8 = | −4.8720E−03 | −1.7479E−02 | −2.3247E−02 | −1.3593E−02 | −6.7542E−03 |
| A10 = | 3.6955E−03 | 7.3494E−03 | 9.5179E−03 | 7.7586E−03 | 7.3252E−03 |
| A12 = | −1.5719E−03 | −1.9714E−03 | −2.1729E−03 | −2.4002E−03 | −2.4518E−03 |
| A14 = | 3.6368E−04 | 3.0700E−04 | 2.2437E−04 | 3.3867E−04 | 2.4525E−04 |
| A16 = | −3.6166E−05 | −2.1977E−05 | — | — | — |

| Surface # | 7 | 8 | 9 | 10 | 11 |
|---|---|---|---|---|---|
| k = | 3.0000E+01 | −1.0000E+00 | −9.9000E+01 | −8.3276E+00 | 5.4072E+00 |
| A4 = | −2.3319E−02 | 8.3522E−03 | 7.6391E−03 | 1.3449E−02 | 7.7271E−02 |
| A6 = | 2.5602E−03 | −3.1153E−02 | −4.7007E−02 | −4.8157E−02 | −9.5246E−02 |
| A8 = | −1.2482E−02 | 4.4914E−02 | 5.5061E−02 | 1.5709E−02 | 4.5420E−02 |
| A10 = | 1.3127E−02 | −5.5218E−02 | −4.2329E−02 | 1.3214E−02 | −1.0873E−02 |
| A12 = | −4.4232E−03 | 4.0957E−02 | 1.9835E−02 | −1.7087E−02 | 1.2986E−03 |
| A14 = | 5.2516E−04 | −1.7171E−02 | −5.6009E−03 | 8.4771E−03 | −4.8934E−05 |
| A16 = | — | 3.8295E−03 | 9.0903E−04 | −2.1872E−03 | −4.0118E−06 |
| A18 = | — | −3.5192E−04 | −6.5047E−05 | 2.8960E−04 | 3.2161E−07 |
| A20 = | — | — | — | −1.5652E−05 | — |

| Surface # | 12 | 13 | 14 | 15 | 16 |
|---|---|---|---|---|---|
| k = | 5.8924E+00 | 3.9714E+01 | −5.7235E+00 | −3.4068E+01 | −1.1831E+00 |
| A4 = | 2.8960E−02 | −4.0424E−02 | 2.7999E−03 | −5.2976E−03 | −4.1742E−02 |
| A6 = | −5.0801E−02 | 2.0325E−03 | −1.7867E−02 | −1.5238E−02 | 4.5861E−03 |
| A8 = | 3.0597E−02 | 9.6470E−03 | 8.7105E−03 | 8.7439E−03 | −4.0406E−03 |
| A10 = | −1.0024E−02 | −6.8345E−03 | −2.5956E−03 | −2.6974E−03 | 1.9527E−03 |

TABLE 2-continued

| Aspheric Coefficients | | | | | |
|---|---|---|---|---|---|
| A12 = | 2.1079E−03 | 2.2811E−03 | 3.8444E−04 | 4.7432E−04 | −4.4873E−04 |
| A14 = | −3.0165E−04 | −4.1445E−04 | −2.3609E−05 | −4.7053E−05 | 5.5757E−05 |
| A16 = | 2.7025E−05 | 4.1774E−05 | 1.4876E−07 | 2.4905E−06 | −3.8550E−06 |
| A18 = | −1.1045E−06 | −2.1863E−06 | 2.5299E−08 | −5.8697E−08 | 1.3984E−07 |
| A20 = | — | 4.5977E−08 | — | 2.7784E−10 | −2.0785E−09 |

| Surface # | 17 | 18 | 19 |
|---|---|---|---|
| k = | −7.8359E+00 | −5.4619E−10 | −1.0191E+00 |
| A4 = | 1.0661E−02 | −4.6123E−02 | −5.0961E−02 |
| A6 = | −1.2059E−02 | 1.3509E−02 | 1.1969E−02 |
| A8 = | 2.4524E−03 | −2.4639E−03 | −1.8832E−03 |
| A10 = | −9.1127E−05 | 3.1180E−04 | 1.7886E−04 |
| A12 = | −4.2659E−05 | −2.5934E−05 | −9.5484E−06 |
| A14 = | 7.7307E−06 | 1.3748E−06 | 2.2156E−07 |
| A16 = | −5.8464E−07 | −4.4609E−08 | 2.1738E−09 |
| A18 = | 2.1559E−08 | 8.0604E−10 | −2.1165E−10 |
| A20 = | −3.1847E−10 | −6.1985E−12 | 2.9799E−12 |

In Table 1, the curvature radius, the thickness and the focal length are shown in millimeters (mm). Surface numbers 0-23 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
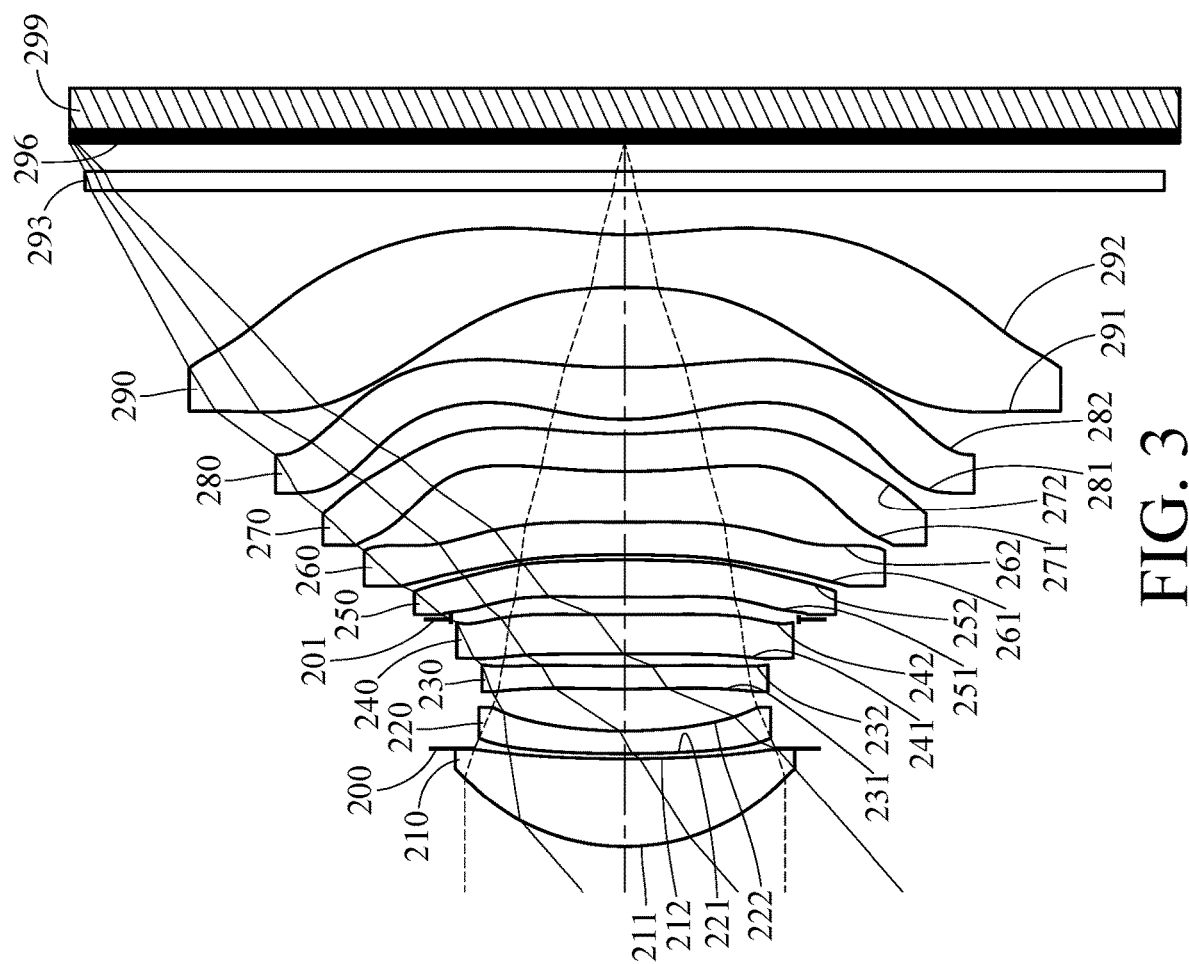
FIG. 3 is a schematic view of an image capturing unit according to the 2nd embodiment of the present disclosure.
Figure 4:
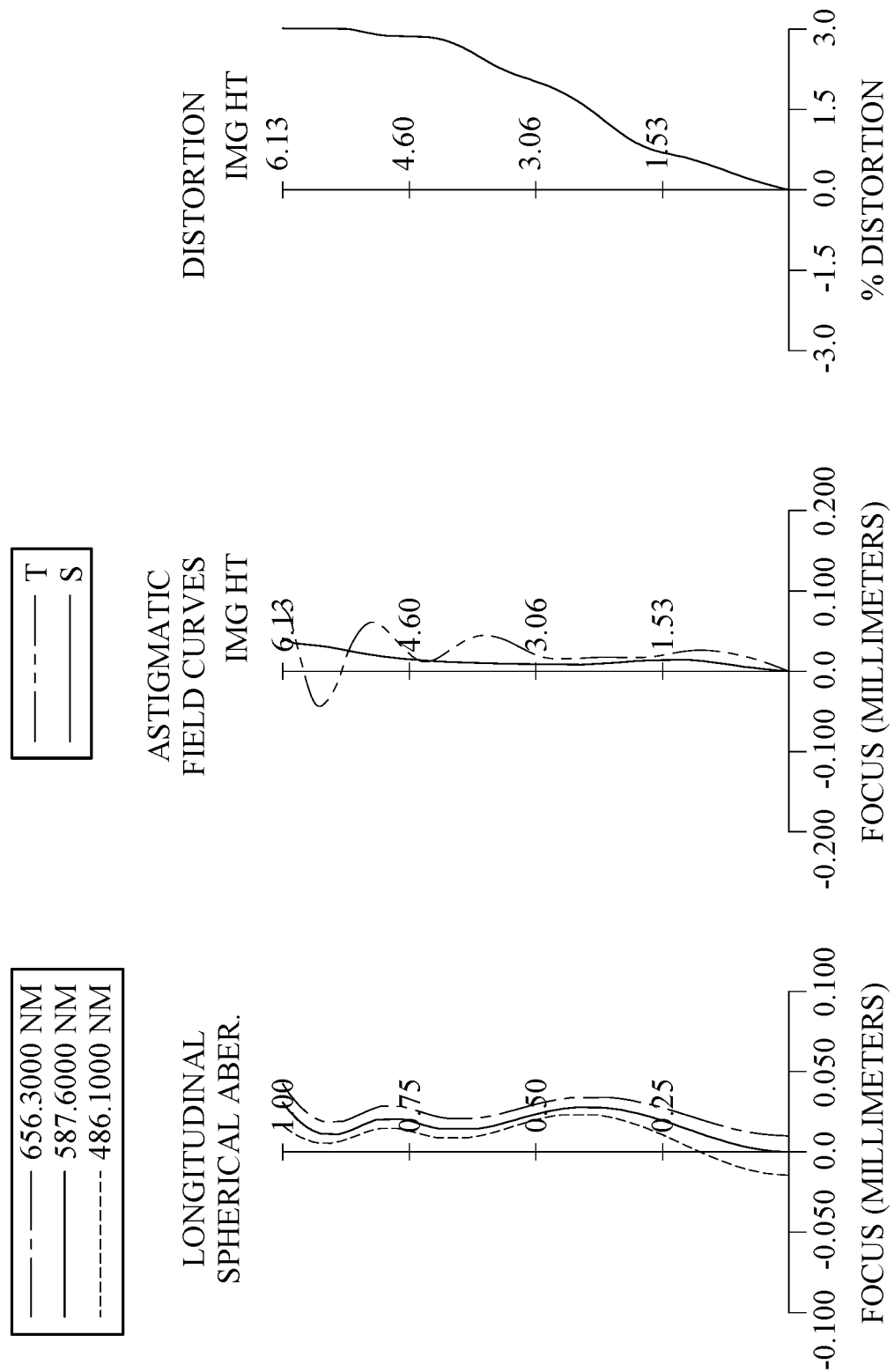
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging optical lens assembly (its reference numeral is omitted) of the present disclosure and an image sensor 299. The imaging optical lens assembly includes, in order from an object side to an image side along an optical path, a first lens element 210, an aperture stop 200, a second lens element 220, a third lens element 230, a fourth lens element 240, a stop 201, a fifth lens element 250, a sixth lens element 260, a seventh lens element 270, an eighth lens element 280, a ninth lens element 290, a filter 293 and an image surface 296. In addition, the imaging optical lens assembly has a configuration of a first lens group (the first lens element 210, the second lens element 220 and the third lens element 230), a second lens group (the fourth lens element 240, the fifth lens element 250 and the sixth lens element 260) and a third lens group (the seventh lens element 270, the eighth lens element 280 and the ninth lens element 290). The imaging optical lens assembly includes nine lens elements (210, 220, 230, 240, 250, 260, 270, 280 and 290) with no additional lens element disposed between each of the adjacent nine lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has one inflection point. The image-side surface 212 of the first lens element 210 has one inflection point.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has one inflection point. The image-side surface 232 of the third lens element 230 has two inflection points.

The fourth lens element 240 with negative refractive power has an object-side surface 241 being concave in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has three inflection points. The image-side surface 242 of the fourth lens element 240 has two inflection points.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has three inflection points. The image-side surface 252 of the fifth lens element 250 has two inflection points.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has two inflection points. The image-side surface 262 of the sixth lens element 260 has three inflection points.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has three inflection points. The image-side surface 272 of the seventh lens element 270 has three inflection points. The object-side surface 271 of the seventh lens element 270 has at least one critical point in an off-axis region thereof. The image-side surface 272 of the seventh lens element 270 has at least one critical point in an off-axis region thereof.

The eighth lens element 280 with positive refractive power has an object-side surface 281 being convex in a paraxial region thereof and an image-side surface 282 being concave in a paraxial region thereof. The eighth lens element 280 is made of plastic material and has the object-side surface 281 and the image-side surface 282 being both aspheric. The object-side surface 281 of the eighth lens element 280 has two inflection points. The image-side surface 282 of the eighth lens element 280 has two inflection points. The object-side surface 281 of the eighth lens element 280 has at least one critical point in an off-axis region thereof. The image-side surface 282 of the eighth lens element 280 has at least one critical point in an off-axis region thereof.

The ninth lens element 290 with negative refractive power has an object-side surface 291 being concave in a paraxial region thereof and an image-side surface 292 being concave in a paraxial region thereof. The ninth lens element 290 is made of plastic material and has the object-side surface 291 and the image-side surface 292 being both aspheric. The object-side surface 291 of the ninth lens element 290 has two inflection points. The image-side surface 292 of the ninth lens element 290 has three inflection points. The object-side surface 291 of the ninth lens element 290 has at least one critical point in an off-axis region thereof. The image-side surface 292 of the ninth lens element 290 has at least one critical point in an off-axis region thereof.

The filter 293 is made of glass material and located between the ninth lens element 290 and the image surface 296, and will not affect the focal length of the imaging optical lens assembly. The image sensor 299 is disposed on or near the image surface 296 of the imaging optical lens assembly.

The detailed optical data of the 2nd embodiment are shown in Table 3 and the aspheric surface data are shown in Table 4 below.

TABLE 3

2nd Embodiment f = 6.76 mm, Fno = 1.90, HFOV = 41.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.489 | (ASP) | 0.982 | Plastic | 1.545 | 56.1 | 5.42 |
| 2 | | 13.680 | (ASP) | 0.117 | | | | |
| 3 | Ape. Stop | Plano | | −0.060 | | | | |
| 4 | Lens 2 | 10.492 | (ASP) | 0.252 | Plastic | 1.686 | 18.4 | −13.69 |
| 5 | | 4.907 | (ASP) | 0.466 | | | | |
| 6 | Lens 3 | 14.635 | (ASP) | 0.255 | Plastic | 1.686 | 18.4 | 194.93 |
| 7 | | 16.316 | (ASP) | 0.136 | | | | |
| 8 | Lens 4 | −285.215 | (ASP) | 0.437 | Plastic | 1.544 | 56.0 | −79.02 |
| 9 | | 50.645 | (ASP) | −0.055 | | | | |
| 10 | Stop | Plano | | 0.247 | | | | |
| 11 | Lens 5 | 28.711 | (ASP) | 0.418 | Plastic | 1.544 | 56.0 | 13.46 |
| 12 | | −9.779 | (ASP) | 0.056 | | | | |
| 13 | Lens 6 | −11.847 | (ASP) | 0.363 | Plastic | 1.556 | 45.9 | −16.33 |
| 14 | | 39.409 | (ASP) | 0.569 | | | | |
| 15 | Lens 7 | 8.152 | (ASP) | 0.415 | Plastic | 1.579 | 35.0 | −30.16 |
| 16 | | 5.454 | (ASP) | 0.163 | | | | |
| 17 | Lens 8 | 2.921 | (ASP) | 0.577 | Plastic | 1.544 | 56.0 | 7.62 |
| 18 | | 9.190 | (ASP) | 0.892 | | | | |
| 19 | Lens 9 | −6.774 | (ASP) | 0.586 | Plastic | 1.544 | 56.0 | −5.12 |
| 20 | | 4.869 | (ASP) | 0.500 | | | | |
| 21 | Filter | Plano | | 0.210 | Glass | 1.517 | 64.2 | — |
| 22 | | Plano | | 0.316 | | | | |
| 23 | Image | Plano | | — | | | | |

Note:
Reference wavelength is 587.6 nm (d-line).
An effective radius of the stop 201 (Surface 10) is 1.935 mm.

TABLE 4

Aspheric Coefficients

| Surface # | 1 | 2 | 4 | 5 | 6 |
|---|---|---|---|---|---|
| k = | −4.3596E−01 | −3.6355E+01 | 4.7323E+00 | 5.8438E+00 | −1.6373E+01 |
| A4 = | 4.8228E−03 | −1.5489E−02 | −2.6437E−02 | −2.0195E−02 | −3.2584E−02 |
| A6 = | 1.3495E−03 | 2.6063E−02 | 3.5994E−02 | 1.9325E−02 | 6.1233E−03 |
| A8 = | −1.2935E−03 | −1.8472E−02 | −2.2997E−02 | −1.3955E−02 | −7.2214E−03 |

TABLE 4-continued

| Aspheric Coefficients | | | | | |
|---|---|---|---|---|---|
| A10 = | 1.4425E-03 | 8.2712E-03 | 9.5202E-03 | 7.4889E-03 | 6.3610E-03 |
| A12 = | -7.4872E-04 | -2.3513E-03 | -2.1937E-03 | -2.1883E-03 | -1.7524E-03 |
| A14 = | 1.9905E-04 | 3.7952E-04 | 2.2734E-04 | 2.9797E-04 | 1.1215E-04 |
| A16 = | -2.2176E-05 | -2.7132E-05 | — | — | — |

| Surface # | 7 | 8 | 9 | 11 | 12 |
|---|---|---|---|---|---|
| k = | 3.0000E+01 | -1.0000E+00 | -6.6096E+01 | -1.2319E+01 | 4.8652E+00 |
| A4 = | -2.1608E-02 | 8.4724E-03 | 6.2717E-03 | 1.0238E-02 | 7.6675E-02 |
| A6 = | -2.9033E-03 | -2.5672E-02 | -3.8897E-02 | -3.3860E-02 | -9.3400E-02 |
| A8 = | -4.4024E-03 | 2.9196E-02 | 4.0006E-02 | -8.4085E-02 | 4.3935E-02 |
| A10 = | 7.4663E-03 | -3.3774E-02 | -2.7847E-02 | 3.6349E-02 | -1.0374E-02 |
| A12 = | -2.5515E-03 | 2.5676E-02 | 1.1961E-02 | -3.0871E-02 | 1.2294E-03 |
| A14 = | 2.8997E-04 | -1.1267E-02 | -3.1500E-03 | 1.3634E-02 | -4.9328E-05 |
| A16 = | — | 2.6514E-03 | 4.9916E-04 | -3.3613E-03 | -2.9266E-06 |
| A18 = | — | -2.5644E-04 | -3.6429E-05 | 4.3805E-04 | 2.4195E-07 |
| A20 = | — | — | — | -2.3631E-05 | — |

| Surface # | 13 | 14 | 15 | 16 | 17 |
|---|---|---|---|---|---|
| k = | 6.6913E+00 | 3.9901E+01 | -6.0555E+00 | -3.2453E+01 | -1.1835E+00 |
| A4 = | 2.9053E-02 | -4.0067E-02 | 3.0661E-03 | -5.2656E-03 | -4.1061E-02 |
| A6 = | -5.1012E-02 | 1.2708E-02 | -1.8238E-02 | -1.4933E-02 | 4.6212E-03 |
| A8 = | 3.0647E-02 | 1.0367E-02 | 8.9801E-03 | 8.5847E-03 | -3.9398E-03 |
| A10 = | -9.9704E-03 | -7.1948E-03 | -2.6917E-03 | -2.6537E-03 | 1.8643E-03 |
| A12 = | 2.0733E-03 | 2.3855E-03 | 4.0426E-04 | 4.6768E-04 | -4.2216E-04 |
| A14 = | -2.9340E-04 | -4.3262E-04 | -2.6024E-05 | -4.6596E-05 | 5.1779E-05 |
| A16 = | 2.6122E-05 | 4.3655E-05 | 3.0866E-07 | 2.4922E-06 | -3.5356E-06 |
| A18 = | -1.0666E-06 | -2.2932E-06 | 2.0913E-08 | -6.0541E-08 | 1.2666E-07 |
| A20 = | — | 4.8540E-08 | — | 3.4444E-10 | -1.8589E-09 |

| Surface # | 18 | 19 | 20 |
|---|---|---|---|
| k = | -8.4535E+00 | -6.8992E-04 | -1.0159E+00 |
| A4 = | 1.0570E-02 | -4.6190E-02 | -5.1518E-02 |
| A6 = | -1.1818E-02 | 1.3548E-02 | 1.2196E-02 |
| A8 = | 2.4121E-03 | -2.4691E-03 | -1.9297E-03 |
| A10 = | -1.0209E-04 | 3.1145E-04 | 1.8387E-04 |
| A12 = | -3.7569E-05 | -2.5748E-05 | -9.8027E-06 |
| A14 = | 6.9351E-06 | 1.3519E-06 | 2.2276E-07 |
| A16 = | -5.2252E-07 | -4.3263E-08 | 2.6425E-09 |
| A18 = | 1.9110E-08 | 7.6688E-10 | -2.3125E-10 |
| A20 = | 2.7954E-10 | -5.7446E-12 | 3.2320E-12 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | |
|---|---|
| f [mm] | 6.76 |
| Fno | 1.90 |
| HFOV [deg.] | 41.3 |
| V6 | 45.9 |
| V7 | 35.0 |
| Vmin | 18.4 |
| Nmax | 1.686 |
| V1/N1 | 36.31 |
| V2/N2 | 10.91 |
| V3/N3 | 10.91 |
| V4/N4 | 36.27 |
| V5/N5 | 36.27 |
| V6/N6 | 29.50 |
| V7/N7 | 22.17 |
| V8/N8 | 36.27 |

| 2nd Embodiment | |
|---|---|
| V9/N9 | 36.27 |
| (Vi/Ni)min | 10.91 |
| (V2 + V3)/V1 | 0.66 |
| CTmax/CTmin | 3.89 |
| ΣCT/ΣAT | 1.69 |
| ΣAT/(T23 + T89) | 1.86 |
| ImgH/CTmax | 6.24 |
| (Rao + Rai)/(Rao − Rai) | 0.15 |
| (R17 + R18)/(R17 − R18) | 0.16 |
| |R17/R18| | 1.39 |
| f/f1 | 1.25 |
| f/f8 | 0.89 |
| (|P2| + |P3| + |P4| + |P5| + |P6| + |P7|)/ (|P1| + |P8| + |P9|) | 0.51 |
| (TD × BL)/(ImgH × ImgH) | 0.19 |
| BL/TD | 0.15 |
| ImgH/BL | 5.97 |
| EPD/BL | 3.47 |
| f/EPD | 1.90 |
| Y92/Y31 | 3.28 |
| Yc72/f | 0.19 |
| Yc82/f | 0.23; 0.57 |
| Yc92/f | 0.20 |
| SL/TL | 0.86 |
| TL/f | 1.16 |
| TL/ImgH | 1.28 |
| ImgH [mm] | 6.13 |

-continued

| 2nd Embodiment | |
|---|---|
| TL [mm] | 7.84 |
| \|f/R1\| + \|f/R2\| | 3.21 |
| \|f/R3\| + \|f/R4\| | 2.02 |
| \|f/R5\| + \|f/R6\| | 0.88 |
| \|f/R7\| + \|f/R8\| | 0.16 |
| \|f/R9\| + \|f/R10\| | 0.93 |
| \|f/R11\| + \|f/R12\| | 0.74 |
| \|f/R13\| + \|f/R14\| | 2.07 |
| \|f/R15\| + \|f/R16\| | 3.05 |
| \|f/R17\| + \|f/R18\| | 2.39 |

3rd Embodiment

Figure 5:
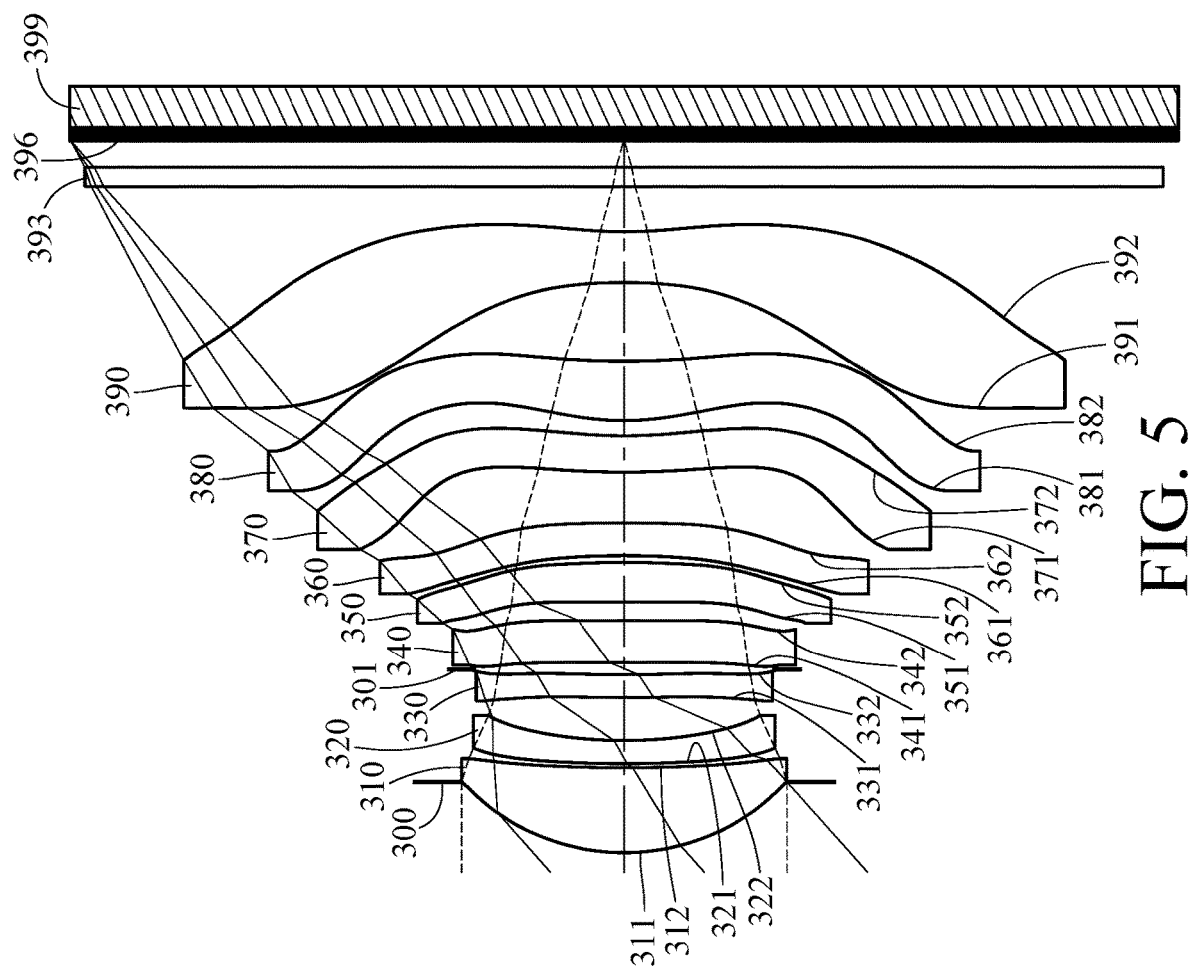
FIG. 5 is a schematic view of an image capturing unit according to the 3rd embodiment of the present disclosure.
Figure 6:
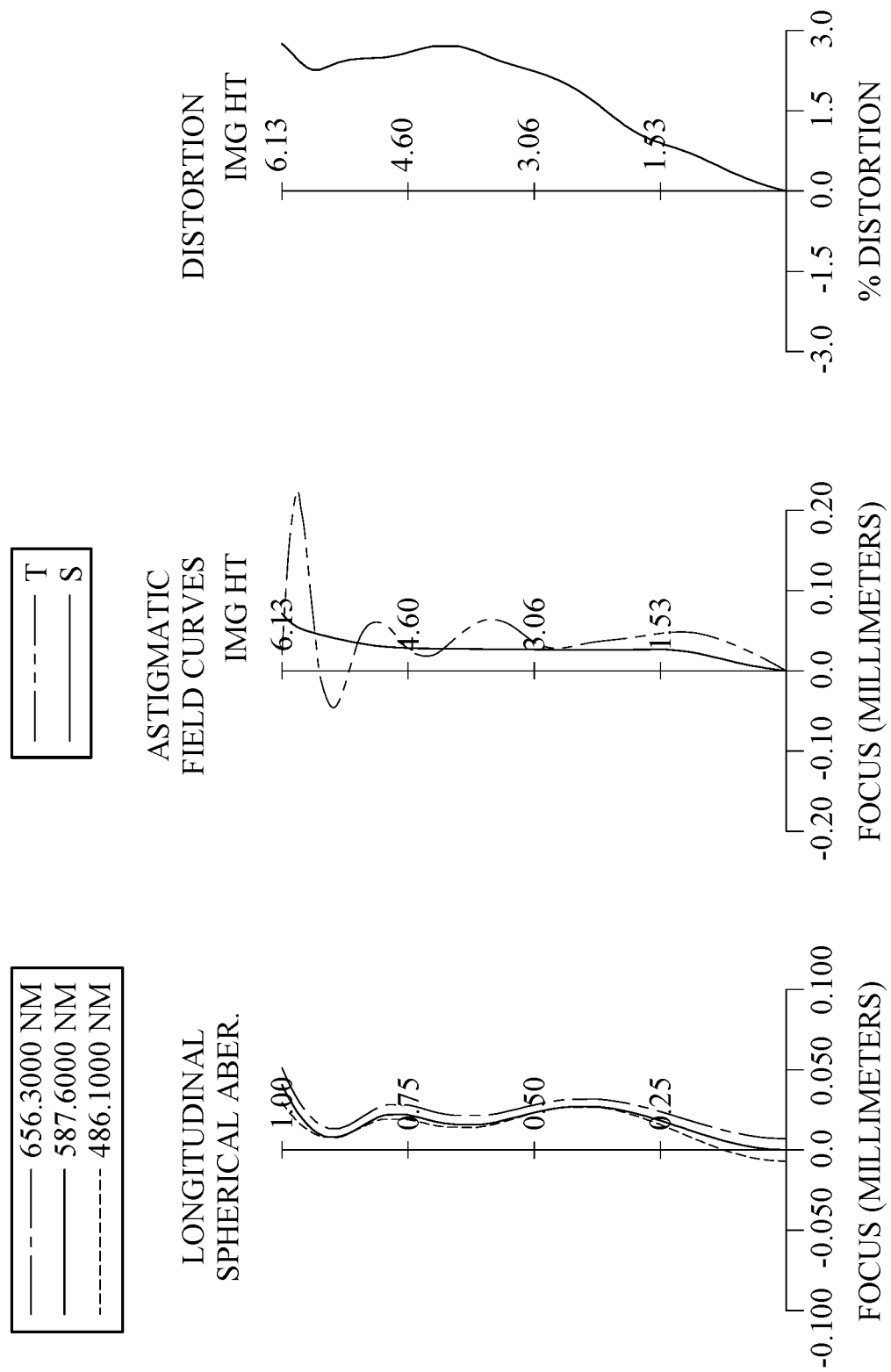
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging optical lens assembly (its reference numeral is omitted) of the present disclosure and an image sensor 399. The imaging optical lens assembly includes, in order from an object side to an image side along an optical path, an aperture stop 300, a first lens element 310, a second lens element 320, a third lens element 330, a stop 301, a fourth lens element 340, a fifth lens element 350, a sixth lens element 360, a seventh lens element 370, an eighth lens element 380, a ninth lens element 390, a filter 393 and an image surface 396. In addition, the imaging optical lens assembly has a configuration of a first lens group (the first lens element 310, the second lens element 320 and the third lens element 330), a second lens group (the fourth lens element 340, the fifth lens element 350 and the sixth lens element 360) and a third lens group (the seventh lens element 370, the eighth lens element 380 and the ninth lens element 390). The imaging optical lens assembly includes nine lens elements (310, 320, 330, 340, 350, 360, 370, 380 and 390) with no additional lens element disposed between each of the adjacent nine lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has one inflection point. The image-side surface 312 of the first lens element 310 has one inflection point.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has one inflection point. The image-side surface 332 of the third lens element 330 has two inflection points.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has three inflection points. The image-side surface 342 of the fourth lens element 340 has three inflection points.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has three inflection points. The image-side surface 352 of the fifth lens element 350 has two inflection points.

The sixth lens element 360 with negative refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has two inflection points. The image-side surface 362 of the sixth lens element 360 has two inflection points.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has three inflection points. The image-side surface 372 of the seventh lens element 370 has five inflection points. The object-side surface 371 of the seventh lens element 370 has at least one critical point in an off-axis region thereof. The image-side surface 372 of the seventh lens element 370 has at least one critical point in an off-axis region thereof.

The eighth lens element 380 with positive refractive power has an object-side surface 381 being convex in a paraxial region thereof and an image-side surface 382 being concave in a paraxial region thereof. The eighth lens element 380 is made of plastic material and has the object-side surface 381 and the image-side surface 382 being both aspheric. The object-side surface 381 of the eighth lens element 380 has two inflection points. The image-side surface 382 of the eighth lens element 380 has two inflection points. The object-side surface 381 of the eighth lens element 380 has at least one critical point in an off-axis region thereof. The image-side surface 382 of the eighth lens element 380 has at least one critical point in an off-axis region thereof.

The ninth lens element 390 with negative refractive power has an object-side surface 391 being concave in a paraxial region thereof and an image-side surface 392 being concave in a paraxial region thereof. The ninth lens element 390 is made of plastic material and has the object-side surface 391 and the image-side surface 392 being both aspheric. The object-side surface 391 of the ninth lens element 390 has three inflection points. The image-side surface 392 of the ninth lens element 390 has three inflection points. The object-side surface 391 of the ninth lens element 390 has at least one critical point in an off-axis region thereof. The image-side surface 392 of the ninth lens element 390 has at least one critical point in an off-axis region thereof.

The filter 393 is made of glass material and located between the ninth lens element 390 and the image surface 396, and will not affect the focal length of the imaging optical lens assembly. The image sensor 399 is disposed on or near the image surface 396 of the imaging optical lens assembly.

The detailed optical data of the 3rd embodiment are shown in Table 5 and the aspheric surface data are shown in Table 6 below.

TABLE 5

3rd Embodiment f = 6.70 mm, Fno = 1.86, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.782 | | | | |
| 2 | Lens 1 | 2.505 | (ASP) | 0.940 | Plastic | 1.545 | 56.1 | 5.33 |
| 3 | | 15.827 | (ASP) | 0.045 | | | | |
| 4 | Lens 2 | 11.627 | (ASP) | 0.256 | Plastic | 1.660 | 20.3 | −13.55 |
| 5 | | 5.012 | (ASP) | 0.475 | | | | |
| 6 | Lens 3 | 15.944 | (ASP) | 0.255 | Plastic | 1.686 | 18.4 | −198.56 |
| 7 | | 14.181 | (ASP) | 0.056 | | | | |
| 8 | Stop | Plano | | 0.076 | | | | |
| 9 | Lens 4 | 190.508 | (ASP) | 0.469 | Plastic | 1.544 | 56.0 | −877.59 |
| 10 | | 136.055 | (ASP) | 0.205 | | | | |
| 11 | Lens 5 | 79.351 | (ASP) | 0.443 | Plastic | 1.544 | 56.0 | 13.33 |
| 12 | | −7.966 | (ASP) | 0.072 | | | | |
| 13 | Lens 6 | −8.483 | (ASP) | 0.360 | Plastic | 1.566 | 37.4 | −18.29 |
| 14 | | −47.619 | (ASP) | 0.565 | | | | |
| 15 | Lens 7 | 9.851 | (ASP) | 0.400 | Plastic | 1.584 | 28.2 | −21.25 |
| 16 | | 5.410 | (ASP) | 0.168 | | | | |
| 17 | Lens 8 | 2.960 | (ASP) | 0.666 | Plastic | 1.544 | 56.0 | 7.41 |
| 18 | | 10.264 | (ASP) | 0.868 | | | | |
| 19 | Lens 9 | −6.834 | (ASP) | 0.564 | Plastic | 1.534 | 55.9 | −5.20 |
| 20 | | 4.810 | (ASP) | 0.500 | | | | |
| 21 | Filter | Plano | | 0.210 | Glass | 1.517 | 64.2 | — |
| 22 | | Plano | | 0.293 | | | | |
| 23 | Image | Plano | | — | | | | |

Note:
Reference wavelength is 587.6 nm (d-line).
An effective radius of the stop 301 (Surface 8) is 1.660 mm.

TABLE 6

Aspheric Coefficients

| Surface # | 2 | 3 | 4 | 5 | 6 |
|---|---|---|---|---|---|
| k = | −4.2652E−01 | −3.7783E+01 | 2.0651E+00 | 5.9150E+00 | −4.2902E−01 |
| A4 = | 3.5954E−03 | −1.8840E−02 | −2.7600E−02 | −1.9468E−02 | −2.8345E−02 |
| A6 = | 3.3715E−03 | 3.6382E−02 | 4.4558E−02 | 2.1900E−02 | −2.3251E−03 |
| A8 = | −2.8360E−03 | −3.0506E−02 | −3.4428E−02 | −1.8528E−02 | 7.4548E−04 |
| A10 = | 2.1944E−03 | 1.5002E−02 | 1.5920E−02 | 1.0295E−02 | 2.6130E−03 |
| A12 = | −9.9118E−04 | −4.2846E−03 | −3.8869E−03 | −2.9014E−03 | −8.2567E−04 |
| A14 = | 2.5106E−04 | 6.4591E−04 | 3.9928E−04 | 3.5459E−04 | 1.3243E−05 |
| A16 = | −2.7517E−05 | −3.9796E−05 | — | — | — |

| Surface # | 7 | 9 | 10 | 11 | 12 |
|---|---|---|---|---|---|
| k = | 2.5380E+01 | −1.0000E+00 | 2.0000E+00 | −2.6553E+01 | 4.8553E+00 |
| A4 = | −2.0404E−02 | 7.4571E−03 | 5.5392E−03 | 6.7002E−03 | 7.4261E−02 |
| A6 = | −5.3878E−03 | −2.7762E−02 | −3.9945E−02 | −2.3955E−02 | −9.4702E−02 |
| A8 = | −3.3969E−03 | 3.6876E−02 | 4.4112E−02 | −2.3211E−02 | 4.5667E−02 |
| A10 = | 7.3879E−03 | −4.4744E−02 | −3.2315E−02 | 4.9588E−02 | −1.0814E−02 |
| A12 = | −2.5657E−03 | 3.3516E−02 | 1.4562E−02 | −3.8128E−02 | 1.1922E−03 |
| A14 = | 2.8838E−04 | −1.4290E−02 | −4.0301E−03 | 1.6060E−02 | −1.5304E−05 |
| A16 = | — | 3.2609E−03 | 6.6213E−04 | −3.8472E−03 | −8.1689E−06 |
| A18 = | — | −3.0687E−04 | −4.9034E−05 | 4.9284E−04 | 4.9279E−07 |
| A20 = | — | — | — | −2.6399E−05 | — |

| Surface # | 13 | 14 | 15 | 16 | 17 |
|---|---|---|---|---|---|
| k = | 4.8943E+00 | −1.0000E+00 | −5.3509E+00 | −2.5243E+01 | −1.1840E+00 |
| A4 = | 3.0213E−02 | −3.3455E−02 | 7.8825E−03 | −3.9182E−03 | −3.8527E−02 |
| A6 = | −5.9094E−02 | −5.8576E−03 | −2.1405E−02 | −1.2898E−02 | 3.6106E−03 |
| A8 = | 3.7690E−02 | 1.4431E−02 | 1.0519E−02 | 6.7044E−03 | −2.9062E−03 |

TABLE 6-continued

| Aspheric Coefficients | | | | |
|---|---|---|---|---|
| A10 = | −1.3095E−02 | −8.5563E−03 | −3.1673E−03 | −1.8198E−03 | 1.4025E−03 |
| A12 = | 2.9387E−03 | 2.6362E−03 | 4.9924E−04 | 2.5656E−04 | −3.1865E−04 |
| A14 = | −4.4396E−04 | −4.5108E−04 | −3.8047E−05 | −1.5585E−05 | 3.8892E−05 |
| A16 = | 4.1063E−05 | 4.2646E−05 | 1.1541E−06 | −1.2069E−07 | −2.6327E−06 |
| A18 = | −1.7029E−06 | −2.0497E−06 | −3.5255E−09 | 5.6926E−08 | 9.3427E−08 |
| A20 = | — | 3.7782E−08 | — | −1.8454E−09 | −1.3600E−09 |

| Surface # | 18 | 19 | 20 |
|---|---|---|---|
| k = | 8.1742E+00 | −3.0493E−20 | −1.0646E+00 |
| A4 = | 9.5136E−03 | −4.2971E−02 | −4.8615E−02 |
| A6 = | −1.0118E−02 | 1.1872E−02 | 1.1124E−02 |
| A8 = | 1.7199E−03 | −2.0216E−03 | −1.6941E−03 |
| A10 = | 3.1770E−05 | 2.3913E−04 | 1.5617E−04 |
| A12 = | −5.0357E−05 | −1.8523E−05 | −8.1537E−06 |
| A14 = | 7.4143E−06 | 9.0625E−07 | 1.8932E−07 |
| A16 = | −5.1184E−07 | −2.6788E−08 | 1.4428E−09 |
| A18 = | 1.7714E−08 | 4.3254E−10 | −1.5984E−10 |
| A20 = | −2.4830E−10 | −2.8824E−12 | 2.2424E−12 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | |
|---|---|
| f [mm] | 6.70 |
| Fno | 1.86 |
| HFOV [deg.] | 41.6 |
| V6 | 37.4 |
| V7 | 28.2 |
| Vmin | 18.4 |
| Nmax | 1.686 |
| V1/N1 | 36.31 |
| V2/N2 | 12.23 |
| V3/N3 | 10.91 |
| V4/N4 | 36.27 |
| V5/N5 | 36.27 |
| V6/N6 | 23.88 |
| V7/N7 | 17.80 |
| V8/N8 | 36.27 |
| V9/N9 | 36.44 |
| (Vi/Ni)min | 10.91 |
| (V2 + V3)/V1 | 0.69 |
| CTmax/CTmin | 3.69 |
| ΣCT/ΣAT | 1.72 |
| ΣAT/(T23 + T89) | 1.88 |
| ImgH/CTmax | 6.52 |
| (Rao + Rai)/(Rao − Rai) | 0.20 |
| (R17 + R18)/(R17 − R18) | 0.17 |
| |R17/R18| | 1.42 |
| f/f1 | 1.26 |
| f/f8 | 0.90 |
| (|P2| + |P3| + |P4| + |P5| + |P6| + |P7|)/(|P1| + |P8| + |P9|) | 0.50 |
| (TD × BL)/(ImgH × ImgH) | 0.18 |
| BL/TD | 0.15 |
| ImgH/BL | 6.11 |
| EPD/BL | 3.59 |
| f/EPD | 1.86 |
| Y92/Y31 | 3.17 |
| Yc72/f | 0.21 |
| Yc82/f | 0.23; 0.58 |
| Yc92/f | 0.21 |
| SL/TL | 0.90 |

-continued

| 3rd Embodiment | |
|---|---|
| TL/f | 1.18 |
| TL/ImgH | 1.29 |
| ImgH [mm] | 6.13 |
| TL [mm] | 7.88 |
| |f/R1| + |f/R2| | 3.10 |
| |f/R3| + |f/R4| | 1.91 |
| |f/R5| + |f/R6| | 0.89 |
| |f/R7| + |f/R8| | 0.08 |
| |f/R9| + |f/R10| | 0.93 |
| |f/R11| + |f/R12| | 0.93 |
| |f/R13| + |f/R14| | 1.92 |
| |f/R15| + |f/R16| | 2.92 |
| |f/R17| + |f/R18| | 2.37 |

4th Embodiment

Figure 7:
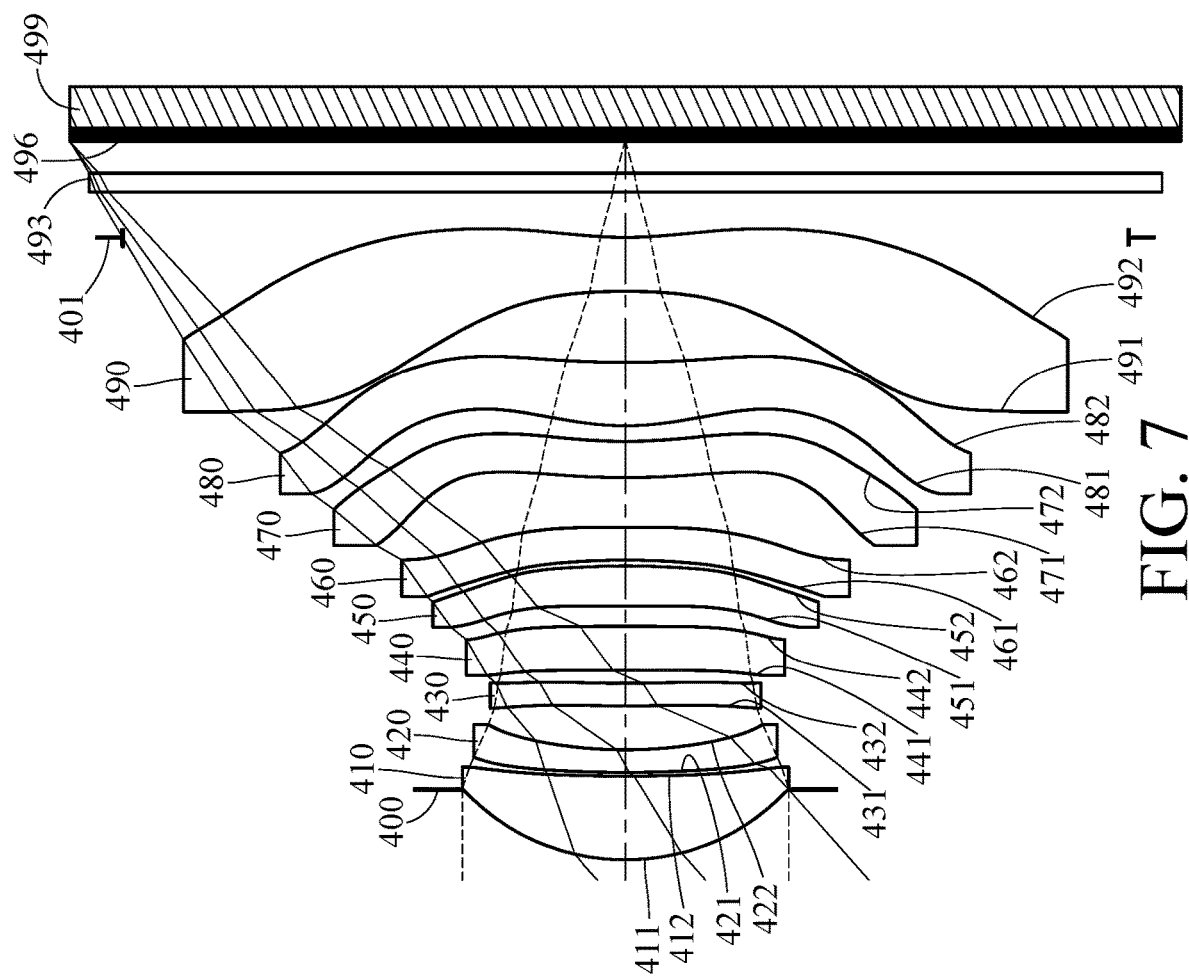
FIG. 7 is a schematic view of an image capturing unit according to the 4th embodiment of the present disclosure.
Figure 8:
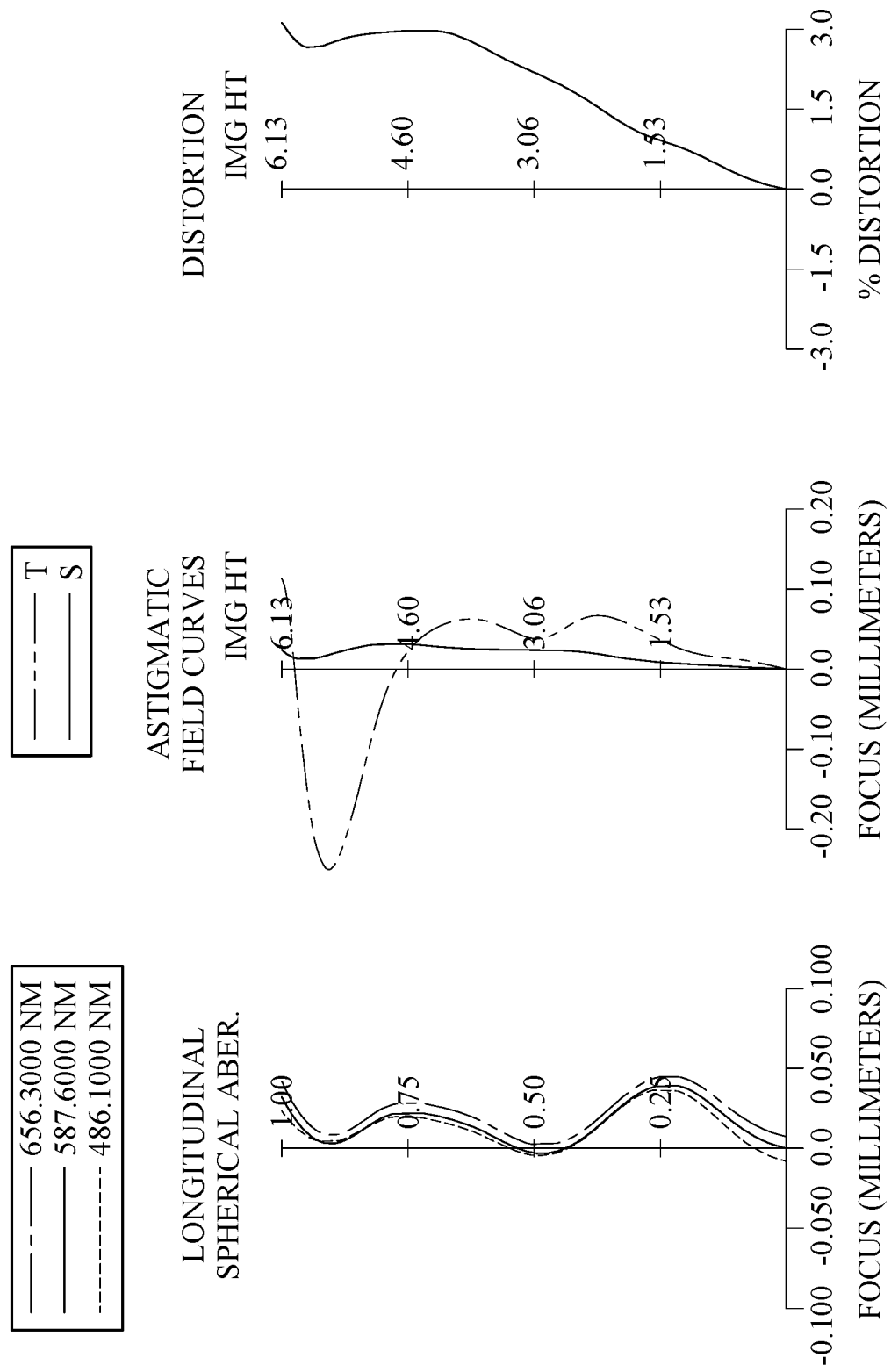
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging optical lens assembly (its reference numeral is omitted) of the present disclosure and an image sensor 499. The imaging optical lens assembly includes, in order from an object side to an image side along an optical path, an aperture stop 400, a first lens element 410, a second lens element 420, a third lens element 430, a fourth lens element 440, a fifth lens element 450, a sixth lens element 460, a seventh lens element 470, an eighth lens element 480, a ninth lens element 490, a stop 401, a filter 493 and an image surface 496. In addition, the imaging optical lens assembly has a configuration of a first lens group (the first lens element 410, the second lens element 420 and the third lens element 430), a second lens group (the fourth lens element 440, the fifth lens element 450 and the sixth lens element 460) and a third lens group (the seventh lens element 470, the eighth lens element 480 and the ninth lens element 490). The imaging optical lens assembly includes nine lens elements (410, 420, 430, 440, 450, 460, 470, 480 and 490) with no additional lens element disposed between each of the adjacent nine lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has one inflection point. The image-side surface 412 of the first lens element 410 has one inflection point.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has one inflection point. The image-side surface 432 of the third lens element 430 has two inflection points.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has three inflection points. The image-side surface 442 of the fourth lens element 440 has one inflection point.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The object-side surface 451 of the fifth lens element 450 has two inflection points. The image-side surface 452 of the fifth lens element 450 has two inflection points.

The sixth lens element 460 with negative refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has one inflection point. The image-side surface 462 of the sixth lens element 460 has two inflection points.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has two inflection points. The image-side surface 472 of the seventh lens element 470 has one inflection point. The object-side surface 471 of the seventh lens element 470 has at least one critical point in an off-axis region thereof. The image-side surface 472 of the seventh lens element 470 has at least one critical point in an off-axis region thereof.

The eighth lens element 480 with positive refractive power has an object-side surface 481 being convex in a paraxial region thereof and an image-side surface 482 being concave in a paraxial region thereof. The eighth lens element 480 is made of plastic material and has the object-side surface 481 and the image-side surface 482 being both aspheric. The object-side surface 481 of the eighth lens element 480 has two inflection points. The image-side surface 482 of the eighth lens element 480 has two inflection points. The object-side surface 481 of the eighth lens element 480 has at least one critical point in an off-axis region thereof. The image-side surface 482 of the eighth lens element 480 has at least one critical point in an off-axis region thereof.

The ninth lens element 490 with negative refractive power has an object-side surface 491 being concave in a paraxial region thereof and an image-side surface 492 being concave in a paraxial region thereof. The ninth lens element 490 is made of plastic material and has the object-side surface 491 and the image-side surface 492 being both aspheric. The object-side surface 491 of the ninth lens element 490 has three inflection points. The image-side surface 492 of the ninth lens element 490 has three inflection points. The image-side surface 492 of the ninth lens element 490 has at least one critical point in an off-axis region thereof.

The filter 493 is made of glass material and located between the stop 401 and the image surface 496, and will not affect the focal length of the imaging optical lens assembly. The image sensor 499 is disposed on or near the image surface 496 of the imaging optical lens assembly.

The detailed optical data of the 4th embodiment are shown in Table 7 and the aspheric surface data are shown in Table 8 below.

TABLE 7

4th Embodiment f = 6.70 mm, Fno = 1.86, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.775 | | | | |
| 2 | Lens 1 | 2.517 | (ASP) | 0.923 | Plastic | 1.545 | 56.1 | 5.33 |
| 3 | | 16.342 | (ASP) | 0.041 | | | | |
| 4 | Lens 2 | 11.881 | (ASP) | 0.250 | Plastic | 1.660 | 20.3 | −13.51 |
| 5 | | 5.051 | (ASP) | 0.485 | | | | |
| 6 | Lens 3 | 15.749 | (ASP) | 0.250 | Plastic | 1.686 | 18.4 | −557.38 |
| 7 | | 15.028 | (ASP) | 0.139 | | | | |
| 8 | Lens 4 | 1212.248 | (ASP) | 0.493 | Plastic | 1.544 | 56.0 | 161.11 |
| 9 | | −81.752 | (ASP) | 0.226 | | | | |
| 10 | Lens 5 | −71.648 | (ASP) | 0.440 | Plastic | 1.544 | 56.0 | 14.58 |

TABLE 7-continued

4th Embodiment f = 6.70 mm, Fno = 1.86, HFOV = 41.5 deg.

| Surface # | | Curvature Radius | | Thickness | Material | Index | Abbe # | Focal Length |
|---|---|---|---|---|---|---|---|---|
| 11 | | −7.158 | (ASP) | 0.064 | | | | |
| 12 | Lens 6 | −7.950 | (ASP) | 0.361 | Plastic | 1.566 | 37.4 | −16.15 |
| 13 | | −61.921 | (ASP) | 0.546 | | | | |
| 14 | Lens 7 | 8.966 | (ASP) | 0.400 | Plastic | 1.584 | 28.2 | −24.13 |
| 15 | | 5.390 | (ASP) | 0.171 | | | | |
| 16 | Lens 8 | 3.039 | (ASP) | 0.707 | Plastic | 1.544 | 56.0 | 7.19 |
| 17 | | 12.544 | (ASP) | 0.784 | | | | |
| 18 | Lens 9 | −7.212 | (ASP) | 0.593 | Plastic | 1.534 | 55.9 | −5.15 |
| 19 | | 4.569 | (ASP) | 0.000 | | | | |
| 20 | Stop | Plano | | 0.500 | | | | |
| 21 | Filter | Plano | | 0.210 | Glass | 1.517 | 64.2 | — |
| 22 | | Plano | | 0.346 | | | | |
| 23 | Image | Plano | | — | | | | |

Note:
Reference wavelength is 587.6 nm (d-line).
An effective radius of the stop 401 (Surface 20) is 5.550 mm.

TABLE 8

Aspheric Coefficients

| Surface # | 2 | 3 | 4 | 5 | 6 |
|---|---|---|---|---|---|
| k = | −4.2702E−01 | −3.5337E+01 | 1.1223E+00 | 5.9296E+00 | −2.5484E+00 |
| A4 = | −6.7974E−04 | −1.9048E−02 | −2.8104E−02 | −1.7862E−02 | −2.6963E−02 |
| A6 = | 1.6740E−02 | 4.0471E−02 | 4.9134E−02 | 1.9370E−02 | −6.2170E−03 |
| A8 = | −2.1304E−02 | −3.7136E−02 | −4.0942E−02 | −1.6693E−02 | 5.0160E−03 |
| A10 = | 1.5404E−02 | 1.9806E−02 | 1.9581E−02 | 9.3909E−03 | 4.1058E−06 |
| A12 = | −6.0725E−03 | −6.1622E−03 | −4.8045E−03 | −2.5606E−03 | 5.3594E−05 |
| A14 = | 1.2495E−03 | 1.0344E−03 | 4.8378E−04 | 2.9374E−04 | −1.0978E−04 |
| A16 = | −1.0620E−04 | −7.3157E−05 | — | — | — |

| Surface # | 7 | 8 | 9 | 10 | 11 |
|---|---|---|---|---|---|
| k = | 2.3411E+01 | −1.0000E+00 | −9.9000E+01 | −1.0000E+00 | 4.8310E+00 |
| A4 = | −1.3686E−02 | 9.4125E−03 | 4.2890E−03 | 1.3800E−02 | 6.8651E−02 |
| A6 = | −2.4248E−02 | −2.5226E−02 | −3.8823E−02 | −5.4467E−02 | −9.0408E−02 |
| A8 = | 1.7821E−02 | 1.4729E−02 | 4.5356E−02 | 3.5647E−02 | 4.4560E−02 |
| A10 = | −4.3316E−03 | −9.8311E−03 | −3.5938E−02 | −1.2783E−02 | −1.1232E−02 |
| A12 = | 5.9226E−04 | 7.9307E−03 | 1.7436E−02 | 8.1665E−04 | 1.5719E−03 |
| A14 = | −4.4908E−05 | −4.4168E−03 | −5.1170E−03 | 1.3649E−04 | −1.2500E−04 |
| A16 = | — | 1.3150E−03 | 8.6759E−04 | −5.4441E−04 | 6.4833E−06 |
| A18 = | — | −1.5173E−04 | −6.4645E−05 | 8.5044E−05 | −2.6393E−07 |
| A20 = | — | — | — | −5.0768E−06 | — |

| Surface # | 12 | 13 | 14 | 15 | 16 |
|---|---|---|---|---|---|
| k = | 4.4670E+00 | −1.0000E+00 | −5.4781E+00 | −2.1663E+01 | −1.1450E+00 |
| A4 = | 3.1754E−02 | −3.3833E−02 | 8.5193E−03 | −3.0827E−03 | −3.8946E−02 |
| A6 = | −6.6442E−02 | −5.8307E−03 | −2.2686E−02 | −1.4979E−02 | 3.2010E−03 |
| A8 = | 4.7623E−02 | 1.4719E−02 | 1.0925E−02 | 7.3495E−03 | −2.6335E−03 |
| A10 = | −1.9400E−02 | −8.6735E−03 | −3.0727E−03 | −1.7400E−03 | 1.3367E−03 |
| A12 = | 5.1108E−03 | 2.6472E−03 | 4.2676E−04 | 1.7087E−04 | −3.1499E−04 |
| A14 = | −8.6656E−04 | −4.4788E−04 | −2.3362E−05 | 4.4446E−06 | 4.0143E−05 |
| A16 = | 8.4982E−05 | 4.1643E−05 | −1.4102E−07 | −2.3556E−06 | −2.8724E−06 |
| A18 = | −3.6050E−06 | −1.9407E−06 | 3.9454E−08 | 1.8055E−07 | 1.0926E−07 |
| A20 = | — | 3.3401E−08 | — | −4.5693E−09 | −1.7293E−09 |

| Surface # | 17 | 18 | 19 |
|---|---|---|---|
| k = | −9.0333E+00 | −3.8416E−02 | −1.0218E+00 |
| A4 = | 9.3638E−03 | −4.0305E−02 | −4.5723E−02 |
| A6 = | 9.5607E−03 | 1.0107E−02 | 9.8369E−03 |
| A8 = | 1.5615E−03 | −1.3703E−03 | −1.4283E−03 |
| A10 = | 3.5894E−05 | 1.0406E−04 | 1.3163E−04 |
| A12 = | −4.5624E−05 | −1.9560E−06 | −7.5147E−06 |
| A14 = | 6.5634E−06 | −3.2996E−07 | 2.5035E−07 |
| A16 = | −4.4700E−07 | 2.8438E−08 | −4.1079E−09 |
| A18 = | 1.5340E−08 | −9.2644E−10 | 1.2190E−11 |
| A 20 = | −2.1420E−10 | 1.1290E−11 | 3.1801E−13 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | |
|---|---|
| f [mm] | 6.70 |
| Fno | 1.86 |
| HFOV [deg.] | 41.5 |
| V6 | 37.4 |
| V7 | 28.2 |
| Vmin | 18.4 |
| Nmax | 1.686 |
| V1/N1 | 36.31 |
| V2/N2 | 12.23 |
| V3/N3 | 10.91 |
| V4/N4 | 36.27 |
| V5/N5 | 36.27 |
| V6/N6 | 23.88 |
| V7/N7 | 17.80 |
| V8/N8 | 36.27 |
| V9/N9 | 36.44 |
| (Vi/Ni)min | 10.91 |
| (V2 + V3)/V1 | 0.69 |
| CTmax/CTmin | 3.69 |
| ΣCT/ΣAT | 1.80 |
| ΣAT/(T23 + T89) | 1.94 |
| ImgH/CTmax | 6.64 |
| (Rao + Rai)/(Rao − Rai) | 0.27 |
| (R17 + R18)/(R17 − R18) | 0.22 |
| |R17/R18| | 1.58 |
| f/f1 | 1.26 |
| f/f8 | 0.93 |
| (|P2| + |P3| + |P4| + |P5| + |P6| + |P7|)/ (|P1| + |P8| + |P9|) | 0.49 |
| (TD × BL)/(ImgH × ImgH) | 0.19 |
| BL/TD | 0.15 |
| ImgH/BL | 5.80 |
| EPD/BL | 3.41 |
| f/EPD | 1.86 |
| Y92/Y31 | 3.33 |
| Yc72/f | 0.21 |
| Yc82/f | 0.22 |
| Yc92/f | 0.23 |
| SL/TL | 0.90 |
| TL/f | 1.18 |
| TL/ImgH | 1.29 |
| ImgH [mm] | 6.13 |
| TL [mm] | 7.93 |
| |f/R1| + |f/R2| | 3.07 |
| |f/R3| + |f/R4| | 1.89 |
| |f/R5| + |f/R6| | 0.87 |
| |f/R7| + |f/R8| | 0.09 |
| |f/R9| + |f/R10| | 1.03 |
| |f/R11| + |f/R12| | 0.95 |
| |f/R13| + |f/R14| | 1.99 |
| |f/R15| + |f/R16| | 2.74 |
| |f/R17| + |f/R18| | 2.39 |

5th Embodiment

Figure 9:
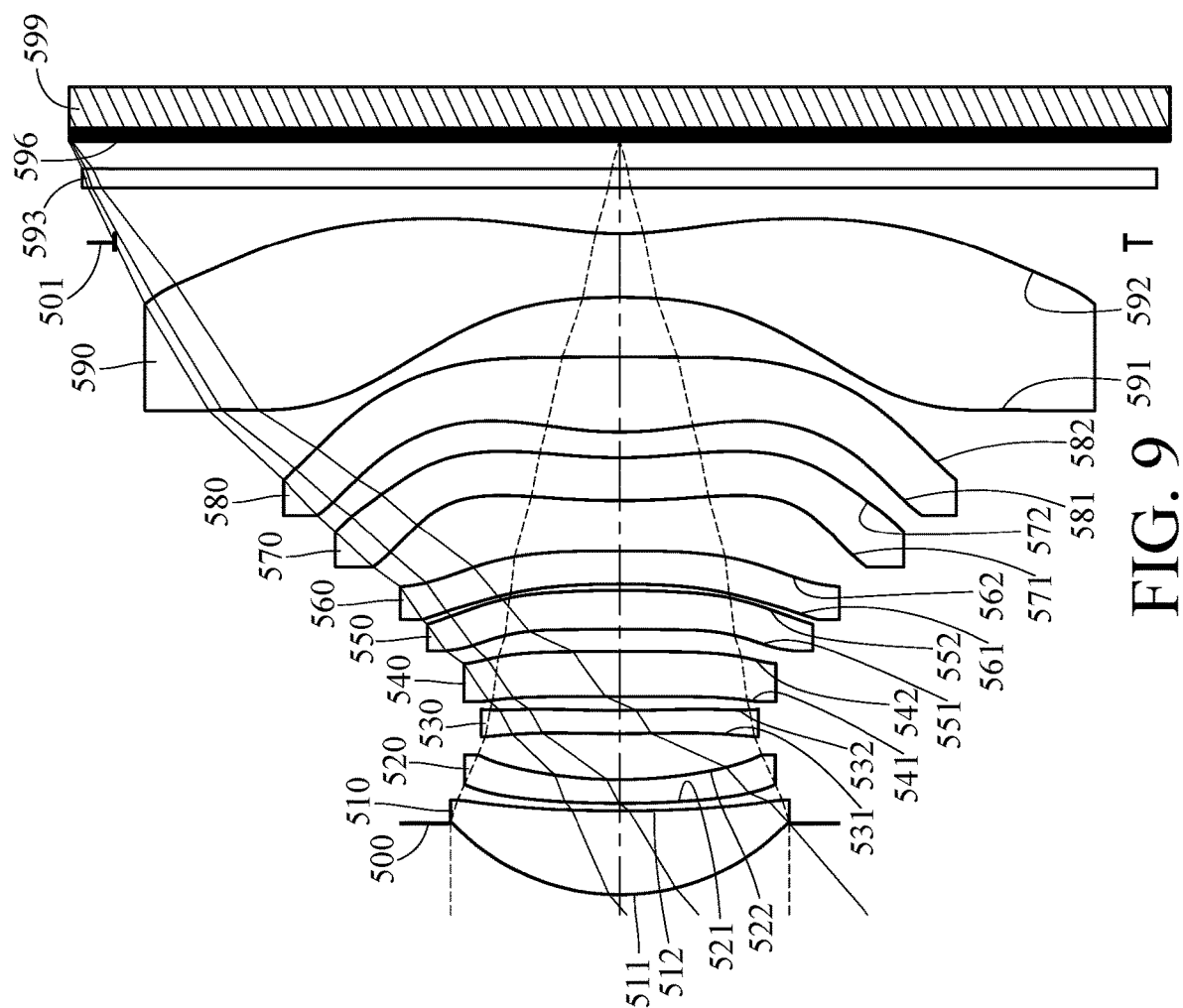
FIG. 9 is a schematic view of an image capturing unit according to the 5th embodiment of the present disclosure.
Figure 10:
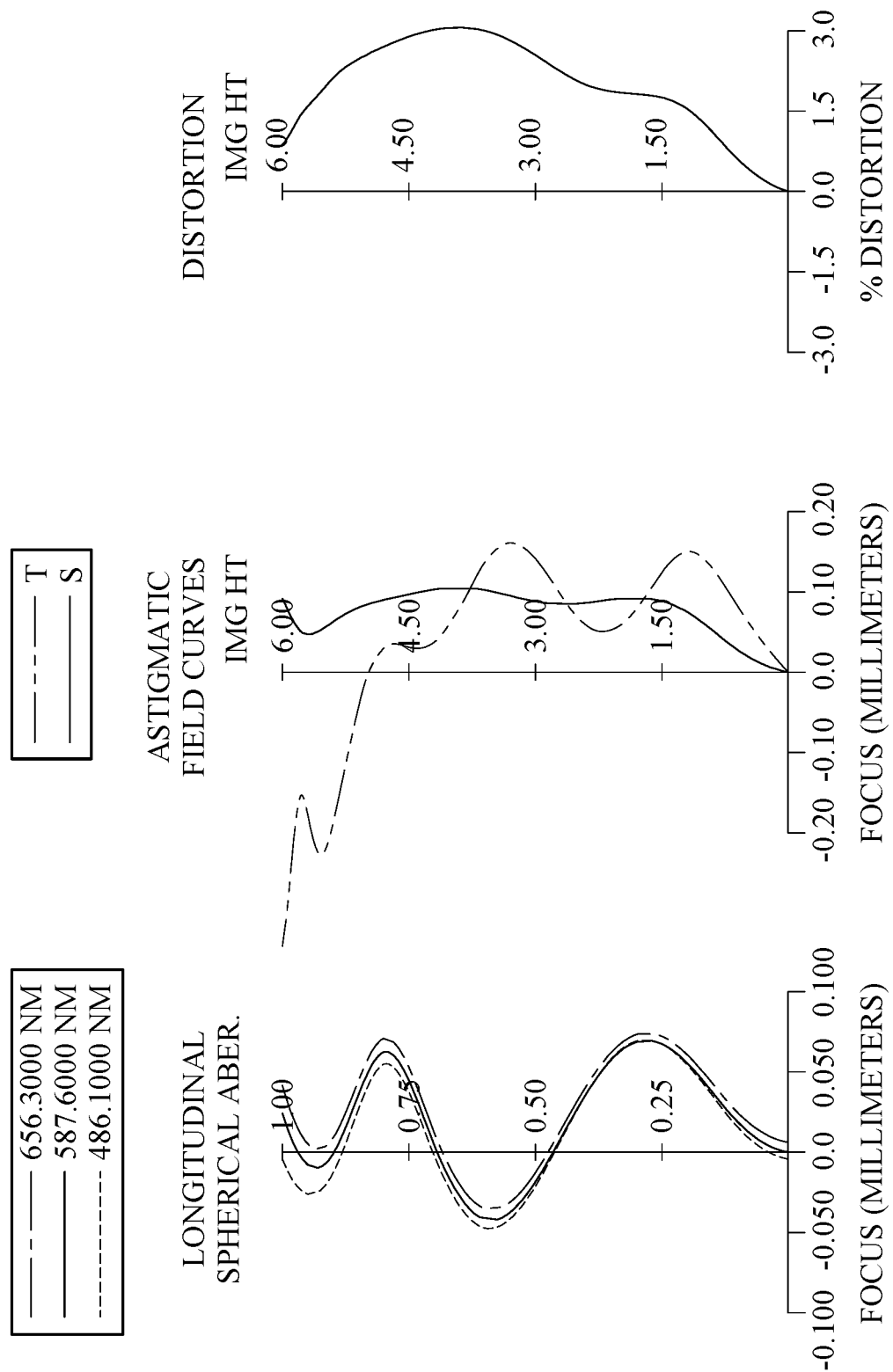
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging optical lens assembly (its reference numeral is omitted) of the present disclosure and an image sensor 599. The imaging optical lens assembly includes, in order from an object side to an image side along an optical path, an aperture stop 500, a first lens element 510, a second lens element 520, a third lens element 530, a fourth lens element 540, a fifth lens element 550, a sixth lens element 560, a seventh lens element 570, an eighth lens element 580, a ninth lens element 590, a stop 501, a filter 593 and an image surface 596. In addition, the imaging optical lens assembly has a configuration of a first lens group (the first lens element 510, the second lens element 520 and the third lens element 530), a second lens group (the fourth lens element 540, the fifth lens element 550 and the sixth lens element 560) and a third lens group (the seventh lens element 570, the eighth lens element 580 and the ninth lens element 590). The imaging optical lens assembly includes nine lens elements (510, 520, 530, 540, 550, 560, 570, 580 and 590) with no additional lens element disposed between each of the adjacent nine lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has one inflection point. The image-side surface 512 of the first lens element 510 has one inflection point.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has one inflection point. The image-side surface 532 of the third lens element 530 has two inflection points.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has one inflection point. The image-side surface 542 of the fourth lens element 540 has one inflection point.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has two inflection points. The image-side surface 552 of the fifth lens element 550 has two inflection points.

The sixth lens element 560 with negative refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric. The object-side surface 561 of the sixth lens element 560 has one inflection point. The image-side surface 562 of the sixth lens element 560 has one inflection point.

The seventh lens element 570 with negative refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has two inflection points. The image-side surface 572 of the seventh lens element 570 has one inflection point. The object-side surface 571 of the seventh lens element 570 has at least one critical point in an off-axis region thereof. The image-side surface 572 of the seventh lens element 570 has at least one critical point in an off-axis region thereof.

The eighth lens element 580 with positive refractive power has an object-side surface 581 being convex in a paraxial region thereof and an image-side surface 582 being convex in a paraxial region thereof. The eighth lens element 580 is made of plastic material and has the object-side surface 581 and the image-side surface 582 being both aspheric. The object-side surface 581 of the eighth lens element 580 has two inflection points. The image-side surface 582 of the eighth lens element 580 has one inflection point. The object-side surface 581 of the eighth lens element 580 has at least one critical point in an off-axis region thereof.

The ninth lens element 590 with negative refractive power has an object-side surface 591 being concave in a paraxial region thereof and an image-side surface 592 being concave in a paraxial region thereof. The ninth lens element 590 is made of plastic material and has the object-side surface 591 and the image-side surface 592 being both aspheric. The object-side surface 591 of the ninth lens element 590 has two inflection points. The image-side surface 592 of the ninth lens element 590 has three inflection points. The object-side surface 591 of the ninth lens element 590 has at least one critical point in an off-axis region thereof. The image-side surface 592 of the ninth lens element 590 has at least one critical point in an off-axis region thereof.

The filter 593 is made of glass material and located between the stop 501 and the image surface 596, and will not affect the focal length of the imaging optical lens assembly. The image sensor 599 is disposed on or near the image surface 596 of the imaging optical lens assembly.

The detailed optical data of the 5th embodiment are shown in Table 9 and the aspheric surface data are shown in Table 10 below.

TABLE 9

5th Embodiment f = 6.88 mm, Fno = 1.86, HFOV = 40.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.780 | | | | |
| 2 | Lens 1 | 2.572 | (ASP) | 0.922 | Plastic | 1.545 | 56.1 | 5.61 |
| 3 | | 14.128 | (ASP) | 0.084 | | | | |
| 4 | Lens 2 | 9.500 | (ASP) | 0.260 | Plastic | 1.686 | 18.4 | −15.48 |
| 5 | | 4.959 | (ASP) | 0.502 | | | | |
| 6 | Lens 3 | 15.857 | (ASP) | 0.253 | Plastic | 1.686 | 18.4 | −189.11 |
| 7 | | 14.038 | (ASP) | 0.149 | | | | |
| 8 | Lens 4 | −405.239 | (ASP) | 0.493 | Plastic | 1.544 | 56.0 | 128.07 |
| 9 | | −59.477 | (ASP) | 0.242 | | | | |
| 10 | Lens 5 | −80.706 | (ASP) | 0.429 | Plastic | 1.544 | 56.0 | 15.55 |
| 11 | | −7.671 | (ASP) | 0.068 | | | | |
| 12 | Lens 6 | −7.959 | (ASP) | 0.363 | Plastic | 1.566 | 37.4 | −17.25 |
| 13 | | −43.717 | (ASP) | 0.555 | | | | |
| 14 | Lens 7 | 9.881 | (ASP) | 0.470 | Plastic | 1.584 | 28.2 | −24.77 |
| 15 | | 5.769 | (ASP) | 0.278 | | | | |
| 16 | Lens 8 | 3.922 | (ASP) | 0.819 | Plastic | 1.544 | 56.0 | 6.77 |
| 17 | | −55.685 | (ASP) | 0.654 | | | | |
| 18 | Lens 9 | −7.700 | (ASP) | 0.703 | Plastic | 1.534 | 55.9 | −4.88 |
| 19 | | 4.065 | (ASP) | −0.100 | | | | |
| 20 | Stop | Plano | | 0.600 | | | | |
| 21 | Filter | Plano | | 0.210 | Glass | 1.517 | 64.2 | — |
| 22 | | Plano | | 0.297 | | | | |
| 23 | Image | Plano | | — | | | | |

Note:
Reference wavelength is 587.6 nm (d-line).
An effective radius of the stop 501 (Surface 20) is 5.520 mm.

TABLE 10

Aspheric Coefficients

| Surface # | 2 | 3 | 4 | 5 | 6 |
|---|---|---|---|---|---|
| k = | −5.6566E−01 | −2.8885E+01 | −7.2532E−02 | 2.0743E+00 | −2.4328E+01 |
| A4 = | 7.8347E−04 | −2.0682E−02 | −3.1599E−02 | −3.0049E−02 | −3.5614E−02 |
| A6 = | 7.7926E−03 | 4.7768E−02 | 5.8956E−02 | 5.1760E−02 | 1.9640E−02 |
| A8 = | −6.2103E−03 | −4.6383E−02 | −5.0433E−02 | −4.9917E−02 | −2.5961E−02 |

TABLE 10-continued

Aspheric Coefficients

| A10 = | 3.5498E−03 | 2.5191E−02 | 2.3485E−02 | 2.5983E−02 | 1.7139E−02 |
|---|---|---|---|---|---|
| A12 = | −1.3221E−03 | −7.7392E−03 | −5.4609E−03 | −6.5142E−03 | −4.3544E−03 |
| A14 = | 2.9667E−04 | 1.2632E−03 | 5.0984E−04 | 6.4891E−04 | 3.1580E−04 |
| A16 = | −2.9511E−05 | −8.6834E−05 | — | — | — |

| Surface # | 7 | 8 | 9 | 10 | 11 |
|---|---|---|---|---|---|
| k = | 1.6020E+01 | −1.0000E+00 | 9.9000E+01 | −1.0000E+00 | 5.6670E+00 |
| A4 = | −2.3027E−02 | 1.3072E−03 | 1.5176E−02 | 1.6900E−03 | 8.4922E−02 |
| A6 = | −5.5014E−03 | 3.2335E−03 | −5.5038E−02 | 2.4326E−02 | −1.1423E−01 |
| A8 = | 5.6989E−03 | −3.1522E−02 | 4.9814E−02 | −1.3324E−01 | 6.6483E−02 |
| A10 = | −2.3741E−03 | 3.9362E−02 | −2.4750E−02 | 1.6963E−01 | −2.3474E−02 |
| A12 = | 1.2774E−03 | −2.4872E−02 | 5.4420E−03 | −1.1434E−01 | 5.4765E−03 |
| A14 = | −2.3632E−04 | 8.2524E−03 | −8.6327E−06 | 4.5620E−02 | −8.1761E−04 |
| A16 = | — | −1.2604E−03 | −1.5404E−04 | −1.0723E−02 | 6.9555E−05 |
| A18 = | — | 6.1693E−05 | 1.4423E−05 | 1.3724E−03 | −2.5281E−06 |
| A20 = | — | — | — | −7.3931E−05 | — |

| Surface # | 12 | 13 | 14 | 15 | 16 |
|---|---|---|---|---|---|
| k = | 4.2117E+00 | −1.0000E+00 | −3.8796E+00 | −3.5986E+01 | −1.1267E+00 |
| A4 = | 3.4093E−02 | −2.7692E−02 | 1.0717E−02 | −2.8509E−03 | −3.0912E−02 |
| A6 = | −7.6456E−02 | −1.6328E−02 | −2.8055E−02 | −1.8493E−02 | −4.6032E−03 |
| A8 = | 6.0197E−02 | 2.3275E−02 | 1.5339E−02 | 1.0854E−02 | 2.9246E−03 |
| A10 = | −2.6960E−02 | −1.2813E−02 | −4.8952E−03 | −3.3441E−03 | −8.1422E−04 |
| A12 = | 7.6290E−03 | 3.8901E−03 | 8.4051E−04 | 5.7224E−04 | 1.6519E−04 |
| A14 = | −1.3463E−03 | −6.8148E−04 | −7.5709E−05 | −5.4250E−05 | −2.3768E−05 |
| A16 = | 1.3407E−04 | 6.8282E−05 | 3.3212E−06 | 2.6698E−06 | 2.1385E−06 |
| A18 = | −5.6937E−06 | −3.6191E−06 | −5.3791E−08 | −5.3626E−08 | −1.0461E−07 |
| A20 = | — | 7.8024E−08 | — | 2.9645E−11 | 2.1081E−09 |

| Surface # | 17 | 18 | 19 |
|---|---|---|---|
| k = | −1.0000E+00 | −2.2746E−01 | −1.0293E+00 |
| A4 = | 9.1996E−03 | −4.0964E−02 | −3.7444E−02 |
| A6 = | −9.8767E−03 | 1.1439E−02 | 6.5158E−03 |
| A8 = | 2.6064E−03 | −2.0935E−03 | −7.5004E−04 |
| A10 = | −4.3533E−04 | 2.7829E−04 | 5.2996E−05 |
| A12 = | 5.5892E−05 | −2.4700E−05 | −2.0772E−06 |
| A14 = | −5.7354E−06 | 1.4029E−06 | 2.6723E−08 |
| A16 = | 4.1194E−07 | −4.8901E−08 | 1.0583E−09 |
| A18 = | −1.7038E−08 | 9.5275E−10 | −4.4908E−11 |
| A20 = | 2.9689E−10 | −7.9459E−12 | 4.9510E−13 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | |
|---|---|
| f [mm] | 6.88 |
| Fno | 1.86 |
| HFOV [deg.] | 40.8 |
| V6 | 37.4 |
| V7 | 28.2 |
| Vmin | 18.4 |
| Nmax | 1.686 |
| V1/N1 | 36.31 |
| V2/N2 | 10.91 |
| V3/N3 | 10.91 |
| V4/N4 | 36.27 |
| V5/N5 | 36.27 |
| V6/N6 | 23.88 |
| V7/N7 | 17.80 |
| V8/N8 | 36.27 |

-continued

| 5th Embodiment | |
|---|---|
| V9/N9 | 36.44 |
| (Vi/Ni)min | 10.91 |
| (V2 + V3)/V1 | 0.66 |
| CTmax/CTmin | 3.64 |
| ΣCT/ΣAT | 1.86 |
| ΣAT/(T23 + T89) | 2.19 |
| ImgH/CTmax | 6.51 |
| (Rao + Rai)/(Rao − Rai) | 1.32 |
| (R17 + R18)/(R17 − R18) | 0.31 |
| |R17/R18| | 1.89 |
| f/f8 | 1.23 |
| (|P2| + |P3| + |P4| + |P5| + |P6| + |P7|)/ (|P1| + |P8| + |P9|) | 1.02 |
| (TD × BL)/(ImgH × ImgH) | 0.45 |
| BL/TD | 0.20 |
| ImgH/BL | 0.14 |
| EPD/BL | 5.96 |
| f/EPD | 3.67 |
| Y92/Y31 | 1.86 |
| Yc72/f | 3.49 |
| Yc82/f | 0.18 |
| Yc92/f | 0.29 |
| SL/TL | 0.91 |
| TL/f | 1.20 |
| TL/ImgH | 1.38 |
| ImgH [mm] | 6.00 |
| TL [mm] | 8.25 |

-continued

| 5th Embodiment | |
|---|---|
| \|f/R1\| + \|f/R2\| | 3.16 |
| \|f/R3\| + \|f/R4\| | 2.11 |
| \|f/R5\| + \|f/R6\| | 0.92 |
| \|f/R7\| + \|f/R8\| | 0.13 |
| \|f/R9\| + \|f/R10\| | 0.98 |
| \|f/R11\| + \|f/R12\| | 1.02 |
| \|f/R13\| + \|f/R14\| | 1.89 |
| \|f/R15\| + \|f/R16\| | 1.88 |
| \|f/R17\| + \|f/R18\| | 2.59 |

6th Embodiment

Figure 11:
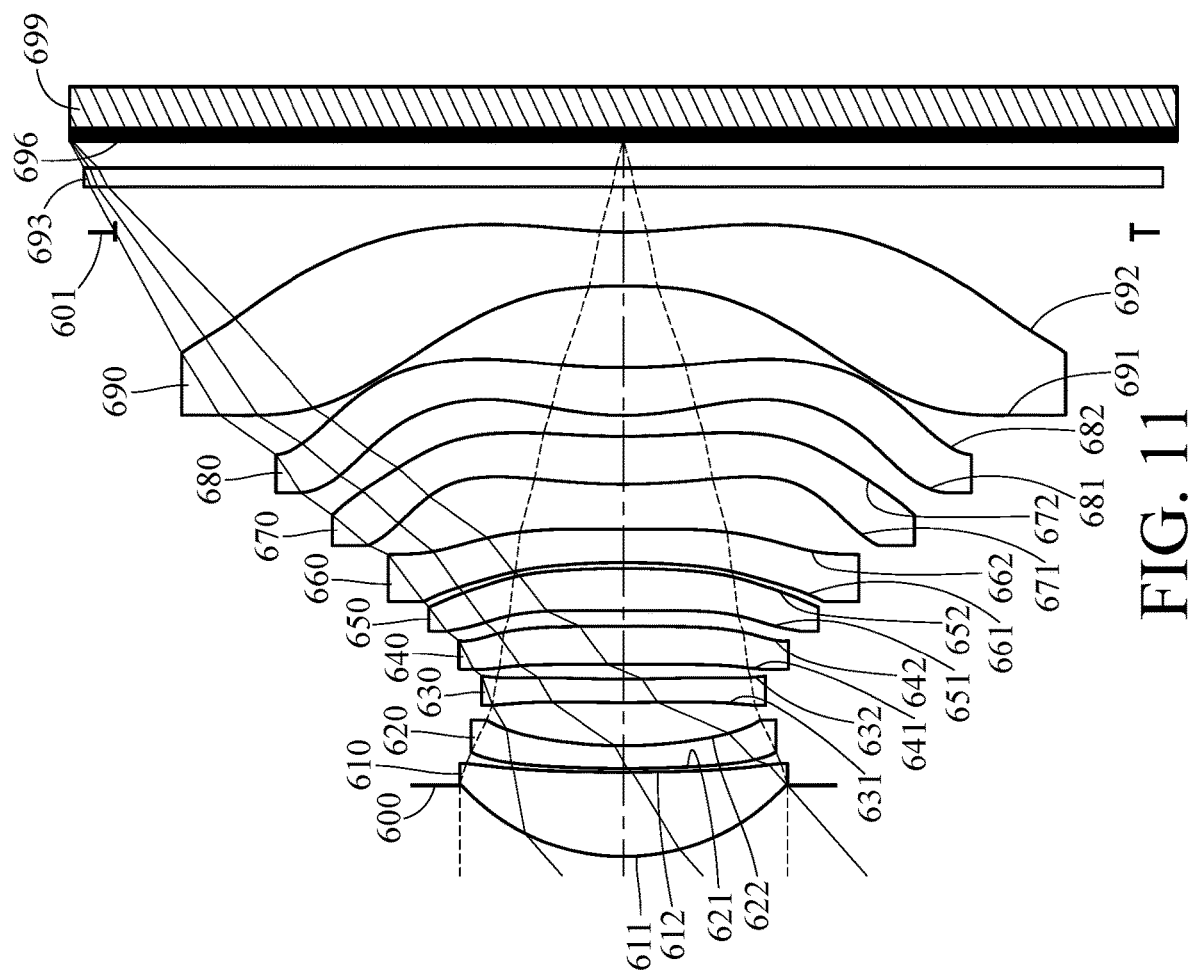
FIG. 11 is a schematic view of an image capturing unit according to the 6th embodiment of the present disclosure.
Figure 12:
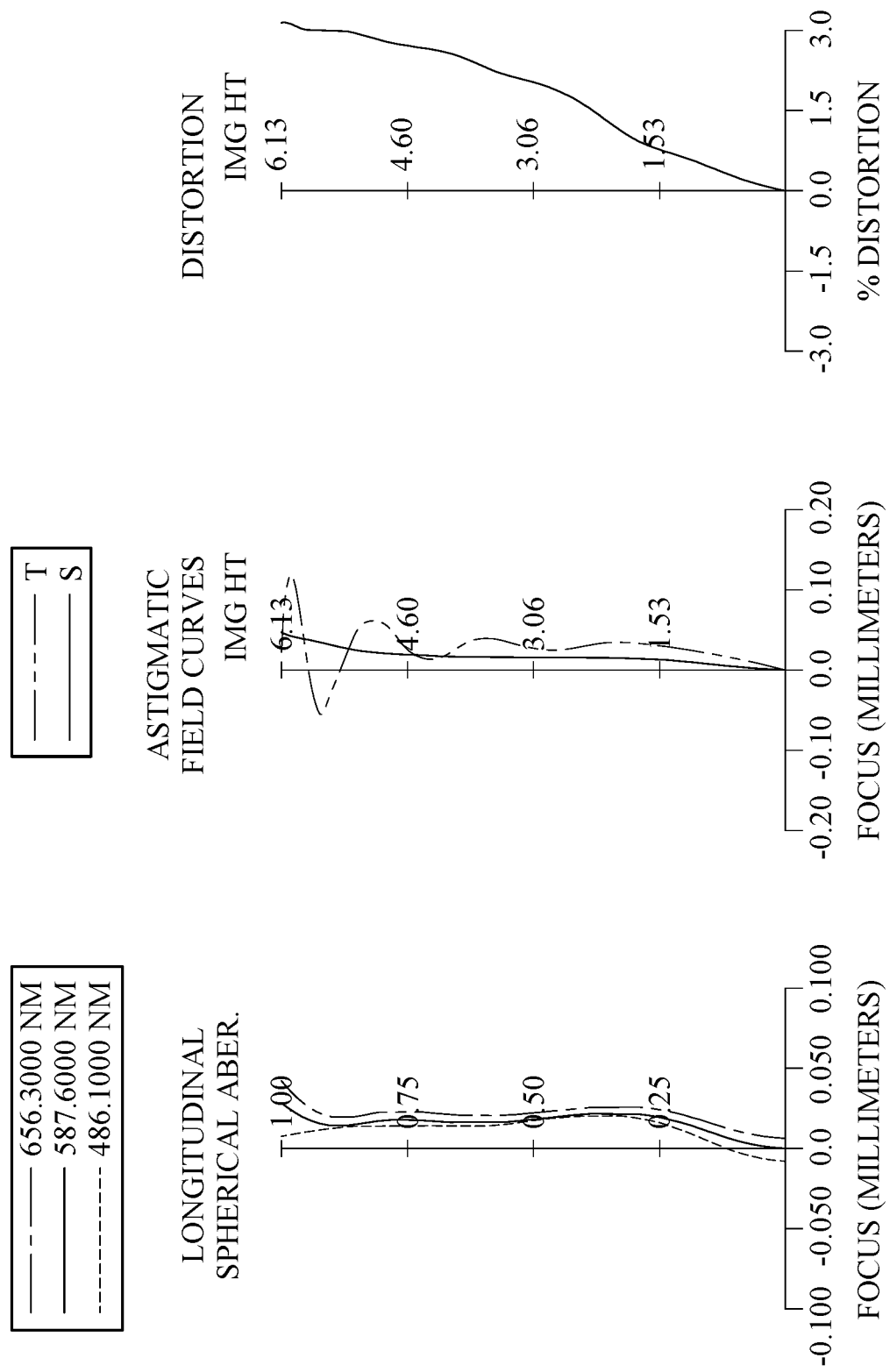
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging optical lens assembly (its reference numeral is omitted) of the present disclosure and an image sensor 699. The imaging optical lens assembly includes, in order from an object side to an image side along an optical path, an aperture stop 600, a first lens element 610, a second lens element 620, a third lens element 630, a fourth lens element 640, a fifth lens element 650, a sixth lens element 660, a seventh lens element 670, an eighth lens element 680, a ninth lens element 690, a stop 601, a filter 693 and an image surface 696. In addition, the imaging optical lens assembly has a configuration of a first lens group (the first lens element 610, the second lens element 620 and the third lens element 630), a second lens group (the fourth lens element 640, the fifth lens element 650 and the sixth lens element 660) and a third lens group (the seventh lens element 670, the eighth lens element 680 and the ninth lens element 690). The imaging optical lens assembly includes nine lens elements (610, 620, 630, 640, 650, 660, 670, 680 and 690) with no additional lens element disposed between each of the adjacent nine lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has one inflection point. The image-side surface 612 of the first lens element 610 has one inflection point.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has one inflection point. The image-side surface 632 of the third lens element 630 has two inflection points.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has three inflection points. The image-side surface 642 of the fourth lens element 640 has one inflection point.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric. The object-side surface 651 of the fifth lens element 650 has three inflection points.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has three inflection points.

The seventh lens element 670 with positive refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has two inflection points. The image-side surface 672 of the seventh lens element 670 has one inflection point. The object-side surface 671 of the seventh lens element 670 has at least one critical point in an off-axis region thereof. The image-side surface 672 of the seventh lens element 670 has at least one critical point in an off-axis region thereof.

The eighth lens element 680 with positive refractive power has an object-side surface 681 being convex in a paraxial region thereof and an image-side surface 682 being concave in a paraxial region thereof. The eighth lens element 680 is made of plastic material and has the object-side surface 681 and the image-side surface 682 being both aspheric. The object-side surface 681 of the eighth lens element 680 has two inflection points. The image-side surface 682 of the eighth lens element 680 has two inflection points. The object-side surface 681 of the eighth lens element 680 has at least one critical point in an off-axis region thereof. The image-side surface 682 of the eighth lens element 680 has at least one critical point in an off-axis region thereof.

The ninth lens element 690 with negative refractive power has an object-side surface 691 being concave in a paraxial region thereof and an image-side surface 692 being concave in a paraxial region thereof. The ninth lens element 690 is made of plastic material and has the object-side surface 691 and the image-side surface 692 being both aspheric. The object-side surface 691 of the ninth lens element 690 has two inflection points. The image-side surface 692 of the ninth lens element 690 has three inflection points. The object-side surface 691 of the ninth lens element 690 has at least one critical point in an off-axis region thereof. The image-side surface 692 of the ninth lens element 690 has at least one critical point in an off-axis region thereof.

The filter 693 is made of glass material and located between the stop 601 and the image surface 696, and will not affect the focal length of the imaging optical lens assembly. The image sensor 699 is disposed on or near the image surface 696 of the imaging optical lens assembly.

The detailed optical data of the 6th embodiment are shown in Table 11 and the aspheric surface data are shown in Table 12 below.

TABLE 11

6th Embodiment f = 6.76 mm, Fno = 1.86, HFOV = 41.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.785 | | | | |
| 2 | Lens 1 | 2.505 | (ASP) | 0.933 | Plastic | 1.545 | 56.1 | 5.23 |
| 3 | | 17.920 | (ASP) | 0.041 | | | | |
| 4 | Lens 2 | 12.455 | (ASP) | 0.251 | Plastic | 1.646 | 21.9 | −13.18 |
| 5 | | 5.018 | (ASP) | 0.479 | | | | |
| 6 | Lens 3 | 16.677 | (ASP) | 0.259 | Plastic | 1.686 | 18.4 | −84.07 |
| 7 | | 12.855 | (ASP) | 0.165 | | | | |
| 8 | Lens 4 | −491.876 | (ASP) | 0.429 | Plastic | 1.544 | 56.0 | 87.72 |
| 9 | | −43.516 | (ASP) | 0.172 | | | | |
| 10 | Lens 5 | 333.211 | (ASP) | 0.469 | Plastic | 1.544 | 56.0 | 12.78 |
| 11 | | −7.099 | (ASP) | 0.066 | | | | |
| 12 | Lens 6 | −7.891 | (ASP) | 0.363 | Plastic | 1.554 | 35.0 | −10.38 |
| 13 | | 21.604 | (ASP) | 0.502 | | | | |
| 14 | Lens 7 | 6.624 | (ASP) | 0.532 | Plastic | 1.548 | 39.2 | 61.68 |
| 15 | | 8.003 | (ASP) | 0.232 | | | | |
| 16 | Lens 8 | 3.262 | (ASP) | 0.530 | Plastic | 1.544 | 56.0 | 9.59 |
| 17 | | 8.204 | (ASP) | 0.912 | | | | |
| 18 | Lens 9 | −6.658 | (ASP) | 0.593 | Plastic | 1.544 | 56.0 | −5.04 |
| 19 | | 4.800 | (ASP) | 0.000 | | | | |
| 20 | Stop | Plano | | 0.500 | | | | |
| 21 | Filter | Plano | | 0.210 | Glass | 1.517 | 64.2 | — |
| 22 | | Plano | | 0.297 | | | | |
| 23 | Image | Plano | | — | | | | |

Note:
Reference wavelength is 587.6 nm (d-line).
An effective radius of the stop 601 (Surface 20) is 5.633 mm.

TABLE 12

Aspheric Coefficients

| Surface # | 2 | 3 | 4 | 5 | 6 |
|---|---|---|---|---|---|
| k = | −4.2514E−01 | −4.2798E+01 | 4.7007E+00 | 5.9287E+00 | −1.9943E+00 |
| A4 = | 3.6413E−03 | −1.8837E−02 | −2.8574E−02 | −1.8532E−02 | −3.0235E−02 |
| A6 = | 4.4101E−03 | 3.1865E−02 | 4.1120E−02 | 1.7663E−02 | −8.7917E−04 |
| A8 = | −4.7617E−03 | −2.4109E−02 | −2.8055E−02 | −1.2143E−02 | 3.1668E−03 |
| A10 = | 3.7700E−03 | 1.1450E−02 | 1.2056E−02 | 6.0962E−03 | −1.4812E−04 |
| A12 = | −1.6575E−03 | −3.3676E−03 | −2.8380E−03 | −1.6337E−03 | 9.7768E−05 |
| A14 = | 3.9405E−04 | 5.5462E−04 | 2.9313E−04 | 2.0963E−04 | −8.7820E−06 |
| A16 = | −4.0174E−05 | −3.9948E−05 | — | — | — |

| Surface # | 7 | 8 | 9 | 10 | 11 |
|---|---|---|---|---|---|
| k = | 2.8002E+01 | −1.0000E+00 | −1.0000E+00 | 5.0000E+01 | 5.3774E+00 |
| A4 = | −2.2983E−02 | 6.6636E−03 | 5.9346E−03 | 4.8149E−03 | 7.1720E−02 |
| A6 = | −6.3157E−03 | −1.8528E−02 | −3.0748E−02 | −3.2740E−02 | −9.1574E−02 |
| A8 = | 3.4971E−03 | 1.3463E−02 | 2.3970E−02 | 3.0366E−03 | 4.8857E−02 |
| A10 = | 1.9787E−03 | −1.4718E−02 | −1.4117E−02 | 1.5502E−02 | −1.5815E−02 |
| A12 = | −9.5712E−04 | 1.2435E−02 | 5.6237E−03 | −1.3653E−02 | 3.6734E−03 |
| A14 = | 1.1995E−04 | −6.1043E−03 | −1.5411E−03 | 5.8386E−03 | −6.1805E−04 |
| A16 = | | 1.5963E−03 | 2.9551E−04 | −1.3631E−03 | 6.4632E−05 |
| A18 = | | −1.6778E−04 | −2.6993E−05 | 1.6491E−04 | −2.9962E−06 |
| A20 = | | | | −8.1195E−06 | |

| Surface # | 12 | 13 | 14 | 15 | 16 |
|---|---|---|---|---|---|
| k = | 6.2543E+00 | −9.9000E+01 | −7.3505E+00 | −4.7225E+01 | −1.1384E+00 |
| A4 = | 3.1357E−02 | −4.4985E−03 | −5.0216E−03 | −1.3526E−02 | −3.1120E−02 |
| A6 = | −6.0454E−02 | 5.5609E−03 | −8.7827E−03 | −3.7735E−03 | −1.4005E−03 |
| A8 = | 4.4067E−02 | 6.7002E−03 | 3.3292E−03 | 1.8173E−03 | −7.2103E−04 |
| A10 = | −1.8843E−02 | −4.7063E−03 | −6.8254E−04 | −2.9290E−04 | 7.3650E−04 |
| A12 = | 5.1562E−03 | 1.3455E−03 | 3.3296E−06 | −3.6305E−05 | −1.8641E−04 |
| A14 = | −8.7339E−04 | −1.8030E−04 | 1.7690E−05 | 2.0012E−05 | 2.2754E−05 |

TABLE 12-continued

| Aspheric Coefficients | | | | | |
|---|---|---|---|---|---|
| A16 = | 8.1885E−05 | 8.6209E−06 | −2.1275E−06 | −2.8240E−06 | −1.4741E−06 |
| A18 = | −3.2066E−06 | 3.0349E−07 | 7.5260E−08 | 1.7454E−07 | 4.8528E−08 |
| A20 = | — | −3.1338E−08 | — | −4.0843E−09 | −6.3461E−10 |

| Surface # | 17 | 18 | 19 |
|---|---|---|---|
| k = | −9.9143E+00 | 1.5179E−18 | −1.0000E+00 |
| A4 = | 9.6782E−03 | −4.1954E−02 | −4.6329E−02 |
| A6 = | −1.2874E−02 | 1.1212E−02 | 1.0190E−02 |
| A8 = | 3.2780E−03 | −1.8167E−03 | −1.4811E−03 |
| A10 = | −3.7476E−04 | 2.0362E−04 | 1.2679E−04 |
| A12 = | 1.0661E−05 | −1.4909E−05 | −5.7602E−06 |
| A14 = | 1.8224E−06 | 6.8503E−07 | 8.0254E−08 |
| A16 = | −2.0235E−07 | −1.8767E−08 | 3.8986E−09 |
| A18 = | 8.2071E−09 | 2.7400E−10 | −1.7613E−10 |
| A20 = | −1.2390E−10 | −1.5701E−12 | 2.0931E−12 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | |
|---|---|
| f [mm] | 6.76 |
| Fno | 1.86 |
| HFOV [deg.] | 41.3 |
| V6 | 35.0 |
| V7 | 39.2 |
| Vmin | 18.4 |
| Nmax | 1.686 |
| V1/N1 | 36.31 |
| V2/N2 | 13.30 |
| V3/N3 | 10.91 |
| V4/N4 | 36.27 |
| V5/N5 | 36.27 |
| V6/N6 | 22.51 |
| V7/N7 | 25.32 |
| V8/N8 | 36.27 |
| V9/N9 | 36.27 |
| (Vi/Ni)min | 10.91 |
| (V2 + V3)/V1 | 0.72 |
| CTmax/CTmin | 3.71 |
| ΣCT/ΣAT | 1.70 |
| ΣAT/(T23 + T89) | 1.85 |
| ImgH/CTmax | 6.57 |
| (Rao + Rai)/(Rao − Rai) | 0.10 |
| (R17 + R18)/(R17 − R18) | 0.16 |
| |R17/R18| | 1.39 |
| f/f1 | 1.29 |
| f/f8 | 0.70 |
| (|P2| + |P3| + |P4| + |P5| + |P6| + |P7|)/(|P1| + |P8| + |P9|) | 0.59 |
| (TD × BL)/(ImgH × ImgH) | 0.19 |
| BL/TD | 0.15 |
| ImgH/BL | 6.09 |
| EPD/BL | 3.61 |
| f/EPD | 1.86 |
| Y92/Y31 | 3.35 |
| Yc72/f | 0.17 |
| Yc82/f | 0.23 |
| Yc92/f | 0.22 |
| SL/TL | 0.90 |
| TL/f | 1.17 |
| TL/ImgH | 1.29 |
| ImgH [mm] | 6.13 |

| 6th Embodiment | |
|---|---|
| TL [mm] | 7.94 |
| |f/R1| + |f/R2| | 3.07 |
| |f/R3| + |f/R4| | 1.89 |
| |f/R5| + |f/R6| | 0.93 |
| |f/R7| + |f/R8| | 0.17 |
| |f/R9| + |f/R10| | 0.97 |
| |f/R11| + |f/R12| | 1.17 |
| |f/R13| + |f/R14| | 1.86 |
| |f/R15| + |f/R16| | 2.89 |
| |f/R17| + |f/R18| | 2.42 |

7th Embodiment

Figure 13:
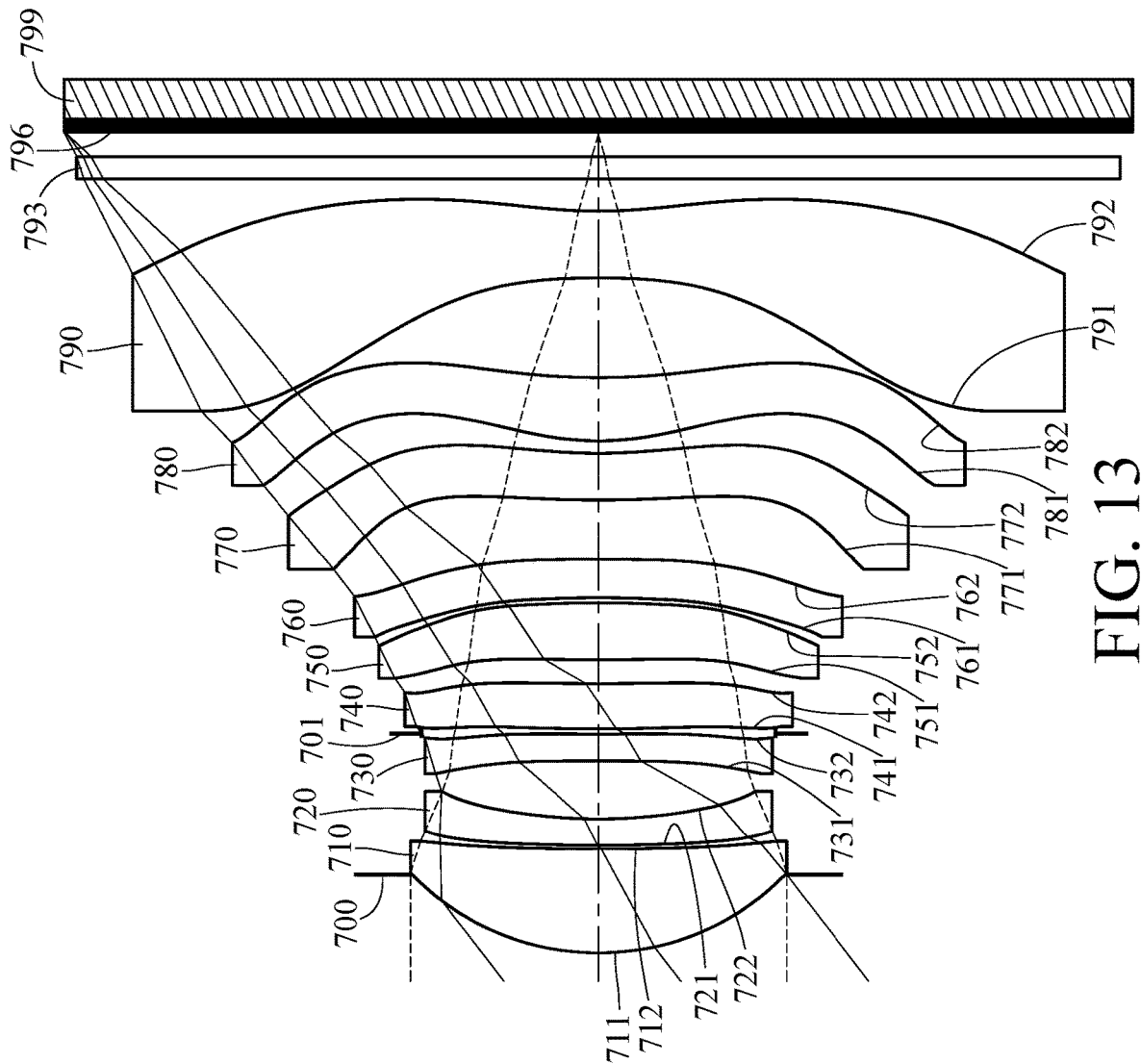
FIG. 13 is a schematic view of an image capturing unit according to the 7th embodiment of the present disclosure.
Figure 14:
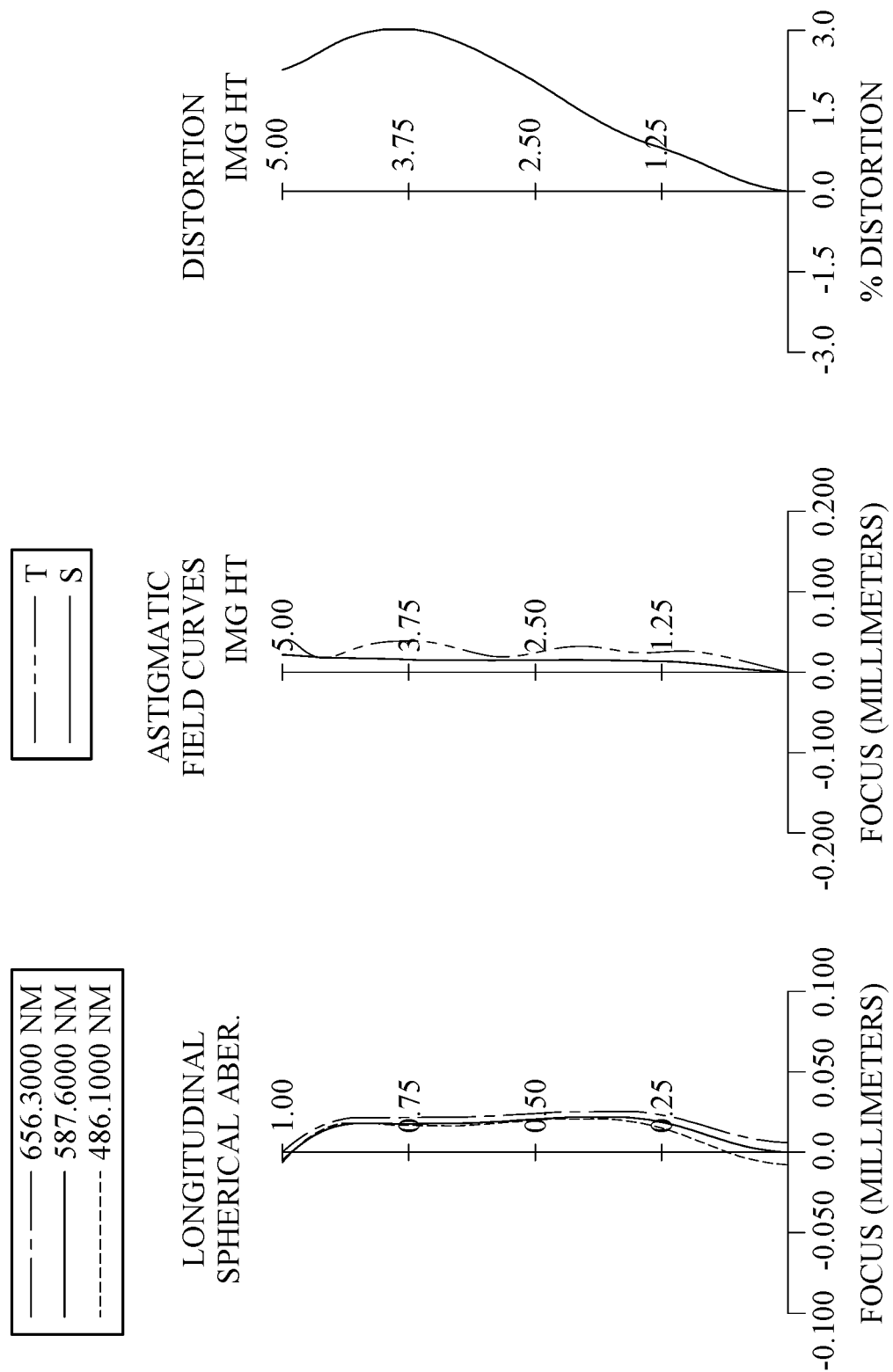
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging optical lens assembly (its reference numeral is omitted) of the present disclosure and an image sensor 799. The imaging optical lens assembly includes, in order from an object side to an image side along an optical path, an aperture stop 700, a first lens element 710, a second lens element 720, a third lens element 730, a stop 701, a fourth lens element 740, a fifth lens element 750, a sixth lens element 760, a seventh lens element 770, an eighth lens element 780, a ninth lens element 790, a filter 793 and an image surface 796. In addition, the imaging optical lens assembly has a configuration of a first lens group (the first lens element 710, the second lens element 720 and the third lens element 730), a second lens group (the fourth lens element 740, the fifth lens element 750 and the sixth lens element 760) and a third lens group (the seventh lens element 770, the eighth lens element 780 and the ninth lens element 790). The imaging optical lens assembly includes nine lens elements (710, 720, 730, 740, 750, 760, 770, 780 and 790) with no additional lens element disposed between each of the adjacent nine lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has one inflection point. The image-side surface 712 of the first lens element 710 has one inflection point.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric. The image-side surface 732 of the third lens element 730 has two inflection points.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has two inflection points. The image-side surface 742 of the fourth lens element 740 has two inflection points.

The fifth lens element 750 with positive refractive power has an object-side surface 751 being convex in a paraxial region thereof and an image-side surface 752 being convex in a paraxial region thereof. The fifth lens element 750 is made of plastic material and has the object-side surface 751 and the image-side surface 752 being both aspheric. The object-side surface 751 of the fifth lens element 750 has three inflection points.

The sixth lens element 760 with negative refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. The image-side surface 762 of the sixth lens element 760 has one inflection point.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has two inflection points. The image-side surface 772 of the seventh lens element 770 has one inflection point. The object-side surface 771 of the seventh lens element 770 has at least one critical point in an off-axis region thereof. The image-side surface 772 of the seventh lens element 770 has at least one critical point in an off-axis region thereof.

The eighth lens element 780 with positive refractive power has an object-side surface 781 being convex in a paraxial region thereof and an image-side surface 782 being concave in a paraxial region thereof. The eighth lens element 780 is made of plastic material and has the object-side surface 781 and the image-side surface 782 being both aspheric. The object-side surface 781 of the eighth lens element 780 has two inflection points. The image-side surface 782 of the eighth lens element 780 has two inflection points. The object-side surface 781 of the eighth lens element 780 has at least one critical point in an off-axis region thereof. The image-side surface 782 of the eighth lens element 780 has at least one critical point in an off-axis region thereof.

The ninth lens element 790 with negative refractive power has an object-side surface 791 being concave in a paraxial region thereof and an image-side surface 792 being concave in a paraxial region thereof. The ninth lens element 790 is made of plastic material and has the object-side surface 791 and the image-side surface 792 being both aspheric. The object-side surface 791 of the ninth lens element 790 has one inflection point. The image-side surface 792 of the ninth lens element 790 has two inflection points. The image-side surface 792 of the ninth lens element 790 has at least one critical point in an off-axis region thereof.

The filter 793 is made of glass material and located between the ninth lens element 790 and the image surface 796, and will not affect the focal length of the imaging optical lens assembly. The image sensor 799 is disposed on or near the image surface 796 of the imaging optical lens assembly.

The detailed optical data of the 7th embodiment are shown in Table 13 and the aspheric surface data are shown in Table 14 below.

TABLE 13

7th Embodiment f = 6.32 mm, Fno = 1.79, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.735 | | | | |
| 2 | Lens 1 | 2.503 | (ASP) | 0.976 | Plastic | 1.545 | 56.1 | 5.07 |
| 3 | | 22.894 | (ASP) | 0.033 | | | | |
| 4 | Lens 2 | 14.208 | (ASP) | 0.251 | Plastic | 1.660 | 20.3 | −12.37 |
| 5 | | 5.031 | (ASP) | 0.547 | | | | |
| 6 | Lens 3 | −169.609 | (ASP) | 0.252 | Plastic | 1.686 | 18.4 | −54.53 |
| 7 | | 48.034 | (ASP) | 0.005 | | | | |
| 8 | Stop | Plano | | 0.043 | | | | |
| 9 | Lens 4 | 20.932 | (ASP) | 0.424 | Plastic | 1.544 | 56.0 | 126.61 |
| 10 | | 29.854 | (ASP) | 0.224 | | | | |
| 11 | Lens 5 | 39.023 | (ASP) | 0.535 | Plastic | 1.544 | 56.0 | 12.07 |
| 12 | | −7.860 | (ASP) | 0.047 | | | | |
| 13 | Lens 6 | −9.952 | (ASP) | 0.360 | Plastic | 1.566 | 37.4 | −21.13 |
| 14 | | −77.925 | (ASP) | 0.560 | | | | |

TABLE 13-continued

| 7th Embodiment |
| --- |
| f = 6.32 mm, Fno = 1.79, HFOV = 37.7 deg. |

| Surface # | | Curvature Radius | | Thickness | | Material | Index | Abbe # | Focal Length |
|---|---|---|---|---|---|---|---|---|---|
| 15 | Lens 7 | 12.114 | (ASP) | 0.438 | | Plastic | 1.584 | 28.2 | −16.61 |
| 16 | | 5.306 | (ASP) | 0.117 | | | | | |
| 17 | Lens 8 | 2.589 | (ASP) | 0.592 | | Plastic | 1.544 | 56.0 | 7.51 |
| 18 | | 6.498 | (ASP) | 0.938 | | | | | |
| 19 | Lens 9 | −7.440 | (ASP) | 0.631 | | Plastic | 1.534 | 55.9 | −5.14 |
| 20 | | 4.593 | (ASP) | 0.300 | | | | | |
| 21 | Filter | Plano | | 0.210 | | Glass | 1.517 | 64.2 | — |
| 22 | | Plano | | 0.229 | | | | | |
| 23 | Image | Plano | | — | | | | | |

Note:
Reference wavelength is 587.6 nm (d-line).
An effective radius of the stop 701 (Surface 8) is 1.660 mm.

TABLE 14

| Aspheric Coefficients | | | | | |
|---|---|---|---|---|---|
| Surface # | 2 | 3 | 4 | 5 | 6 |
| k = | −4.2755E−01 | −4.8898E+01 | 4.2225E+00 | 5.9620E+00 | −5.9658E−13 |
| A4 = | 3.6966E−03 | −2.1010E−02 | −3.0108E−02 | −1.6998E−02 | −3.3870E−02 |
| A6 = | 4.1358E−03 | 3.8403E−02 | 4.7308E−02 | 1.6734E−02 | 5.6808E−03 |
| A8 = | −4.6371E−03 | −3.0628E−02 | −3.5446E−02 | −1.2434E−02 | −4.6171E−03 |
| A10 = | 3.8321E−03 | 1.4209E−02 | 1.5654E−02 | 6.1221E−03 | 4.0130E−03 |
| A12 = | −1.7263E−03 | −3.8348E−03 | −3.5866E−03 | −1.4537E−03 | −8.8937E−04 |
| A14 = | 4.1340E−04 | 5.6283E−04 | 3.4595E−04 | 1.6637E−04 | −8.4132E−07 |
| A16 = | −4.1935E−05 | −3.6671E−05 | — | — | — |
| Surface # | 7 | 9 | 10 | 11 | 12 |
| k = | 3.0000E+01 | −1.0000E+00 | −9.9000E+01 | 1.4279E+01 | 6.1207E+00 |
| A4 = | 2.3513E−02 | 6.9977E−03 | 9.0344E−03 | 1.5867E−02 | 7.6919E−02 |
| A6 = | 2.3329E−03 | −2.2901E−02 | −5.5045E−02 | −5.6421E−02 | −1.0500E−01 |
| A8 = | −9.6102E−03 | 2.1692E−02 | 6.7738E−02 | 3.4842E−02 | 5.8585E−02 |
| A10 = | 1.0289E−02 | −2.2914E−02 | −5.4741E−02 | −8.2044E−03 | −2.0742E−02 |
| A12 = | −3.3384E−03 | 1.6868E−02 | 2.7377E−02 | −4.1396E−03 | 5.6963E−03 |
| A14 = | 3.7611E−04 | 7.2294E−03 | −8.3095E−03 | 4.0743E−03 | −1.1996E−03 |
| A16 = | — | 1.6724E−03 | 1.4346E−03 | −1.3764E−03 | 1.5820E−04 |
| A18 = | — | −1.5948E−04 | −1.0738E−04 | 2.2057E−04 | −9.1436E−06 |
| A20 = | — | — | — | −1.4145E−05 | — |
| Surface # | 13 | 14 | 15 | 16 | 17 |
| k = | 8.4416E+00 | −9.3483E+01 | −9.6058E+00 | −2.4068E+01 | −1.1910E+00 |
| A4 = | 2.5851E−02 | −4.8406E−02 | −3.2552E−04 | −8.4967E−03 | −4.3133E−02 |
| A6 = | −4.7490E−02 | 2.4994E−02 | −1.4737E−02 | −1.5834E−02 | 6.1063E−03 |
| A8 = | 2.4107E−02 | −1.1885E−02 | 7.7532E−03 | 1.1652E−02 | −3.2826E−03 |
| A10 = | −5.0222E−03 | 5.2554E−03 | −2.7888E−03 | −4.7453E−03 | 1.4425E−03 |
| A12 = | 1.0524E−04 | −2.1887E−03 | 5.2767E−04 | 1.1600E−03 | −3.5561E−04 |
| A14 = | 1.3193E−04 | 6.5724E−04 | −4.8863E−05 | −1.7615E−04 | 5.1315E−05 |
| A16 = | −1.9687E−05 | −1.1683E−04 | 1.8217E−06 | 1.6545E−05 | −4.3738E−06 |
| A18 = | 7.4792E−07 | 1.0924E−05 | −1.3255E−09 | −8.8668E−07 | 2.0543E−07 |
| A20 = | — | −4.1656E−07 | — | 2.0716E−08 | −4.1044E−09 |
| Surface # | 18 | | 19 | | 20 |
| k = | −7.0105E+00 | | −2.1331E−10 | | −1.0171E+00 |
| A4 = | 5.2858E−03 | | −4.3121E−02 | | −4.2910E−02 |
| A6 = | −6.2850E−03 | | 1.2152E−02 | | 9.7400E−03 |
| A8 = | −3.5610E−04 | | −2.3135E−03 | | −1.6249E−03 |
| A10 = | 7.4810E−04 | | 3.3767E−04 | | 1.9260E−04 |
| A12 = | −2.0849E−04 | | −3.4522E−05 | | −1.6181E−05 |
| A14 = | 2.9122E−05 | | 2.3409E−06 | | 9.4164E−07 |
| A16 = | −2.2861E−06 | | −9.9771E−08 | | −3.5938E−08 |
| A18 = | 9.6336E−08 | | 2.4120E−09 | | 8.0434E−10 |
| A20 = | −1.6962E−09 | | −2.5178E−11 | | −7.9514E−12 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | |
| --- | --- |
| f [mm] | 6.32 |
| Fno | 1.79 |
| HFOV [deg.] | 37.7 |
| V6 | 39.7 |
| V7 | 34.0 |
| Vmin | 18.4 |
| Nmax | 1.686 |
| V1/N1 | 36.31 |
| V2/N2 | 14.06 |
| V3/N3 | 10.91 |
| V4/N4 | 36.27 |
| V5/N5 | 36.27 |
| V6/N6 | 25.76 |
| V7/N7 | 21.49 |
| V8/N8 | 36.27 |
| V9/N9 | 35.21 |
| (Vi/Ni)min | 10.91 |
| (V2 + V3)/V1 | 0.74 |
| CTmax/CTmin | 3.90 |
| ΣCT/ΣAT | 1.77 |
| ΣAT/(T23 + T89) | 1.69 |
| ImgH/CTmax | 5.12 |
| (Rao + Rai)/(Rao − Rai) | −0.07 |
| (R17 + R18)/(R17 − R18) | 0.24 |
| \|R17/R18\| | 1.62 |
| f/f1 | 1.25 |
| f/f8 | 0.84 |
| (\|P2\| + \|P3\| + \|P4\| + \|P5\| + \|P6\| + \|P7\|)/(\|P1\| + \|P8\| + \|P9\|) | 0.57 |
| (TD × BL)/(ImgH × ImgH) | 0.21 |
| BL/TD | 0.11 |
| ImgH/BL | 6.77 |
| EPD/BL | 4.77 |
| f/EPD | 1.79 |
| Y92/Y31 | 2.86 |
| Yc72/f | 0.21 |
| Yc82/f | 0.28 |
| Yc92/f | 0.27 |
| SL/TL | 0.90 |
| TL/f | 1.22 |
| TL/ImgH | 1.54 |
| ImgH [mm] | 5.00 |
| TL [mm] | 7.71 |
| \|f/R1\| + \|f/R2\| | 2.80 |
| \|f/R3\| + \|f/R4\| | 1.70 |
| \|f/R5\| + \|f/R6\| | 0.17 |
| \|f/R7\| + \|f/R8\| | 0.51 |
| \|f/R9\| + \|f/R10\| | 0.97 |
| \|f/R11\| + \|f/R12\| | 0.72 |
| \|f/R13\| + \|f/R14\| | 1.71 |
| \|f/R15\| + \|f/R16\| | 3.41 |
| \|f/R17\| + \|f/R18\| | 2.22 |

8th Embodiment

Figure 15:
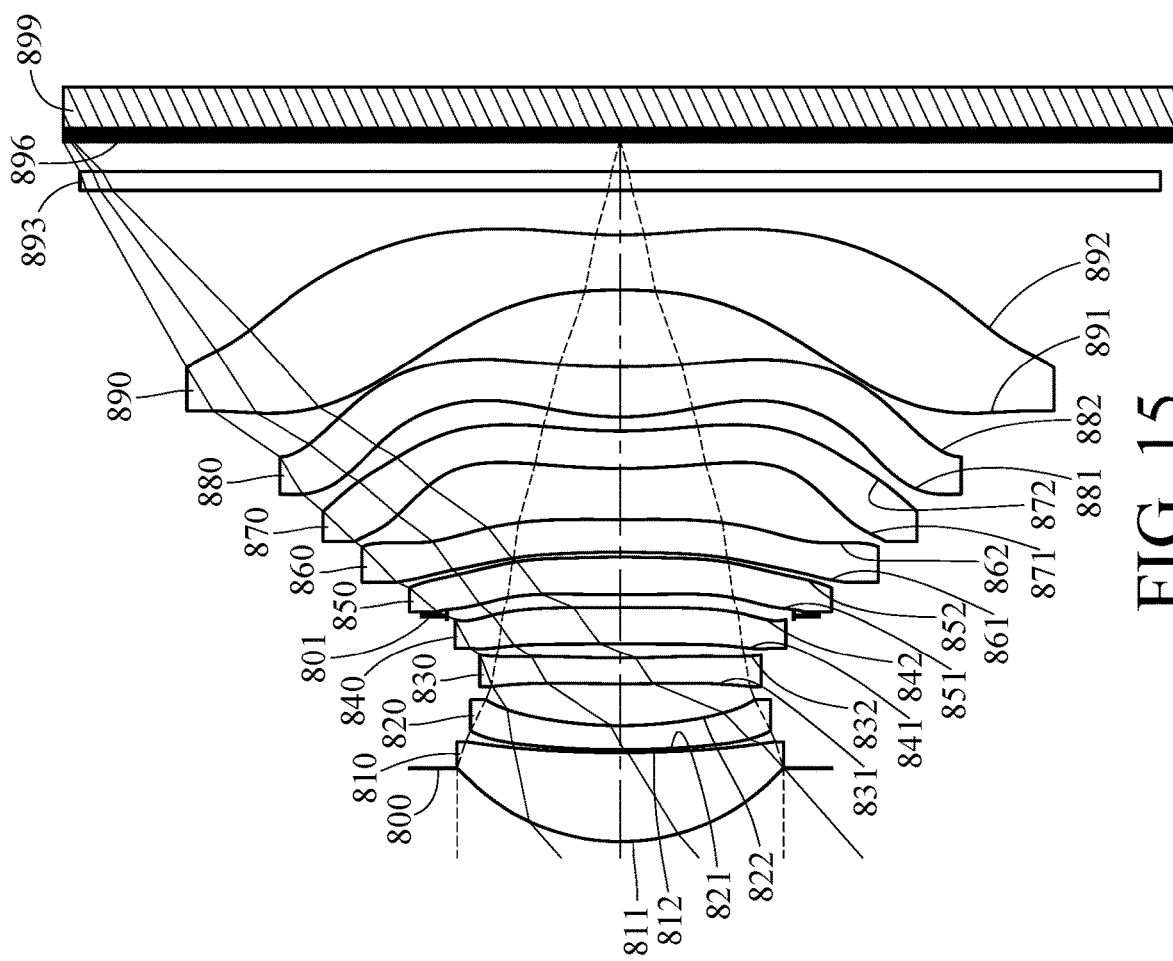
FIG. 15 is a schematic view of an image capturing unit according to the 8th embodiment of the present disclosure.
Figure 16:
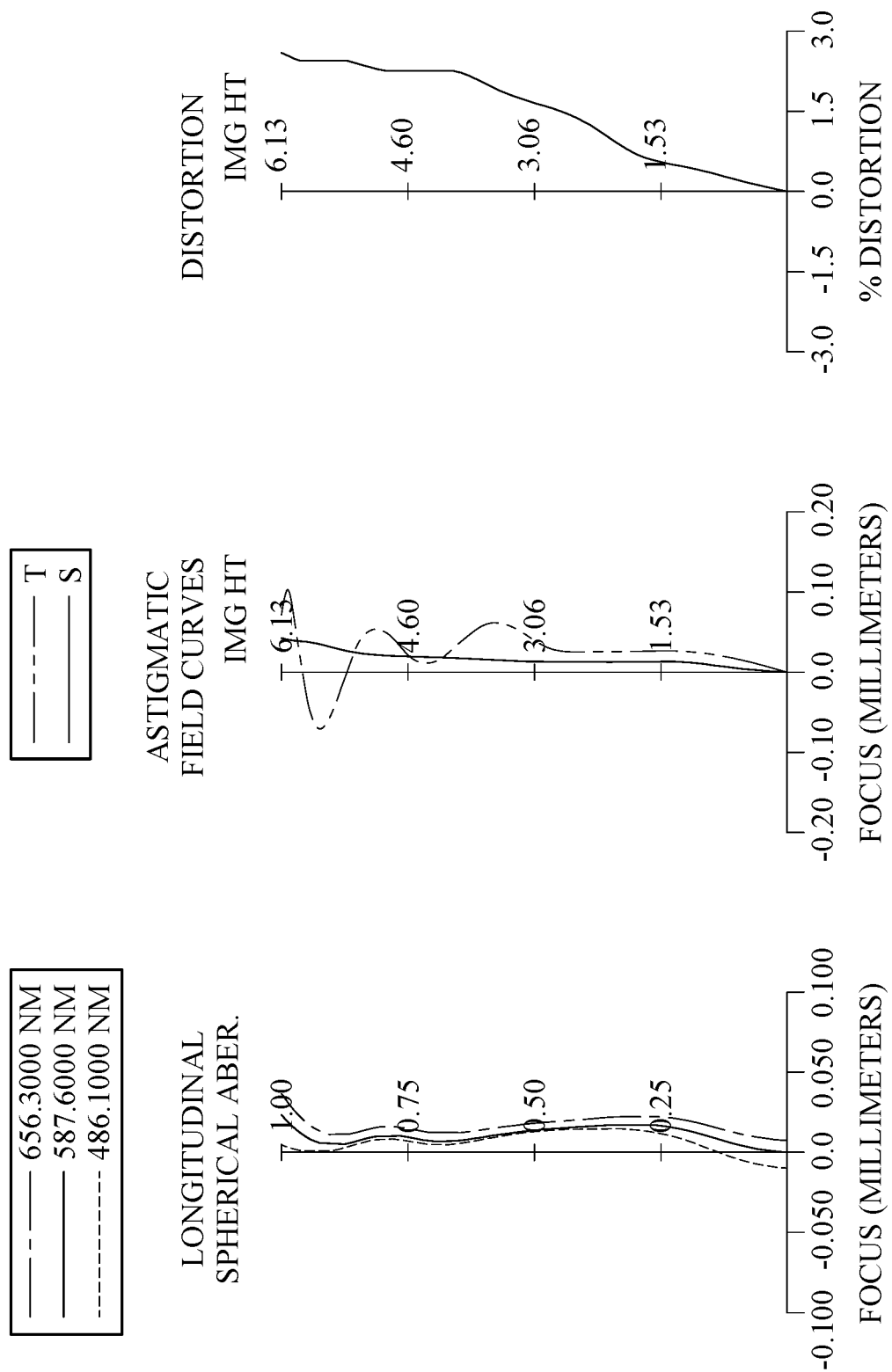
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging optical lens assembly (its reference numeral is omitted) of the present disclosure and an image sensor 899. The imaging optical lens assembly includes, in order from an object side to an image side along an optical path, an aperture stop 800, a first lens element 810, a second lens element 820, a third lens element 830, a fourth lens element 840, a stop 801, a fifth lens element 850, a sixth lens element 860, a seventh lens element 870, an eighth lens element 880, a ninth lens element 890, a filter 893 and an image surface 896. In addition, the imaging optical lens assembly has a configuration of a first lens group (the first lens element 810, the second lens element 820 and the third lens element 830), a second lens group (the fourth lens element 840, the fifth lens element 850 and the sixth lens element 860) and a third lens group (the seventh lens element 870, the eighth lens element 880 and the ninth lens element 890). The imaging optical lens assembly includes nine lens elements (810, 820, 830, 840, 850, 860, 870, 880 and 890) with no additional lens element disposed between each of the adjacent nine lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has one inflection point. The image-side surface 812 of the first lens element 810 has one inflection point.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has one inflection point. The image-side surface 832 of the third lens element 830 has two inflection points.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. The object-side surface 841 of the fourth lens element 840 has one inflection point. The image-side surface 842 of the fourth lens element 840 has one inflection point.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has three inflection points. The image-side surface 852 of the fifth lens element 850 has two inflection points.

The sixth lens element 860 with negative refractive power has an object-side surface 861 being concave in a paraxial region thereof and an image-side surface 862 being concave in a paraxial region thereof. The sixth lens element 860 is made of plastic material and has the object-side surface 861 and the image-side surface 862 being both aspheric. The object-side surface 861 of the sixth lens element 860 has four inflection points. The image-side surface 862 of the sixth lens element 860 has three inflection points.

The seventh lens element 870 with negative refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. The object-side surface 871 of the seventh lens element 870 has three inflection points. The image-side surface 872 of the seventh lens element 870 has two inflection points. The object-side surface 871 of the seventh lens element 870 has at least one critical point in an off-axis region thereof. The image-side surface 872 of the seventh lens element 870 has at least one critical point in an off-axis region thereof.

The eighth lens element 880 with positive refractive power has an object-side surface 881 being convex in a paraxial region thereof and an image-side surface 882 being concave in a paraxial region thereof. The eighth lens element 880 is made of plastic material and has the object-side surface 881 and the image-side surface 882 being both aspheric. The object-side surface 881 of the eighth lens element 880 has two inflection points. The image-side surface 882 of the eighth lens element 880 has two inflection points. The object-side surface 881 of the eighth lens element 880 has at least one critical point in an off-axis region thereof. The image-side surface 882 of the eighth lens element 880 has at least one critical point in an off-axis region thereof.

The ninth lens element 890 with negative refractive power has an object-side surface 891 being concave in a paraxial region thereof and an image-side surface 892 being concave in a paraxial region thereof. The ninth lens element 890 is made of plastic material and has the object-side surface 891 and the image-side surface 892 being both aspheric. The object-side surface 891 of the ninth lens element 890 has three inflection points. The image-side surface 892 of the ninth lens element 890 has three inflection points. The object-side surface 891 of the ninth lens element 890 has at least one critical point in an off-axis region thereof. The image-side surface 892 of the ninth lens element 890 has at least one critical point in an off-axis region thereof.

The filter 893 is made of glass material and located between the ninth lens element 890 and the image surface 896, and will not affect the focal length of the imaging optical lens assembly. The image sensor 899 is disposed on or near the image surface 896 of the imaging optical lens assembly.

The detailed optical data of the 8th embodiment are shown in Table 15 and the aspheric surface data are shown in Table 16 below.

TABLE 15

8th Embodiment f = 6.78 mm, Fno = 1.86, HFOV = 41.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.817 | | | | |
| 2 | Lens 1 | 2.461 | (ASP) | 0.992 | Plastic | 1.545 | 56.1 | 5.43 |
| 3 | | 12.508 | (ASP) | 0.030 | | | | |
| 4 | Lens 2 | 9.464 | (ASP) | 0.270 | Plastic | 1.673 | 19.3 | −15.36 |
| 5 | | 4.885 | (ASP) | 0.467 | | | | |
| 6 | Lens 3 | 16.753 | (ASP) | 0.290 | Plastic | 1.686 | 18.4 | −70.73 |
| 7 | | 12.366 | (ASP) | 0.160 | | | | |
| 8 | Lens 4 | −163.538 | (ASP) | 0.409 | Plastic | 1.544 | 56.0 | 207.32 |
| 9 | | −66.811 | (ASP) | −0.097 | | | | |
| 10 | Stop | Plano | | 0.241 | | | | |
| 11 | Lens 5 | 35.187 | (ASP) | 0.416 | Plastic | 1.544 | 56.0 | 14.49 |
| 12 | | −10.117 | (ASP) | 0.057 | | | | |
| 13 | Lens 6 | −11.692 | (ASP) | 0.365 | Plastic | 1.551 | 36.2 | −16.31 |
| 14 | | 39.105 | (ASP) | 0.569 | | | | |
| 15 | Lens 7 | 8.078 | (ASP) | 0.415 | Plastic | 1.573 | 34.7 | −30.22 |
| 16 | | 5.406 | (ASP) | 0.156 | | | | |
| 17 | Lens 8 | 2.918 | (ASP) | 0.562 | Plastic | 1.544 | 51.2 | 7.59 |
| 18 | | 9.270 | (ASP) | 0.859 | | | | |
| 19 | Lens 9 | −6.762 | (ASP) | 0.614 | Plastic | 1.544 | 56.0 | −5.07 |
| 20 | | 4.804 | (ASP) | 0.500 | | | | |
| 21 | Filter | Plano | | 0.210 | Glass | 1.517 | 64.2 | — |
| 22 | | Plano | | 0.332 | | | | |
| 23 | Image | Plano | | — | | | | |

Note:
Reference wavelength is 587.6 nm (d-line).
An effective radius of the stop 801 (Surface 10) is 1.935 mm.

TABLE 16

Aspheric Coefficients

| Surface # | 2 | 3 | 4 | 5 | 6 |
|---|---|---|---|---|---|
| k = | −4.3313E−01 | −4.4445E+01 | 3.5610E+00 | 6.1390E+00 | −2.0974E−01 |
| A4 = | 2.6442E−03 | −1.9250E−02 | −2.5417E−02 | −1.4612E−02 | −2.8258E−02 |

TABLE 16-continued

| Aspheric Coefficients | | | | | |
|---|---|---|---|---|---|
| A6 = | 6.3817E−03 | 3.3150E−02 | 3.6702E−02 | 1.4826E−02 | 2.7539E−03 |
| A8 = | −7.2981E−03 | −2.4802E−02 | −2.5937E−02 | −1.4038E−02 | −5.9457E−03 |
| A10 = | 5.5216E−03 | 1.0858E−02 | 1.1195E−02 | 8.8445E−03 | 6.6169E−03 |
| A12 = | −2.3139E−03 | −2.7360E−03 | −2.4978E−03 | −2.8236E−03 | −2.2443E−03 |
| A14 = | 5.1548E−04 | 3.6848E−04 | 2.3811E−04 | 4.0289E−04 | 2.3369E−04 |
| A16 = | −4.8375E−05 | −2.2462E−05 | — | — | — |

| Surface # | 7 | 8 | 9 | 11 | 12 |
|---|---|---|---|---|---|
| k = | 2.9889E+01 | −9.9000E+01 | −1.3518E+01 | 4.9996E+01 | 4.7690E+00 |
| A4 = | −2.5045E−02 | 4.9534E−03 | 8.7725E−03 | 1.5955E−02 | 7.9429E−02 |
| A6 = | 5.7821E−03 | −2.1937E−02 | −5.0381E−02 | −5.6029E−02 | −9.9292E−02 |
| A8 = | −1.4981E−02 | 3.4661E−02 | 5.9213E−02 | 1.9580E−02 | 4.8313E−02 |
| A10 = | 1.3788E−02 | −4.8014E−02 | −4.5763E−02 | 1.6653E−02 | −1.2039E−02 |
| A12 = | −4.4596E−03 | 3.7442E−02 | 2.1610E−02 | −2.2593E−03 | 1.6043E−03 |
| A14 = | 5.1974E−04 | −1.5992E−02 | −6.1688E−03 | 1.1603E−02 | −9.9835E−05 |
| A16 = | — | 3.5937E−03 | 1.0199E−03 | −3.0888E−03 | 7.4361E−07 |
| A18 = | — | −3.3134E−04 | −7.4920E−05 | 4.2101E−04 | 1.3617E−07 |
| A20 = | — | — | — | −2.3331E−05 | — |

| Surface # | 13 | 14 | 15 | 16 | 17 |
|---|---|---|---|---|---|
| k = | 5.4565E+00 | 4.3550E+01 | −5.6464E+00 | −3.5745E+01 | −1.1928E+00 |
| A4 = | 2.7652E−02 | −4.2613E−02 | 2.3362E−03 | −4.3022E−03 | −4.1575E−02 |
| A6 = | −4.7078E−02 | 5.1561E−03 | −1.7630E−02 | −1.6626E−02 | 3.6352E−03 |
| A8 = | 2.5759E−02 | 7.2630E−03 | 8.6650E−03 | 9.6829E−03 | −3.4856E−03 |
| A10 = | −7.1385E−03 | −5.7771E−03 | −2.5999E−03 | −3.0565E−03 | 1.7898E−03 |
| A12 = | 1.1941E−03 | 1.9998E−03 | 3.8428E−04 | 5.5594E−04 | −4.2022E−04 |
| A14 = | −1.4058E−04 | −3.6885E−04 | −2.2965E−05 | −5.8304E−05 | 5.2587E−05 |
| A16 = | 1.2031E−05 | 3.7357E−05 | 5.2247E−08 | 3.4143E−06 | −3.6319E−06 |
| A18 = | −5.2756E−07 | −1.9511E−06 | 2.9358E−08 | −1.0035E−07 | 1.3074E−07 |
| A20 = | — | 4.0676E−08 | — | 1.0733E−09 | −1.9162E−09 |

| Surface # | 18 | 19 | 20 |
|---|---|---|---|
| k = | −8.6762E+00 | −4.5795E−03 | −1.0060E+00 |
| A4 = | 1.1228E−02 | 4.7292E−02 | −5.3133E−02 |
| A6 = | −1.2903E−02 | 1.4007E−02 | 1.2852E−02 |
| A8 = | 2.8401E−03 | −2.5757E−03 | −2.1091E−03 |
| A10 = | −1.8563E−04 | 3.2774E−04 | 2.1288E−04 |
| A12 = | −2.9288E−05 | −2.7341E−05 | −1.2557E−05 |
| A14 = | 6.5881E−06 | 1.4496E−06 | 3.7527E−07 |
| A16 = | −5.2618E−07 | −4.6888E−08 | −2.1018E−09 |
| A18 = | 1.9905E−08 | 8.4106E−10 | −1.5679E−10 |
| A20 = | −2.9857E−10 | −6.3865E−12 | 2.8015E−12 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | |
|---|---|
| f [mm] | 6.78 |
| Fno | 1.86 |
| HFOV [deg.] | 41.3 |
| V6 | 36.2 |
| V7 | 34.7 |
| Vmin | 18.4 |
| Nmax | 1.686 |
| V1/N1 | 36.31 |
| V2/N2 | 11.54 |
| V3/N3 | 10.91 |
| V4/N4 | 36.27 |
| V5/N5 | 36.27 |
| V6/N6 | 23.34 |
| V7/N7 | 22.06 |
| V8/N8 | 33.16 |
| V9/N9 | 36.27 |
| (Vi/Ni)min | 10.91 |
| (V2 + V3)/V1 | 0.67 |
| CTmax/CTmin | 3.67 |
| ΣCT/ΣAT | 1.77 |
| ΣAT/(T23 + T89) | 1.84 |
| ImgH/CTmax | 6.18 |
| (Rao + Rai)/(Rao − Rai) | 0.16 |
| (R17 + R18)/(R17 − R18) | 0.17 |
| |R17/R18| | 1.41 |
| f/f1 | 1.25 |
| f/f8 | 0.89 |
| (|P2| + |P3| + |P4| + |P5| + |P6| + |P7|)/(|P1| + |P8| + |P9|) | 0.48 |
| (TD × BL)/(ImgH × ImgH) | 0.19 |
| BL/TD | 0.15 |
| ImgH/BL | 5.88 |
| EPD/BL | 3.50 |
| f/EPD | 1.86 |
| Y92/Y31 | 3.34 |
| Yc72/f | 0.19 |
| Yc82/f | 0.23 |
| Yc92/f | 0.19 |

-continued

8th Embodiment

| | |
|---|---|
| SL/TL | 0.90 |
| TL/f | 1.15 |
| TL/ImgH | 1.28 |
| ImgH [mm] | 6.13 |
| TL [mm] | 7.82 |
| \|f/R1\| + \|f/R2\| | 3.30 |
| \|f/R3\| + \|f/R4\| | 2.10 |
| \|f/R5\| + \|f/R6\| | 0.95 |
| \|f/R7\| + \|f/R8\| | 0.14 |
| \|f/R9\| + \|f/R10\| | 0.86 |
| \|f/R11\| + \|f/R12\| | 0.75 |
| \|f/R13\| + \|f/R14\| | 2.09 |
| \|f/R15\| + \|f/R16\| | 3.06 |
| \|f/R17\| + \|f/R18\| | 2.41 |

9th Embodiment

Figure 17:
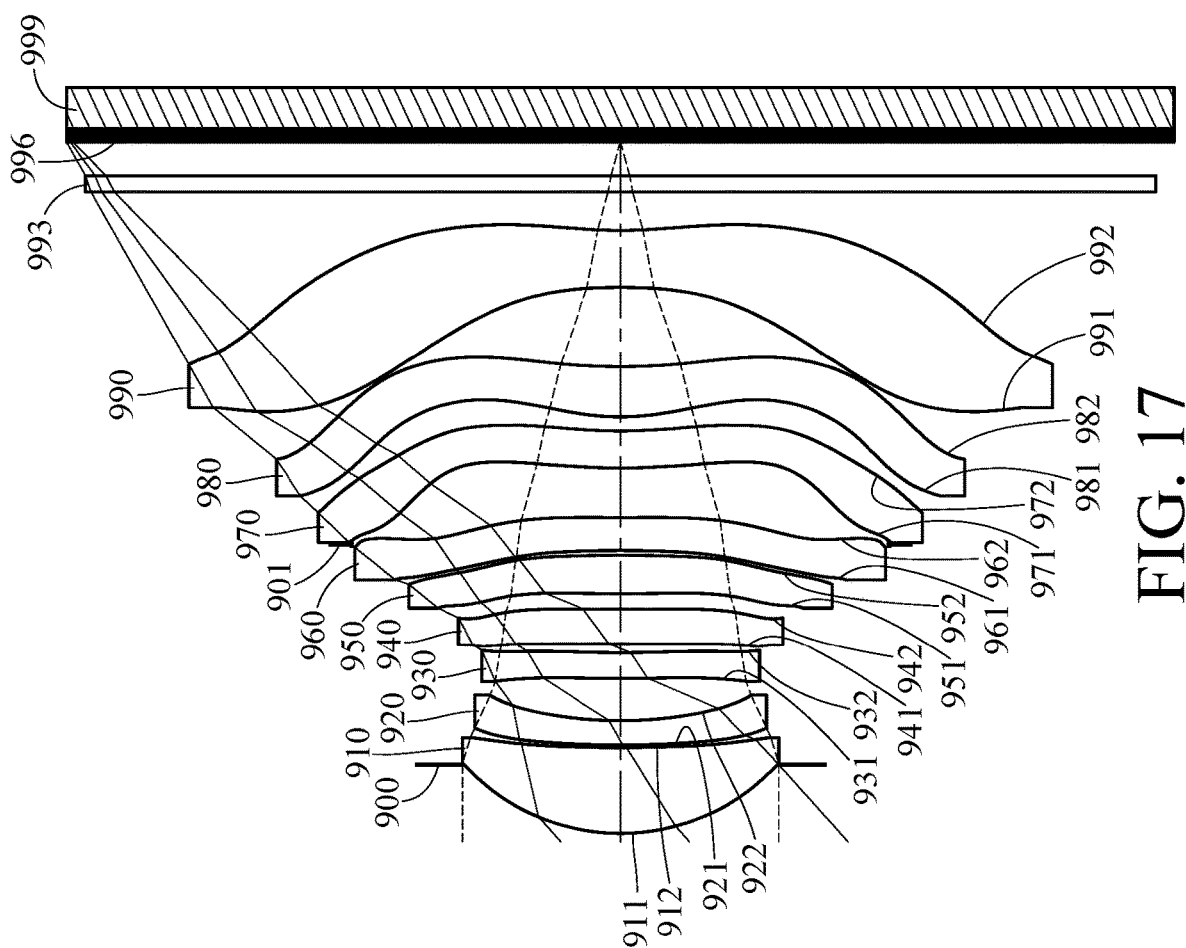
FIG. 17 is a schematic view of an image capturing unit according to the 9th embodiment of the present disclosure.
Figure 18:
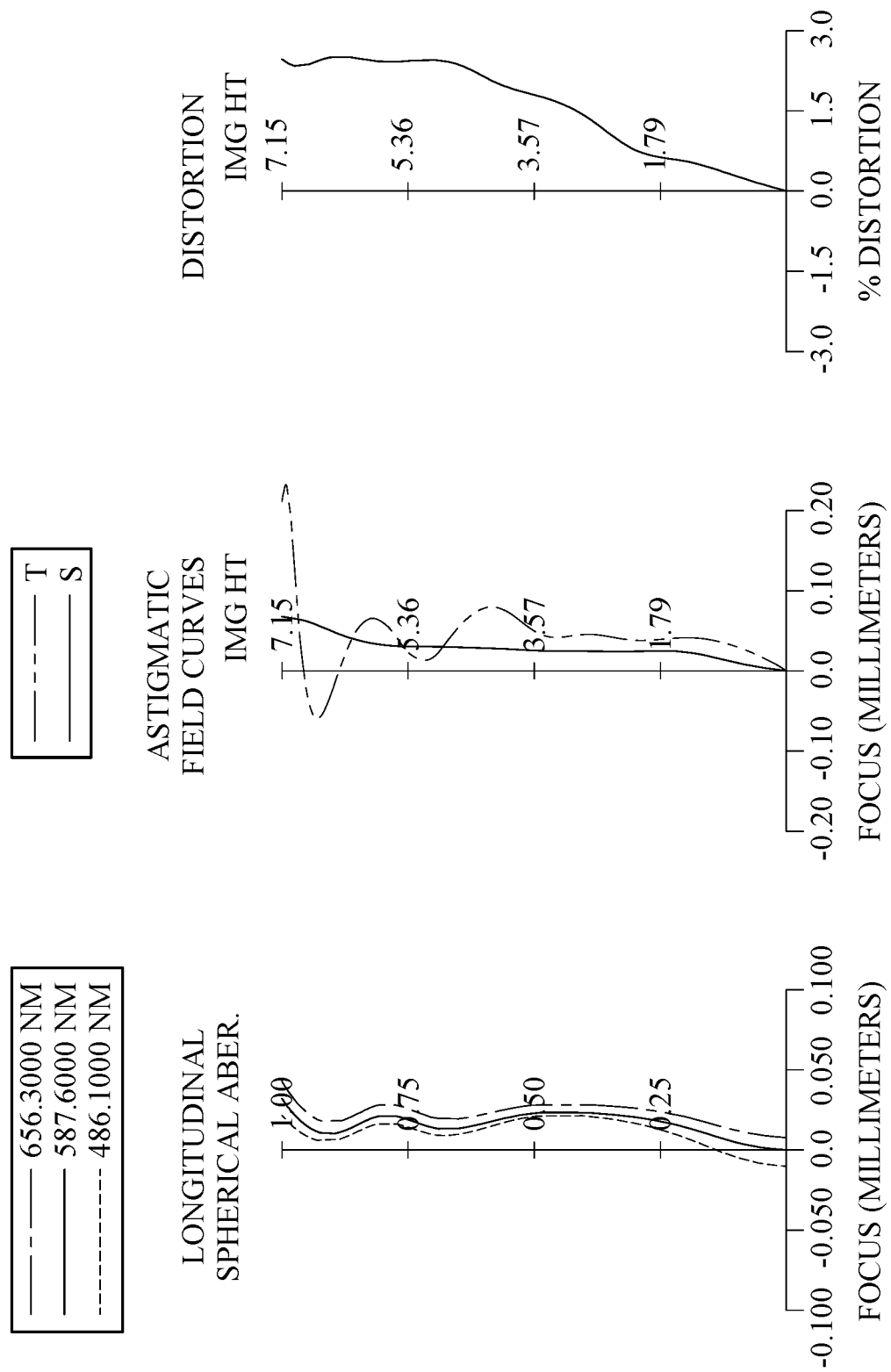
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging optical lens assembly (its reference numeral is omitted) of the present disclosure and an image sensor 999. The imaging optical lens assembly includes, in order from an object side to an image side along an optical path, an aperture stop 900, a first lens element 910, a second lens element 920, a third lens element 930, a fourth lens element 940, a fifth lens element 950, a sixth lens element 960, a stop 901, a seventh lens element 970, an eighth lens element 980, a ninth lens element 990, a filter 993 and an image surface 996. In addition, the imaging optical lens assembly has a configuration of a first lens group (the first lens element 910, the second lens element 920 and the third lens element 930), a second lens group (the fourth lens element 940, the fifth lens element 950 and the sixth lens element 960) and a third lens group (the seventh lens element 970, the eighth lens element 980 and the ninth lens element 990). The imaging optical lens assembly includes nine lens elements (910, 920, 930, 940, 950, 960, 970, 980 and 990) with no additional lens element disposed between each of the adjacent nine lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has one inflection point. The image-side surface 912 of the first lens element 910 has one inflection point.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has one inflection point. The image-side surface 932 of the third lens element 930 has two inflection points.

The fourth lens element 940 with positive refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has two inflection points. The image-side surface 942 of the fourth lens element 940 has two inflection points.

The fifth lens element 950 with positive refractive power has an object-side surface 951 being convex in a paraxial region thereof and an image-side surface 952 being convex in a paraxial region thereof. The fifth lens element 950 is made of plastic material and has the object-side surface 951 and the image-side surface 952 being both aspheric. The object-side surface 951 of the fifth lens element 950 has three inflection points. The image-side surface 952 of the fifth lens element 950 has two inflection points.

The sixth lens element 960 with negative refractive power has an object-side surface 961 being concave in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has four inflection points. The image-side surface 962 of the sixth lens element 960 has three inflection points.

The seventh lens element 970 with negative refractive power has an object-side surface 971 being convex in a paraxial region thereof and an image-side surface 972 being concave in a paraxial region thereof. The seventh lens element 970 is made of plastic material and has the object-side surface 971 and the image-side surface 972 being both aspheric. The object-side surface 971 of the seventh lens element 970 has three inflection points. The image-side surface 972 of the seventh lens element 970 has one inflection point. The object-side surface 971 of the seventh lens element 970 has at least one critical point in an off-axis region thereof. The image-side surface 972 of the seventh lens element 970 has at least one critical point in an off-axis region thereof.

The eighth lens element 980 with positive refractive power has an object-side surface 981 being convex in a paraxial region thereof and an image-side surface 982 being concave in a paraxial region thereof. The eighth lens element 980 is made of plastic material and has the object-side surface 981 and the image-side surface 982 being both aspheric. The object-side surface 981 of the eighth lens element 980 has two inflection points. The image-side surface 982 of the eighth lens element 980 has two inflection points. The object-side surface 981 of the eighth lens element 980 has at least one critical point in an off-axis region thereof. The image-side surface 982 of the eighth lens element 980 has at least one critical point in an off-axis region thereof.

The ninth lens element 990 with negative refractive power has an object-side surface 991 being concave in a paraxial region thereof and an image-side surface 992 being concave in a paraxial region thereof. The ninth lens element 990 is made of plastic material and has the object-side surface 991 and the image-side surface 992 being both aspheric. The object-side surface 991 of the ninth lens element 990 has two inflection points. The image-side surface 992 of the ninth lens element 990 has three inflection points. The object-side surface 991 of the ninth lens element 990 has at least one critical point in an off-axis region thereof. The image-side surface 992 of the ninth lens element 990 has at least one critical point in an off-axis region thereof.

The filter 993 is made of glass material and located between the ninth lens element 990 and the image surface 996, and will not affect the focal length of the imaging optical lens assembly. The image sensor 999 is disposed on or near the image surface 996 of the imaging optical lens assembly.

The detailed optical data of the 9th embodiment are shown in Table 17 and the aspheric surface data are shown in Table 18 below.

TABLE 17

9th Embodiment f = 7.76 mm, Fno = 1.89, HFOV = 41.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.890 | | | | |
| 2 | Lens 1 | 2.818 | (ASP) | 1.112 | Plastic | 1.545 | 56.1 | 6.17 |
| 3 | | 15.029 | (ASP) | 0.035 | | | | |
| 4 | Lens 2 | 11.545 | (ASP) | 0.315 | Plastic | 1.646 | 21.0 | −15.88 |
| 5 | | 5.374 | (ASP) | 0.550 | | | | |
| 6 | Lens 3 | 19.497 | (ASP) | 0.335 | Plastic | 1.686 | 18.4 | −100.46 |
| 7 | | 15.091 | (ASP) | 0.116 | | | | |
| 8 | Lens 4 | 61.319 | (ASP) | 0.457 | Plastic | 1.544 | 56.0 | 222.30 |
| 9 | | 124.058 | (ASP) | 0.201 | | | | |
| 10 | Lens 5 | 32.558 | (ASP) | 0.500 | Plastic | 1.544 | 56.0 | 16.32 |
| 11 | | −12.146 | (ASP) | 0.061 | | | | |
| 12 | Lens 6 | −13.446 | (ASP) | 0.425 | Plastic | 1.576 | 31.7 | −17.87 |
| 13 | | 44.453 | (ASP) | −0.350 | | | | |
| 14 | Stop | Plano | | 0.993 | | | | |
| 15 | Lens 7 | 8.995 | (ASP) | 0.480 | Plastic | 1.571 | 33.4 | −44.32 |
| 16 | | 6.508 | (ASP) | 0.185 | | | | |
| 17 | Lens 8 | 3.295 | (ASP) | 0.652 | Plastic | 1.548 | 51.8 | 9.30 |
| 18 | | 8.656 | (ASP) | 1.037 | | | | |
| 19 | Lens 9 | −7.819 | (ASP) | 0.738 | Plastic | 1.544 | 56.0 | −5.99 |
| 20 | | 5.779 | (ASP) | 0.500 | | | | |
| 21 | Filter | Plano | | 0.210 | Glass | 1.517 | 64.2 | — |
| 22 | | Plano | | 0.435 | | | | |
| 23 | Image | Plano | | — | | | | |

Note:
Reference wavelength is 587.6 nm (d-line).
An effective radius of the stop 901 (Surface 14) is 3.494 mm.

TABLE 18

Aspheric Coefficients

| Surface # | 2 | 3 | 4 | 5 | 6 |
|---|---|---|---|---|---|
| k = | −4.0837E−01 | −3.7104E+01 | 8.1170E+00 | 5.7066E+00 | −3.0306E+01 |
| A4 = | 1.6557E−03 | −1.7150E−02 | −2.2394E−02 | −1.2144E−02 | −1.8648E−02 |
| A6 = | 3.4050E−03 | 2.4618E−02 | 2.7449E−02 | 1.1472E−02 | 2.1229E−03 |
| A8 = | −3.0648E−03 | −1.5837E−02 | −1.6623E−02 | −8.6097E−03 | −2.6182E−03 |
| A10 = | 1.8266E−03 | 5.9073E−03 | 5.9302E−03 | 4.0576E−03 | 2.0651E−03 |
| A12 = | −6.0805E−04 | −1.2429E−03 | −1.0915E−03 | −9.7322E−04 | −5.6525E−04 |
| A14 = | 1.0780E−04 | 1.3415E−04 | 8.2468E−05 | 9.8571E−05 | 4.9190E−05 |
| A16 = | −8.0128E−06 | −5.9096E−06 | — | — | — |

| Surface # | 7 | 8 | 9 | 10 | 11 |
|---|---|---|---|---|---|
| k = | 2.1463E+01 | −9.9000E+01 | −9.9000E+01 | 5.0000E+01 | 5.5679E+00 |
| A4 = | −1.7170E−02 | 1.0875E−03 | −1.0665E−03 | 1.0430E−03 | 5.1700E−02 |
| A6 = | 6.4392E−03 | −5.2327E−03 | −1.4663E−03 | −1.6698E−02 | −5.9484E−02 |
| A8 = | −9.5968E−03 | 7.4106E−03 | 1.4642E−02 | 9.9890E−04 | 2.8275E−02 |
| A10 = | 6.1306E−03 | −1.1007E−02 | −9.3433E−03 | 7.8335E−03 | −7.8653E−03 |
| A12 = | −1.5607E−03 | 7.5722E−03 | 3.3939E−03 | −6.2489E−03 | 1.4084E−03 |
| A14 = | 1.4614E−04 | −2.6349E−03 | −7.1782E−04 | 2.3308E−03 | −1.5891E−04 |
| A16 = | — | 4.6369E−04 | 8.8250E−05 | −4.6449E−04 | 1.0138E−05 |
| A18 = | — | −3.2719E−05 | −4.9350E−06 | 4.7684E−05 | −2.7591E−07 |
| A20 = | — | — | — | −1.9898E−06 | — |

| Surface # | 12 | 13 | 15 | 16 | 17 |
|---|---|---|---|---|---|
| k = | 5.4136E+00 | 2.0725E−14 | −7.8436E+00 | −3.5834E+01 | −1.2274E+00 |
| A4 = | 2.0432E−02 | −2.7600E−02 | −2.5750E−04 | −3.9249E−03 | −2.6396E−02 |
| A6 = | −3.4401E−02 | 2.8799E−03 | −6.4853E−03 | −7.0716E−03 | 2.0322E−03 |

TABLE 18-continued

| Aspheric Coefficients | | | | | |
|---|---|---|---|---|---|
| A8 = | 1.8028E−02 | 2.1896E−03 | 2.2729E−03 | 3.2889E−03 | −1.5163E−03 |
| A10 = | −5.0513E−03 | −1.3346E−03 | −4.6996E−04 | −8.0185E−04 | 5.5494E−04 |
| A12 = | 8.6999E−04 | 3.4503E−04 | 3.6949E−05 | 1.1096E−04 | −9.4614E−05 |
| A14 = | −9.3837E−05 | −4.7257E−05 | 8.4259E−07 | −8.8325E−06 | 8.6777E−06 |
| A16 = | 5.8542E−06 | 3.5376E−06 | −2.5526E−07 | 3.9502E−07 | −4.4148E−07 |
| A18 = | −1.6053E−07 | −1.3583E−07 | 1.0701E−08 | −9.0087E−09 | 1.1738E−08 |
| A20 = | — | 2.0656E−09 | −1.0333E−10 | 7.7678E−11 | −1.2717E−10 |

| Surface # | 18 | 19 | 20 |
|---|---|---|---|
| k = | −1.2094E+01 | −4.8253E−02 | −1.0016E+00 |
| A4 = | 7.8807E−03 | −3.0201E−02 | −3.3040E−02 |
| A6 = | −6.4433E−03 | 6.6340E−03 | 5.5915E−03 |
| A8 = | 1.0639E−03 | −9.1162E−04 | −6.2276E−04 |
| A10 = | −6.1278E−05 | 8.7600E−05 | 4.0461E−05 |
| A12 = | −3.2346E−06 | −5.5904E−06 | −1.3264E−06 |
| A14 = | 6.6282E−07 | 2.3006E−07 | 6.2154E−09 |
| A16 = | −3.8209E−08 | −5.8744E−09 | 9.5940E−10 |
| A18 = | 1.0057E−09 | 8.4896E−11 | −2.7760E−11 |
| A20 = | −1.0340E−11 | −5.3255E−13 | 2.4327E−13 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | |
|---|---|
| f [mm] | 7.76 |
| Fno | 1.89 |
| HFOV [deg.] | 41.9 |
| V6 | 31.7 |
| V7 | 33.4 |
| Vmin | 18.4 |
| Nmax | 1.686 |
| V1/N1 | 36.31 |
| V2/N2 | 12.76 |
| V3/N3 | 10.91 |
| V4/N4 | 36.27 |
| V5/N5 | 36.27 |
| V6/N6 | 20.11 |
| V7/N7 | 21.26 |
| V8/N8 | 33.44 |
| V9/N9 | 36.27 |
| (Vi/Ni)min | 10.91 |
| (V2 + V3)/V1 | 0.70 |
| CTmax/CTmin | 3.53 |
| ΣCT/ΣAT | 1.77 |
| ΣAT/(T23 + T89) | 1.78 |
| ImgH/CTmax | 6.43 |
| (Rao + Rai)/(Rao − Rai) | 0.05 |
| (R17 + R18)/(R17 − R18) | 0.15 |
| |R17/R18| | 1.35 |
| f/f1 | 1.26 |
| f/f8 | 0.83 |
| (|P2| + |P3| + |P4| + |P5| + |P6| + |P7|)/(|P1| + |P8| + |P9|) | 0.50 |
| (TD × BL)/(ImgH × ImgH) | 0.18 |
| BL/TD | 0.15 |
| ImgH/BL | 6.24 |
| EPD/BL | 3.59 |
| f/EPD | 1.89 |
| Y92/Y31 | 3.40 |
| Yc72/f | 0.19 |
| Yc82/f | 0.24 |
| Yc92/f | 0.19 |

| 9th Embodiment | |
|---|---|
| SL/TL | 0.90 |
| TL/f | 1.16 |
| TL/ImgH | 1.26 |
| ImgH [mm] | 7.15 |
| TL [mm] | 8.99 |
| |f/R1| + |f/R2| | 3.27 |
| |f/R3| + |f/R4| | 2.12 |
| |f/R5| + |f/R6| | 0.91 |
| |f/R7| + |f/R8| | 0.19 |
| |f/R9| + |f/R10| | 0.88 |
| |f/R11| + |f/R12| | 0.75 |
| |f/R13| + |f/R14| | 2.05 |
| |f/R15| + |f/R16| | 3.25 |
| |f/R17| + |f/R18| | 2.34 |

10th Embodiment

Figure 19:
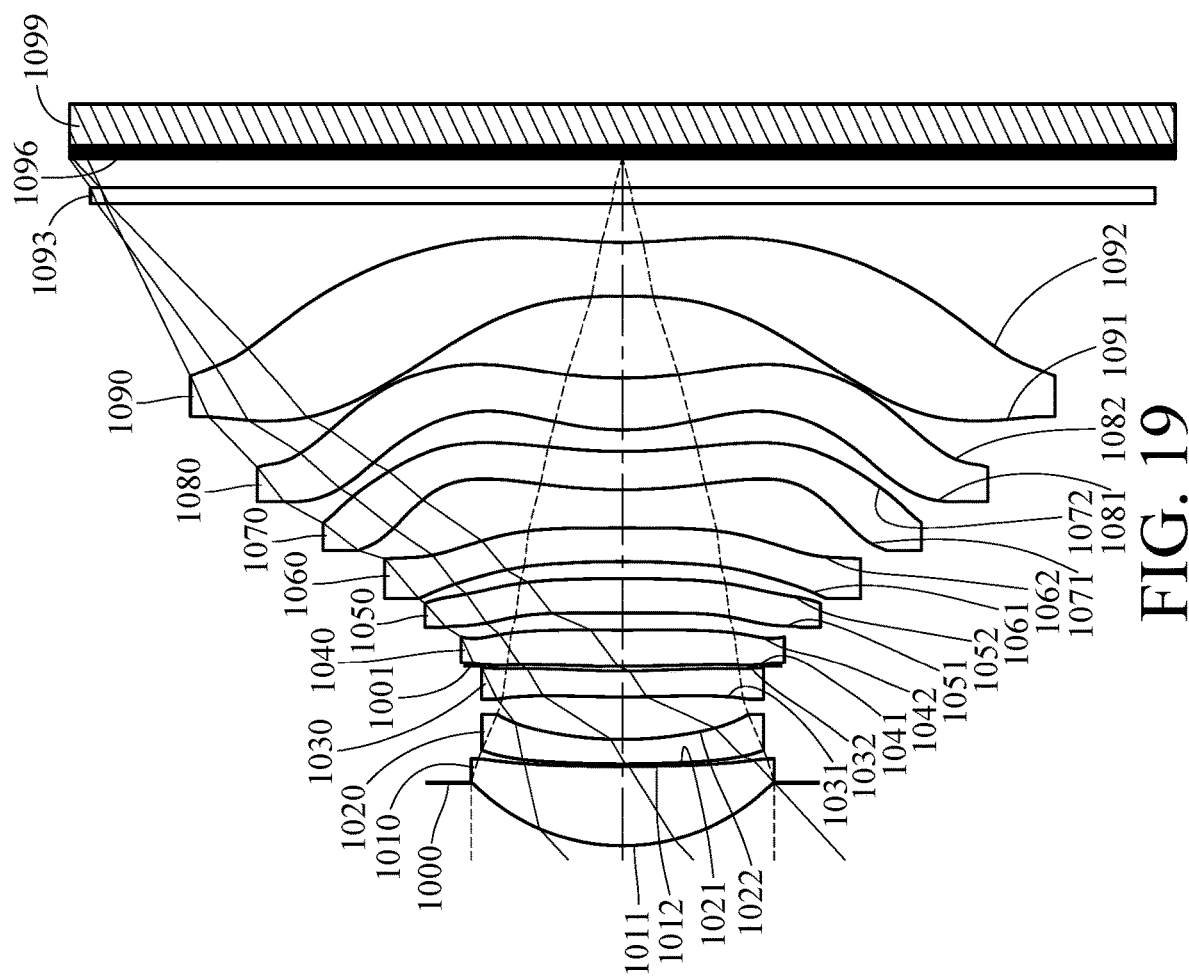
FIG. 19 is a schematic view of an image capturing unit according to the 10th embodiment of the present disclosure.
Figure 20:
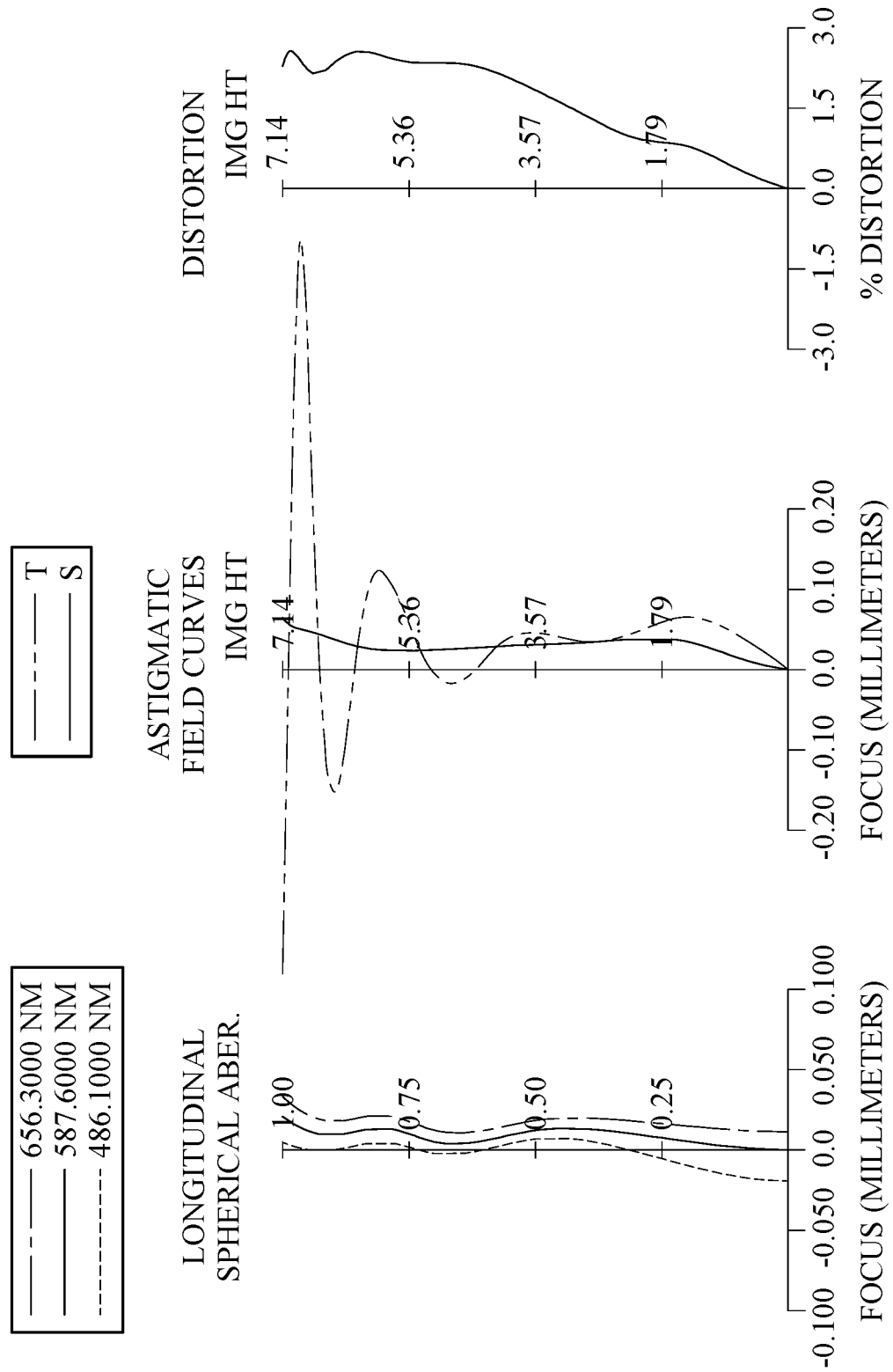
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging optical lens assembly (its reference numeral is omitted) of the present disclosure and an image sensor 1099. The imaging optical lens assembly includes, in order from an object side to an image side along an optical path, an aperture stop 1000, a first lens element 1010, a second lens element 1020, a third lens element 1030, a stop 1001, a fourth lens element 1040, a fifth lens element 1050, a sixth lens element 1060, a seventh lens element 1070, an eighth lens element 1080, a ninth lens element 1090, a filter 1093 and an image surface 1096. In addition, the imaging optical lens assembly has a configuration of a first lens group (the first lens element 1010, the second lens element 1020 and the third lens element 1030), a second lens group (the fourth lens element 1040, the fifth lens element 1050 and the sixth lens element 1060) and a third lens group (the seventh lens element 1070, the eighth lens element 1080 and the ninth lens element 1090). The imaging optical lens assembly includes nine lens elements (1010, 1020, 1030, 1040, 1050, 1060, 1070, 1080 and 1090) with no additional lens element disposed between each of the adjacent nine lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The object-side surface 1011 of the first lens element 1010 has one inflection point. The image-side surface 1012 of the first lens element 1010 has one inflection point.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 of the third lens element 1030 has one inflection point. The image-side surface 1032 of the third lens element 1030 has two inflection points.

The fourth lens element 1040 with positive refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. The object-side surface 1041 of the fourth lens element 1040 has two inflection points. The image-side surface 1042 of the fourth lens element 1040 has three inflection points.

The fifth lens element 1050 with positive refractive power has an object-side surface 1051 being convex in a paraxial region thereof and an image-side surface 1052 being convex in a paraxial region thereof. The fifth lens element 1050 is made of plastic material and has the object-side surface 1051 and the image-side surface 1052 being both aspheric. The object-side surface 1051 of the fifth lens element 1050 has three inflection points. The image-side surface 1052 of the fifth lens element 1050 has two inflection points.

The sixth lens element 1060 with negative refractive power has an object-side surface 1061 being concave in a paraxial region thereof and an image-side surface 1062 being convex in a paraxial region thereof. The sixth lens element 1060 is made of plastic material and has the object-side surface 1061 and the image-side surface 1062 being both aspheric. The object-side surface 1061 of the sixth lens element 1060 has one inflection point. The image-side surface 1062 of the sixth lens element 1060 has two inflection points.

The seventh lens element 1070 with negative refractive power has an object-side surface 1071 being convex in a paraxial region thereof and an image-side surface 1072 being concave in a paraxial region thereof. The seventh lens element 1070 is made of plastic material and has the object-side surface 1071 and the image-side surface 1072 being both aspheric. The object-side surface 1071 of the seventh lens element 1070 has three inflection points. The image-side surface 1072 of the seventh lens element 1070 has two inflection points. The object-side surface 1071 of the seventh lens element 1070 has at least one critical point in an off-axis region thereof. The image-side surface 1072 of the seventh lens element 1070 has at least one critical point in an off-axis region thereof.

The eighth lens element 1080 with positive refractive power has an object-side surface 1081 being convex in a paraxial region thereof and an image-side surface 1082 being concave in a paraxial region thereof. The eighth lens element 1080 is made of plastic material and has the object-side surface 1081 and the image-side surface 1082 being both aspheric. The object-side surface 1081 of the eighth lens element 1080 has three inflection points. The image-side surface 1082 of the eighth lens element 1080 has three inflection points. The object-side surface 1081 of the eighth lens element 1080 has at least one critical point in an off-axis region thereof. The image-side surface 1082 of the eighth lens element 1080 has at least one critical point in an off-axis region thereof.

The ninth lens element 1090 with negative refractive power has an object-side surface 1091 being concave in a paraxial region thereof and an image-side surface 1092 being concave in a paraxial region thereof. The ninth lens element 1090 is made of plastic material and has the object-side surface 1091 and the image-side surface 1092 being both aspheric. The object-side surface 1091 of the ninth lens element 1090 has three inflection points. The image-side surface 1092 of the ninth lens element 1090 has four inflection points. The object-side surface 1091 of the ninth lens element 1090 has at least one critical point in an off-axis region thereof. The image-side surface 1092 of the ninth lens element 1090 has at least one critical point in an off-axis region thereof.

The filter 1093 is made of glass material and located between the ninth lens element 1090 and the image surface 1096, and will not affect the focal length of the imaging optical lens assembly. The image sensor 1099 is disposed on or near the image surface 1096 of the imaging optical lens assembly.

The detailed optical data of the 10th embodiment are shown in Table 19 and the aspheric surface data are shown in Table 20 below.

TABLE 19

10th Embodiment f = 7.62 mm, Fno = 1.95, HFOV = 42.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.815 | | | | |
| 2 | Lens 1 | 2.786 | (ASP) | 1.021 | Plastic | 1.545 | 56.1 | 5.90 |
| 3 | | 18.135 | (ASP) | 0.035 | | | | |
| 4 | Lens 2 | 13.613 | (ASP) | 0.315 | Plastic | 1.609 | 24.4 | −13.14 |
| 5 | | 4.998 | (ASP) | 0.549 | | | | |

TABLE 19-continued

10th Embodiment f = 7.62 mm, Fno = 1.95, HFOV = 42.5 deg.

| Surface # |  | Curvature Radius |  | Thickness | Material | Index | Abbe # | Focal Length |
|---|---|---|---|---|---|---|---|---|
| 6 | Lens 3 | 15.909 | (ASP) | 0.335 | Plastic | 1.686 | 18.4 | −83.75 |
| 7 |  | 12.353 | (ASP) | 0.070 |  |  |  |  |
| 8 | Stop | Plano |  | −0.006 |  |  |  |  |
| 9 | Lens 4 | 24.801 | (ASP) | 0.470 | Plastic | 1.544 | 56.0 | 66.78 |
| 10 |  | 77.628 | (ASP) | 0.223 |  |  |  |  |
| 11 | Lens 5 | 147.269 | (ASP) | 0.446 | Plastic | 1.544 | 56.0 | 26.97 |
| 12 |  | −16.277 | (ASP) | 0.218 |  |  |  |  |
| 13 | Lens 6 | −12.700 | (ASP) | 0.432 | Plastic | 1.566 | 37.4 | −29.48 |
| 14 |  | −53.822 | (ASP) | 0.494 |  |  |  |  |
| 15 | Lens 7 | 7.968 | (ASP) | 0.493 | Plastic | 1.566 | 37.4 | −132.53 |
| 16 |  | 7.042 | (ASP) | 0.278 |  |  |  |  |
| 17 | Lens 8 | 3.146 | (ASP) | 0.674 | Plastic | 1.544 | 56.0 | 11.53 |
| 18 |  | 5.836 | (ASP) | 1.063 |  |  |  |  |
| 19 | Lens 9 | −7.893 | (ASP) | 0.691 | Plastic | 1.534 | 55.9 | −6.42 |
| 20 |  | 6.240 | (ASP) | 0.500 |  |  |  |  |
| 21 | Filter | Plano |  | 0.210 | Glass | 1.517 | 64.2 | — |
| 22 |  | Plano |  | 0.372 |  |  |  |  |
| 23 | Image | Plano |  | — |  |  |  |  |

Note:
Reference wavelength is 587.6 nm (d-line).
An effective radius of the stop 1001 (Surface 8) is 1.860 mm.

TABLE 20

Aspheric Coefficients

| Surface # | 2 | 3 | 4 | 5 | 6 |
|---|---|---|---|---|---|
| k = | −3.8235E−01 | −5.1813E+01 | 9.3928E+00 | 5.1328E+00 | −2.3985E+01 |
| A4 = | 3.6405E−03 | −1.8966E−02 | −2.4226E−02 | −1.2059E−02 | −1.6171E−02 |
| A6 = | 3.7518E−04 | 2.5777E−02 | 2.8773E−02 | 1.1345E−02 | 1.4953E−05 |
| A8 = | −4.5063E−04 | −1.6054E−02 | −1.6208E−02 | −8.1648E−03 | −1.3931E−03 |
| A10 = | 6.5674E−04 | 6.1001E−03 | 5.5824E−03 | 3.9600E−03 | 1.4677E−03 |
| A12 = | −3.3984E−04 | −1.3965E−03 | −1.0371E−03 | −1.0138E−03 | −4.3281E−04 |
| A14 = | 8.2189E−05 | 1.7659E−04 | 8.3357E−05 | 1.1150E−04 | 3.4158E−05 |
| A16 = | −7.9436E−06 | −9.8765E−06 | — | — | — |

| Surface # | 7 | 9 | 10 | 11 | 12 |
|---|---|---|---|---|---|
| k = | 1.0148E+01 | 4.5867E+01 | −8.5749E+01 | 4.9355E+01 | 2.5422E+01 |
| A4 = | −9.9707E−03 | −1.1523E−03 | −8.2299E−03 | −9.0078E−03 | 1.7447E−02 |
| A6 = | 1.9977E−04 | 9.3419E−03 | −4.5189E−04 | 2.5935E−03 | −1.6819E−02 |
| A8 = | −6.9150E−03 | −1.9976E−02 | −2.2543E−03 | −1.7796E−02 | 2.8441E−03 |
| A10 = | 5.3480E−03 | 1.3632E−02 | 1.9753E−03 | 1.7841E−02 | 6.5455E−04 |
| A12 = | −1.4185E−03 | −4.7201E−03 | −9.2772E−04 | −9.3030E−03 | −2.7823E−04 |
| A14 = | 1.3233E−04 | 8.6254E−04 | 2.2395E−04 | 2.9209E−03 | 3.7857E−05 |
| A16 = | — | −6.4870E−05 | −1.9544E−05 | −5.4283E−04 | −2.4424E−06 |
| A18 = | — | — | — | 5.4630E−05 | 6.5095E−08 |
| A20 = | — | — | — | −2.2953E−06 | — |

| Surface # | 13 | 14 | 5 | 16 | 17 |
|---|---|---|---|---|---|
| k = | 9.3114E+00 | −6.5095E+01 | −6.0468E−01 | −9.8854E+00 | −1.3553E+00 |
| A4 = | 1.2904E−02 | −3.0351E−03 | 1.1134E−02 | −4.2218E−03 | −2.1194E−02 |
| A6 = | −1.4397E−02 | −1.2775E−02 | −1.1538E−02 | −3.1234E−03 | −1.2996E−03 |
| A8 = | 4.7365E−03 | 7.0104E−03 | 3.5913E−03 | 8.8671E−04 | −4.8273E−04 |
| A10 = | −1.0079E−03 | −2.1914E−03 | −7.9378E−04 | −1.1918E−04 | 3.1286E−04 |
| A12 = | 2.1077E−04 | 4.3653E−04 | 1.2077E−04 | 1.4130E−06 | −5.7994E−05 |
| A14 = | −3.6026E−05 | −5.3009E−05 | −1.3871E−05 | 1.5510E−06 | 5.4534E−06 |
| A16 = | 3.4177E−06 | 3.7412E−06 | 1.1680E−06 | −1.8086E−07 | −2.8255E−07 |
| A18 = | −1.2696E−07 | −1.4033E−07 | −5.8617E−08 | 8.2600E−09 | 7.6900E−09 |
| A20 = |  | 2.1565E−09 | 1.2350E−09 | −1.3817E−10 | −8.6089E−11 |

| Surface # | 18 | 19 | 20 |
|---|---|---|---|
| k = | −1.3944E+01 | −8.8125E−02 | −9.2427E−01 |
| A4 = | 1.3221E−02 | −2.8436E−02 | −3.1547E−02 |
| A6 = | −1.0079E−02 | 4.5449E−03 | 4.2558E−03 |
| A8 = | 1.9957E−03 | −2.8523E−04 | −3.0442E−04 |
| A10 = | −2.0324E−04 | −2.5221E−06 | 2.7042E−06 |
| A12 = | 1.0675E−05 | 1.7864E−06 | 1.3140E−06 |

TABLE 20-continued

| Aspheric Coefficients | | |
|---|---|---|
| A14 = | −1.9603E−07 | −1.3328E−07 | −1.0851E−07 |
| A16 = | −6.3927E−09 | 4.8192E−09 | 4.0263E−09 |
| A18 = | 3.6448E−10 | −8.8759E−11 | −7.4155E−11 |
| A20 = | −4.9631E−12 | 6.6657E−13 | 5.4760E−13 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | |
|---|---|
| f [mm] | 7.62 |
| Fno | 1.95 |
| HFOV [deg.] | 42.5 |
| V6 | 37.4 |
| V7 | 37.4 |
| Vmin | 18.4 |
| Nmax | 1.686 |
| V1/N1 | 36.31 |
| V2/N2 | 15.16 |
| V3/N3 | 10.91 |
| V4/N4 | 36.27 |
| V5/N5 | 36.27 |
| V6/N6 | 23.88 |
| V7/N7 | 23.88 |
| V8/N8 | 36.27 |
| V9/N9 | 36.44 |
| (Vi/Ni)min | 10.91 |
| (V2 + V3)/V1 | 0.76 |
| CTmax/CTmin | 3.24 |
| ΣCT/ΣAT | 1.67 |
| ΣAT/(T23 + T89) | 1.81 |
| ImgH/CTmax | 7.00 |
| (Rao + Rai)/(Rao − Rai) | −0.15 |
| (R17 + R18)/(R17 − R18) | 0.12 |
| |R17/R18| | 1.26 |
| f/f1 | 1.29 |
| f/f8 | 0.66 |
| (|P2| + |P3| + |P4| + |P5| + |P6| + |P7|)/(|P1| + |P8| + |P9|) | 0.44 |
| (TD × BL)/(ImgH × ImgH) | 0.17 |
| BL/TD | 0.14 |
| ImgH/BL | 6.60 |
| EPD/BL | 3.61 |
| f/EPD | 1.95 |
| Y92/Y31 | 3.44 |
| Yc72/f | 0.23 |
| Yc82/f | 0.24 |
| Yc92/f | 0.18 |
| SL/TL | 0.91 |
| TL/f | 1.17 |
| TL/ImgH | 1.24 |
| ImgH [mm] | 7.15 |
| TL [mm] | 8.88 |
| |f/R1| + |f/R2| | 3.16 |
| |f/R3| + |f/R4| | 2.08 |
| |f/R5| + |f/R6| | 1.10 |
| |f/R7| + |f/R8| | 0.41 |
| |f/R9| + |f/R10| | 0.52 |
| |f/R11| + |f/R12| | 0.74 |
| |f/R13| + |f/R14| | 2.04 |
| |f/R15| + |f/R16| | 3.73 |
| |f/R17| + |f/R18| | 2.19 |

11th Embodiment

Figure 21:
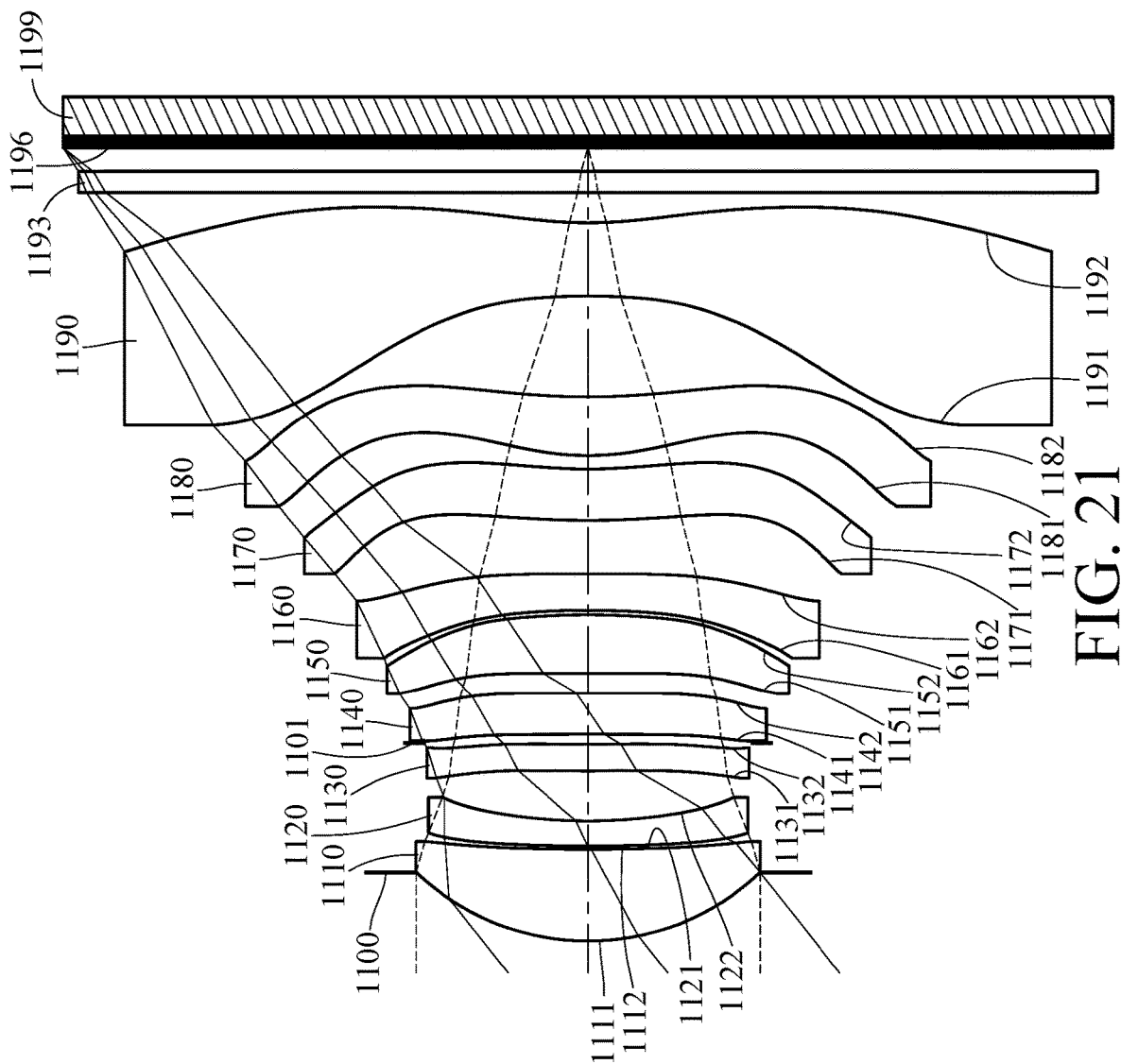
FIG. 21 is a schematic view of an image capturing unit according to the 11th embodiment of the present disclosure.
Figure 22:
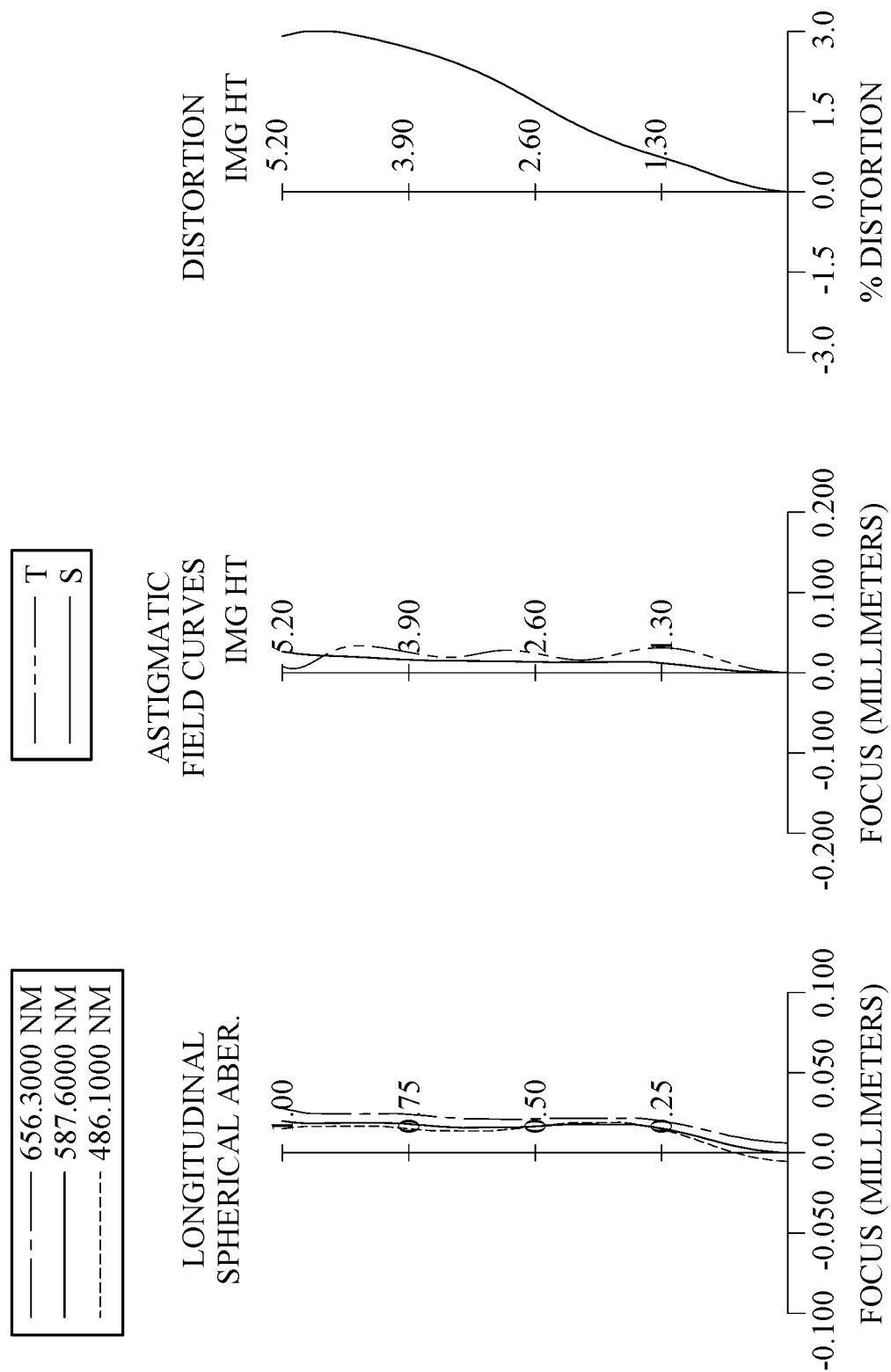
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the imaging optical lens assembly (its reference numeral is omitted) of the present disclosure and an image sensor 1199. The imaging optical lens assembly includes, in order from an object side to an image side along an optical path, an aperture stop 1100, a first lens element 1110, a second lens element 1120, a third lens element 1130, a stop 1101, a fourth lens element 1140, a fifth lens element 1150, a sixth lens element 1160, a seventh lens element 1170, an eighth lens element 1180, a ninth lens element 1190, a filter 1193 and an image surface 1196. In addition, the imaging optical lens assembly has a configuration of a first lens group (the first lens element 1110, the second lens element 1120 and the third lens element 1130), a second lens group (the fourth lens element 1140, the fifth lens element 1150 and the sixth lens element 1160) and a third lens group (the seventh lens element 1170, the eighth lens element 1180 and the ninth lens element 1190). The imaging optical lens assembly includes nine lens elements (1110, 1120, 1130, 1140, 1150, 1160, 1170, 1180 and 1190) with no additional lens element disposed between each of the adjacent nine lens elements.

The first lens element 1110 with positive refractive power has an object-side surface 1111 being convex in a paraxial region thereof and an image-side surface 1112 being concave in a paraxial region thereof. The first lens element 1110 is made of glass material and has the object-side surface 1111 and the image-side surface 1112 being both aspheric. The object-side surface 1111 of the first lens element 1110 has one inflection point. The image-side surface 1112 of the first lens element 1110 has one inflection point.

The second lens element 1120 with negative refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with positive refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric. The object-side surface 1131 of the third lens element 1130 has one inflection point. The image-side surface 1132 of the third lens element 1130 has two inflection points.

The fourth lens element 1140 with negative refractive power has an object-side surface 1141 being concave in a paraxial region thereof and an image-side surface 1142 being convex in a paraxial region thereof. The fourth lens element 1140 is made of plastic material and has the object-side surface 1141 and the image-side surface 1142 being both aspheric. The object-side surface 1141 of the fourth lens element 1140 has one inflection point. The image-side surface 1142 of the fourth lens element 1140 has one inflection point.

The fifth lens element 1150 with positive refractive power has an object-side surface 1151 being convex in a paraxial region thereof and an image-side surface 1152 being convex in a paraxial region thereof. The fifth lens element 1150 is made of plastic material and has the object-side surface 1151 and the image-side surface 1152 being both aspheric. The object-side surface 1151 of the fifth lens element 1150 has three inflection points.

The sixth lens element 1160 with negative refractive power has an object-side surface 1161 being concave in a paraxial region thereof and an image-side surface 1162 being concave in a paraxial region thereof. The sixth lens element 1160 is made of plastic material and has the object-side surface 1161 and the image-side surface 1162 being both aspheric. The image-side surface 1162 of the sixth lens element 1160 has two inflection points.

The seventh lens element 1170 with negative refractive power has an object-side surface 1171 being convex in a paraxial region thereof and an image-side surface 1172 being concave in a paraxial region thereof. The seventh lens element 1170 is made of plastic material and has the object-side surface 1171 and the image-side surface 1172 being both aspheric. The object-side surface 1171 of the seventh lens element 1170 has two inflection points. The image-side surface 1172 of the seventh lens element 1170 has one inflection point. The object-side surface 1171 of the seventh lens element 1170 has at least one critical point in an off-axis region thereof. The image-side surface 1172 of the seventh lens element 1170 has at least one critical point in an off-axis region thereof.

The eighth lens element 1180 with positive refractive power has an object-side surface 1181 being convex in a paraxial region thereof and an image-side surface 1182 being concave in a paraxial region thereof. The eighth lens element 1180 is made of plastic material and has the object-side surface 1181 and the image-side surface 1182 being both aspheric. The object-side surface 1181 of the eighth lens element 1180 has two inflection points. The image-side surface 1182 of the eighth lens element 1180 has two inflection points. The object-side surface 1181 of the eighth lens element 1180 has at least one critical point in an off-axis region thereof. The image-side surface 1182 of the eighth lens element 1180 has at least one critical point in an off-axis region thereof.

The ninth lens element 1190 with negative refractive power has an object-side surface 1191 being concave in a paraxial region thereof and an image-side surface 1192 being concave in a paraxial region thereof. The ninth lens element 1190 is made of plastic material and has the object-side surface 1191 and the image-side surface 1192 being both aspheric. The object-side surface 1191 of the ninth lens element 1190 has one inflection point. The image-side surface 1192 of the ninth lens element 1190 has two inflection points. The image-side surface 1192 of the ninth lens element 1190 has at least one critical point in an off-axis region thereof.

The filter 1193 is made of glass material and located between the ninth lens element 1190 and the image surface 1196, and will not affect the focal length of the imaging optical lens assembly. The image sensor 1199 is disposed on or near the image surface 1196 of the imaging optical lens assembly.

The detailed optical data of the 11th embodiment are shown in Table 21 and the aspheric surface data are shown in Table 22 below.

TABLE 21

11th Embodiment f = 6.35 mm, Fno = 1.86, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.678 | | | | |
| 2 | Lens 1 | 2.539 | (ASP) | 0.909 | Glass | 1.548 | 45.8 | 5.24 |
| 3 | | 19.043 | (ASP) | 0.030 | | | | |
| 4 | Lens 2 | 12.668 | (ASP) | 0.250 | Plastic | 1.720 | 17.0 | −12.26 |
| 5 | | 5.159 | (ASP) | 0.498 | | | | |
| 6 | Lens 3 | 27.040 | (ASP) | 0.266 | Plastic | 1.686 | 18.4 | 131.05 |
| 7 | | 38.515 | (ASP) | 0.012 | | | | |
| 8 | Stop | Plano | | 0.085 | | | | |
| 9 | Lens 4 | −86.480 | (ASP) | 0.413 | Plastic | 1.544 | 56.0 | −391.81 |
| 10 | | −145.764 | (ASP) | 0.195 | | | | |
| 11 | Lens 5 | 117.569 | (ASP) | 0.583 | Plastic | 1.544 | 56.0 | 10.61 |
| 12 | | −6.059 | (ASP) | 0.044 | | | | |
| 13 | Lens 6 | −7.608 | (ASP) | 0.360 | Plastic | 1.583 | 28.4 | −11.58 |
| 14 | | 60.598 | (ASP) | 0.534 | | | | |
| 15 | Lens 7 | 9.374 | (ASP) | 0.508 | Plastic | 1.560 | 43.9 | −22.37 |
| 16 | | 5.256 | (ASP) | 0.134 | | | | |
| 17 | Lens 8 | 2.594 | (ASP) | 0.587 | Plastic | 1.544 | 56.0 | 6.92 |
| 18 | | 7.673 | (ASP) | 1.002 | | | | |
| 19 | Lens 9 | −7.473 | (ASP) | 0.725 | Plastic | 1.544 | 56.0 | −4.88 |
| 20 | | 4.263 | (ASP) | 0.300 | | | | |
| 21 | Filter | Plano | | 0.210 | Glass | 1.517 | 64.2 | — |
| 22 | | Plano | | 0.233 | | | | |
| 23 | Image | Plano | | — | | | | |

Note:
Reference wavelength is 587.6 nm (d-line).
An effective radius of the stop 1101 (Surface 8) is 1.630 mm.

TABLE 22

| Aspheric Coefficients | | | | | |
|---|---|---|---|---|---|
| Surface # | 2 | 3 | 4 | 5 | 6 |
| k = | −4.2736E−01 | −4.4274E+01 | 3.3089E+00 | 5.9150E+00 | −2.2162E+01 |
| A4 = | 4.4877E−03 | −2.5207E−02 | −3.2136E−02 | −1.7583E−02 | −3.1615E−02 |
| A6 = | 2.9534E−03 | 5.0096E−02 | 5.4186E−02 | 1.7193E−02 | 2.4124E−03 |
| A8 = | −3.3086E−03 | −4.2693E−02 | −4.3890E−02 | −1.2653E−02 | −3.1295E−03 |
| A10 = | 3.1164E−03 | 2.0523E−02 | 2.0720E−02 | 6.1547E−03 | 3.3375E−03 |
| A12 = | −1.5789E−03 | −5.4762E−03 | −5.0650E−03 | −1.4002E−03 | −5.7944E−04 |
| A14 = | 4.2264E−04 | 7.2365E−04 | 5.1297E−04 | 1.4346E−04 | −5.9612E−05 |
| A16 = | −4.8068E−05 | −3.5774E−05 | — | — | — |
| Surface # | 7 | 9 | 10 | 11 | 12 |
| k = | 3.0000E+01 | −1.0000E+00 | 8.0307E+01 | −7.3386E+01 | 5.1107E+00 |
| A4 = | −2.1700E−02 | 7.1075E−03 | 8.0003E−03 | 1.1039E−02 | 8.0892E−02 |
| A6 = | −4.4511E−03 | −2.3410E−02 | −4.8689E−02 | −5.2843E−02 | −1.2101E−01 |
| A8 = | −1.3200E−03 | 2.1222E−02 | 5.4834E−02 | 4.0151E−02 | 7.5190E−02 |
| A10 = | 5.2137E−03 | −2.1081E−02 | −4.3658E−02 | −1.8901E−02 | −2.8069E−02 |
| A12 = | −1.7867E−03 | 1.6086E−02 | 2.2355E−02 | 3.6959E−03 | 6.8670E−03 |
| A14 = | 1.8922E−04 | −7.4757E−03 | −7.0601E−03 | 1.0591E−03 | −1.0888E−03 |
| A16 = | — | 1.8794E−03 | 1.2746E−03 | 7.3837E−04 | 1.0204E−04 |
| A18 = | — | −1.9198E−04 | −9.9272E−05 | 1.5152E−04 | −4.3041E−06 |
| A20 = | — | — | — | −1.1257E−05 | — |
| Surface # | 13 | 14 | 15 | 16 | 17 |
| k = | 8.7789E+00 | 4.9524E+01 | −6.8087E+00 | −3.2216E+01 | −1.1961E+00 |
| A4 = | 3.4019E−02 | −4.1136E−02 | −1.4023E−03 | −1.6817E−02 | −4.8113E−02 |
| A6 = | −7.0385E−02 | 1.5035E−02 | −1.0066E−02 | −6.8768E−03 | 4.7601E−03 |
| A8 = | 4.2554E−02 | −5.0148E−03 | 4.3911E−03 | 5.1877E−03 | −3.4944E−04 |
| A10 = | −1.1150E−02 | 1.8126E−03 | −1.4447E−03 | −1.8979E−03 | −1.6818E−04 |
| A12 = | 4.6842E−04 | −7.0290E−04 | 2.3762E−04 | 3.5192E−04 | 8.2036E−05 |
| A14 = | 4.0802E−04 | 1.9301E−04 | −1.5864E−05 | −3.1082E−05 | −1.4951E−05 |
| A16 = | −8.5377E−05 | −2.9490E−05 | 4.0169E−08 | 8.6964E−07 | 1.2905E−06 |
| A18 = | 5.1621E−06 | 2.2444E−06 | 2.8714E−08 | 3.7295E−08 | −4.8729E−08 |
| A20 = | — | −6.6457E−08 | — | −2.0373E−09 | 5.1581E−10 |
| Surface # | 18 | 19 | 20 | | |
| k = | −6.6069E+00 | 1.3586E−18 | −1.0378E+00 | | |
| A4 = | 5.9115E−03 | −4.1577E−02 | −4.0044E−02 | | |
| A6 = | −9.0938E−03 | 1.1592E−02 | 8.7520E−03 | | |
| A8 = | 1.9426E−03 | −2.1153E−03 | −1.3137E−03 | | |
| A10 = | −1.0957E−04 | 2.7124E−04 | 1.2924E−04 | | |
| A12 = | −2.8369E−05 | −2.1882E−05 | −8.3456E−06 | | |
| A14 = | 6.4256E−06 | 1.0195E−06 | 3.5105E−07 | | |
| A16 = | −5.8186E−07 | −2.3106E−08 | −9.2484E−09 | | |
| A18 = | 2.6019E−08 | 8.1668E−11 | 1.3787E−10 | | |
| A20 = | −4.6930E−10 | 3.9384E−12 | −8.7872E−13 | | |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | |
|---|---|
| f [mm] | 6.35 |
| Fno | 1.86 |
| HFOV [deg.] | 38.4 |
| V6 | 28.4 |
| V7 | 43.9 |
| Vmin | 17.0 |
| Nmax | 1.720 |
| V1/N1 | 29.59 |
| V2/N2 | 9.88 |

-continued

| 11th Embodiment | |
|---|---|
| V3/N3 | 10.91 |
| V4/N4 | 36.27 |
| V5/N5 | 36.27 |
| V6/N6 | 17.94 |
| V7/N7 | 28.14 |
| V8/N8 | 36.27 |
| V9/N9 | 36.27 |
| (Vi/Ni)min | 9.88 |
| (V2 + V3)/V1 | 0.77 |
| CTmax/CTmin | 3.64 |
| ΣCT/ΣAT | 1.82 |
| ΣAT/(T23 + T89) | 1.69 |
| ImgH/CTmax | 5.72 |
| (Rao + Rai)/(Rao − Rai) | 0.01 |
| (R17 + R18)/(R17 − R18) | 0.27 |
| |R17/R18| | 1.75 |
| f/f1 | 1.21 |
| f/f8 | 0.92 |
| (|P2| + |P3| + |P4| + |P5| + |P6| + |P7|)/ (|P1| + |P8| + |P9|) | 0.59 |
| (TD × BL)/(ImgH × ImgH) | 0.20 |

| 11th Embodiment | |
|---|---|
| BL/TD | 0.10 |
| ImgH/BL | 7.00 |
| EPD/BL | 4.60 |
| f/EPD | 1.86 |
| Y92/Y31 | 3.06 |
| Yc72/f | 0.19 |
| Yc82/f | 0.27 |
| Yc92/f | 0.33 |
| SL/TL | 0.91 |
| TL/f | 1.24 |
| TL/ImgH | 1.51 |
| ImgH [mm] | 5.20 |
| TL [mm] | 7.88 |
| \|f/R1\| + \|f/R2\| | 2.84 |
| \|f/R3\| + \|f/R4\| | 1.73 |
| \|f/R5\| + \|f/R6\| | 0.40 |
| \|f/R7\| + \|f/R8\| | 0.12 |
| \|f/R9\| + \|f/R10\| | 1.10 |
| \|f/R11\| + \|f/R12\| | 0.94 |
| \|f/R13\| + \|f/R14\| | 1.89 |
| \|f/R15\| + \|f/R16\| | 3.28 |
| \|f/R17\| + \|f/R18\| | 2.34 |

12th Embodiment

Figure 23:
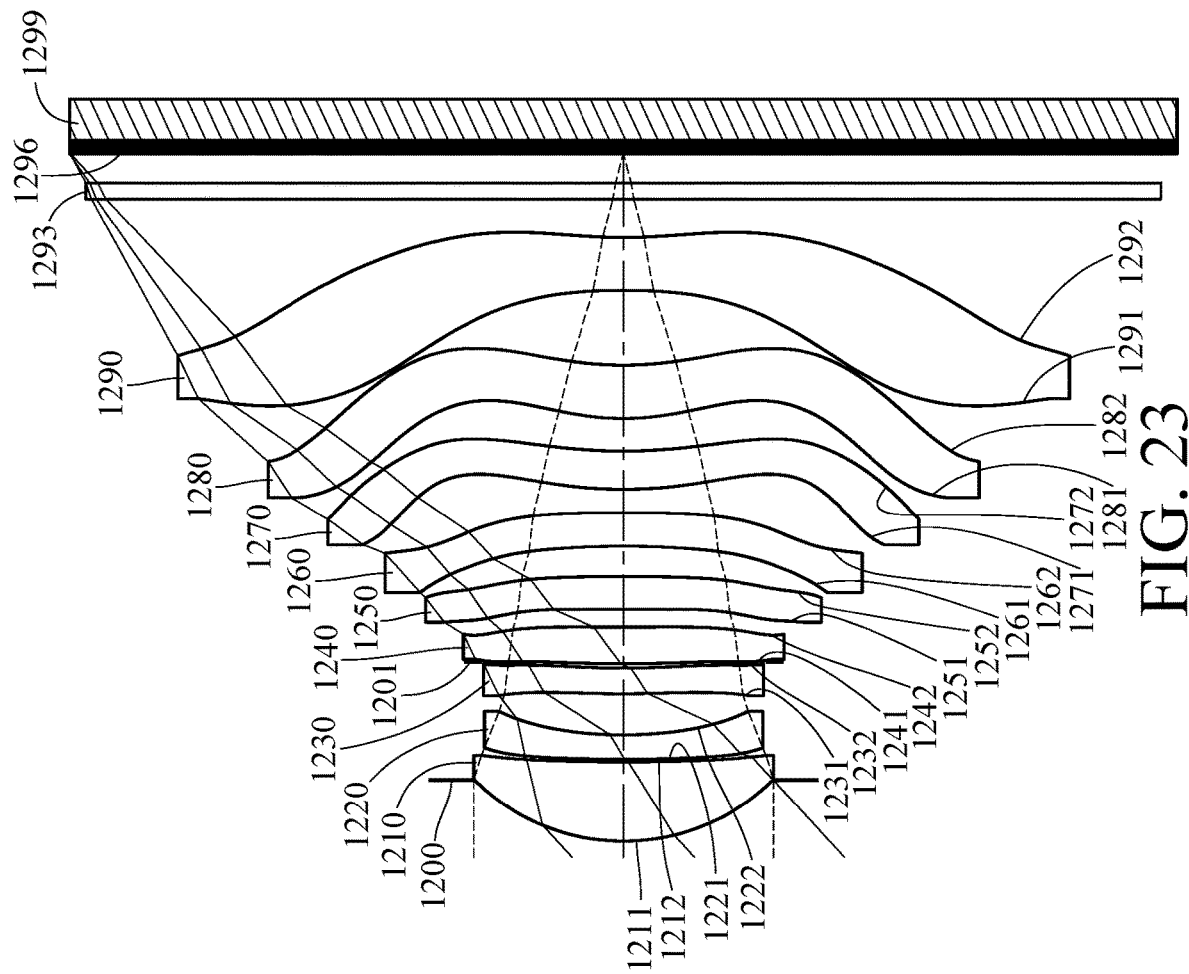
FIG. 23 is a schematic view of an image capturing unit according to the 12th embodiment of the present disclosure.
Figure 24:
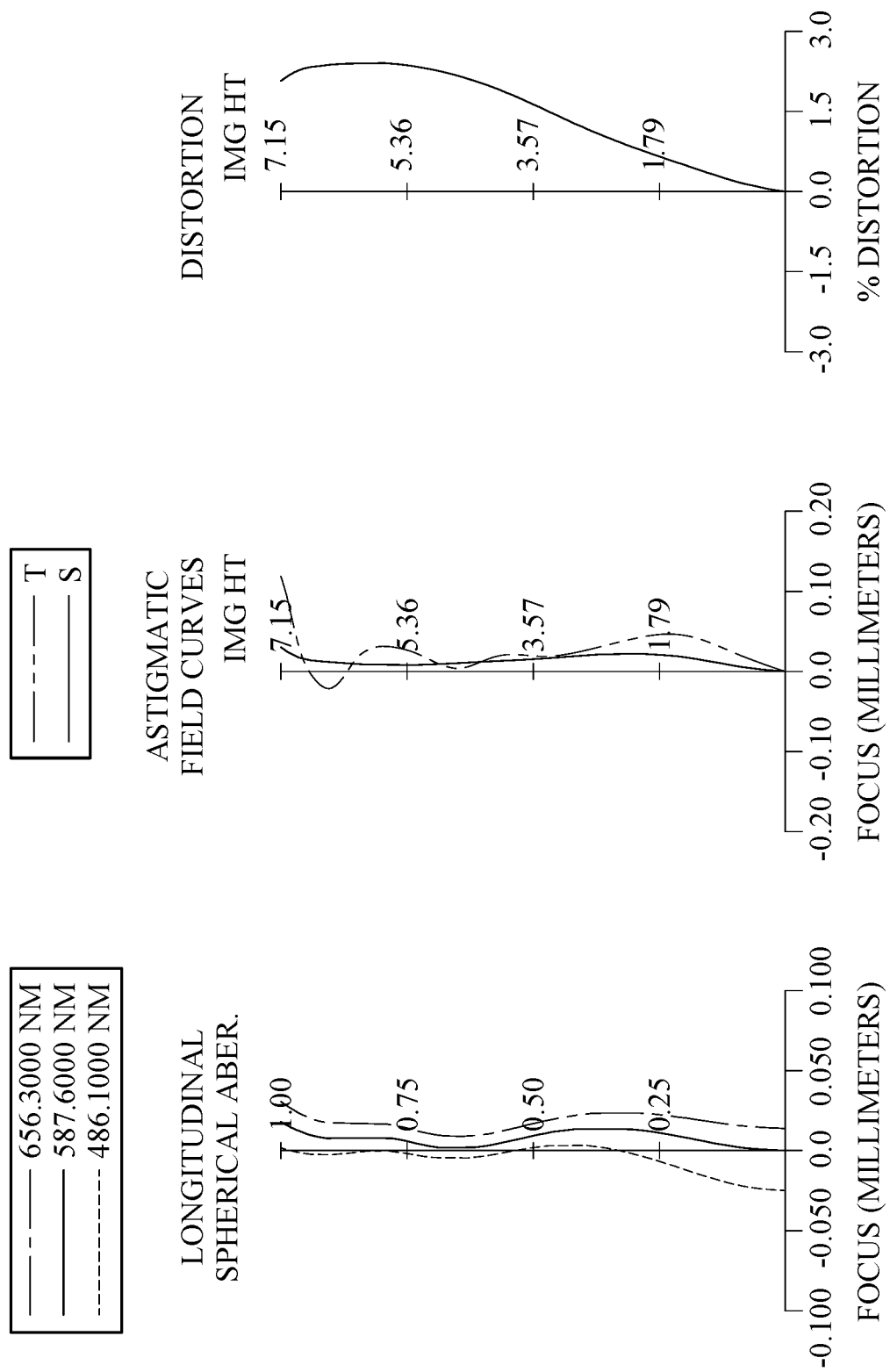
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the imaging optical lens assembly (its reference numeral is omitted) of the present disclosure and an image sensor 1299. The imaging optical lens assembly includes, in order from an object side to an image side along an optical path, an aperture stop 1200, a first lens element 1210, a second lens element 1220, a third lens element 1230, a stop 1201, a fourth lens element 1240, a fifth lens element 1250, a sixth lens element 1260, a seventh lens element 1270, an eighth lens element 1280, a ninth lens element 1290, a filter 1293 and an image surface 1296. In addition, the imaging optical lens assembly has a configuration of a first lens group (the first lens element 1210, the second lens element 1220 and the third lens element 1230), a second lens group (the fourth lens element 1240, the fifth lens element 1250 and the sixth lens element 1260) and a third lens group (the seventh lens element 1270, the eighth lens element 1280 and the ninth lens element 1290). The imaging optical lens assembly includes nine lens elements (1210, 1220, 1230, 1240, 1250, 1260, 1270, 1280 and 1290) with no additional lens element disposed between each of the adjacent nine lens elements.

The first lens element 1210 with positive refractive power has an object-side surface 1211 being convex in a paraxial region thereof and an image-side surface 1212 being concave in a paraxial region thereof. The first lens element 1210 is made of plastic material and has the object-side surface 1211 and the image-side surface 1212 being both aspheric. The image-side surface 1212 of the first lens element 1210 has one inflection point.

The second lens element 1220 with negative refractive power has an object-side surface 1221 being convex in a paraxial region thereof and an image-side surface 1222 being concave in a paraxial region thereof. The second lens element 1220 is made of plastic material and has the object-side surface 1221 and the image-side surface 1222 being both aspheric.

The third lens element 1230 with negative refractive power has an object-side surface 1231 being convex in a paraxial region thereof and an image-side surface 1232 being concave in a paraxial region thereof. The third lens element 1230 is made of plastic material and has the object-side surface 1231 and the image-side surface 1232 being both aspheric. The object-side surface 1231 of the third lens element 1230 has one inflection point. The image-side surface 1232 of the third lens element 1230 has two inflection points.

The fourth lens element 1240 with positive refractive power has an object-side surface 1241 being convex in a paraxial region thereof and an image-side surface 1242 being concave in a paraxial region thereof. The fourth lens element 1240 is made of plastic material and has the object-side surface 1241 and the image-side surface 1242 being both aspheric. The object-side surface 1241 of the fourth lens element 1240 has two inflection points. The image-side surface 1242 of the fourth lens element 1240 has two inflection points.

The fifth lens element 1250 with positive refractive power has an object-side surface 1251 being convex in a paraxial region thereof and an image-side surface 1252 being convex in a paraxial region thereof. The fifth lens element 1250 is made of plastic material and has the object-side surface 1251 and the image-side surface 1252 being both aspheric. The object-side surface 1251 of the fifth lens element 1250 has three inflection points. The image-side surface 1252 of the fifth lens element 1250 has two inflection points.

The sixth lens element 1260 with negative refractive power has an object-side surface 1261 being concave in a paraxial region thereof and an image-side surface 1262 being convex in a paraxial region thereof. The sixth lens element 1260 is made of plastic material and has the object-side surface 1261 and the image-side surface 1262 being both aspheric. The object-side surface 1261 of the sixth lens element 1260 has one inflection point. The image-side surface 1262 of the sixth lens element 1260 has two inflection points.

The seventh lens element 1270 with positive refractive power has an object-side surface 1271 being convex in a paraxial region thereof and an image-side surface 1272 being concave in a paraxial region thereof. The seventh lens element 1270 is made of plastic material and has the object-side surface 1271 and the image-side surface 1272 being both aspheric. The object-side surface 1271 of the seventh lens element 1270 has three inflection points. The image-side surface 1272 of the seventh lens element 1270 has two inflection points. The object-side surface 1271 of the seventh lens element 1270 has at least one critical point in an off-axis region thereof. The image-side surface 1272 of the seventh lens element 1270 has at least one critical point in an off-axis region thereof.

The eighth lens element 1280 with positive refractive power has an object-side surface 1281 being convex in a paraxial region thereof and an image-side surface 1282 being concave in a paraxial region thereof. The eighth lens element 1280 is made of plastic material and has the object-side surface 1281 and the image-side surface 1282 being both aspheric. The object-side surface 1281 of the eighth lens element 1280 has two inflection points. The image-side surface 1282 of the eighth lens element 1280 has two inflection points. The object-side surface 1281 of the eighth lens element 1280 has at least one critical point in an off-axis region thereof. The image-side surface 1282 of the eighth lens element 1280 has at least one critical point in an off-axis region thereof.

The ninth lens element 1290 with negative refractive power has an object-side surface 1291 being concave in a paraxial region thereof and an image-side surface 1292 being concave in a paraxial region thereof. The ninth lens element 1290 is made of plastic material and has the object-side surface 1291 and the image-side surface 1292 being both aspheric. The object-side surface 1291 of the ninth lens element 1290 has two inflection points. The image-side surface 1292 of the ninth lens element 1290 has three inflection points. The object-side surface 1291 of the ninth lens element 1290 has at least one critical point in an off-axis region thereof. The image-side surface 1292 of the ninth lens element 1290 has at least one critical point in an off-axis region thereof.

The filter 1293 is made of glass material and located between the ninth lens element 1290 and the image surface 1296, and will not affect the focal length of the imaging optical lens assembly. The image sensor 1299 is disposed on or near the image surface 1296 of the imaging optical lens assembly.

The detailed optical data of the 12th embodiment are shown in Table 23 and the aspheric surface data are shown in Table 24 below.

TABLE 23

12th Embodiment $f = 7.62$ mm, Fno = 1.97, HFOV = 42.5 deg.

| Surface # |           | Curvature Radius |       | Thickness | Material | Index | Abbe # | Focal Length |
|-----------|-----------|------------------|-------|-----------|----------|-------|--------|--------------|
| 0         | Object    | Plano            |       | Infinity  |          |       |        |              |
| 1         | Ape. Stop | Plano            |       | −0.790    |          |       |        |              |
| 2         | Lens 1    | 2.790            | (ASP) | 1.026     | Plastic  | 1.545 | 56.1   | 5.80         |
| 3         |           | 20.727           | (ASP) | 0.035     |          |       |        |              |
| 4         | Lens 2    | 15.617           | (ASP) | 0.315     | Plastic  | 1.614 | 26.0   | −12.24       |
| 5         |           | 5.035            | (ASP) | 0.531     |          |       |        |              |
| 6         | Lens 3    | 14.527           | (ASP) | 0.332     | Plastic  | 1.686 | 18.4   | −100.29      |
| 7         |           | 11.883           | (ASP) | 0.081     |          |       |        |              |
| 8         | Stop      | Plano            |       | −0.024    |          |       |        |              |
| 9         | Lens 4    | 23.497           | (ASP) | 0.470     | Plastic  | 1.544 | 56.0   | 61.25        |
| 10        |           | 79.119           | (ASP) | 0.230     |          |       |        |              |
| 11        | Lens 5    | 198.116          | (ASP) | 0.425     | Plastic  | 1.544 | 56.0   | 35.78        |
| 12        |           | −21.573          | (ASP) | 0.389     |          |       |        |              |
| 13        | Lens 6    | −11.454          | (ASP) | 0.435     | Plastic  | 1.566 | 37.4   | −33.72       |
| 14        |           | −29.036          | (ASP) | 0.304     |          |       |        |              |
| 15        | Lens 7    | 6.431            | (ASP) | 0.495     | Plastic  | 1.566 | 37.4   | 104.22       |
| 16        |           | 7.017            | (ASP) | 0.418     |          |       |        |              |
| 17        | Lens 8    | 3.195            | (ASP) | 0.690     | Plastic  | 1.544 | 56.0   | 15.08        |
| 18        |           | 4.834            | (ASP) | 0.962     |          |       |        |              |
| 19        | Lens 9    | −9.096           | (ASP) | 0.684     | Plastic  | 1.534 | 55.9   | −6.84        |
| 20        |           | 6.264            | (ASP) | 0.500     |          |       |        |              |
| 21        | Filter    | Plano            |       | 0.210     | Glass    | 1.517 | 64.2   | —            |
| 22        |           | Plano            |       | 0.373     |          |       |        |              |
| 23        | Image     | Plano            |       | —         |          |       |        |              |

Note:
Reference wavelength is 587.6 nm (d-line).
An effective radius of the stop 1201 (Surface 8) is 1.860 mm.

TABLE 24

Aspheric Coefficients

| Surface # | 2 | 3 | 4 | 5 | 6 |
|---|---|---|---|---|---|
| k =   | −3.9305E−01 | −6.3315E+01 | 1.0584E+00  | 4.9574E+00  | −3.8417E+01 |
| A4 =  | 3.6031E−03  | −1.9234E−02 | −2.3899E−02 | −1.0591E−02 | −1.2975E−02 |
| A6 =  | 1.4708E−04  | 2.3488E−02  | 2.7249E−02  | 9.3757E−03  | −8.5875E−04 |
| A8 =  | 1.9357E−05  | −1.3349E−02 | −1.4483E−02 | −6.3862E−03 | −2.4699E−03 |
| A10 = | 2.4312E−04  | 4.7014E−03  | 4.7589E−03  | 2.9658E−03  | 2.0097E−03  |
| A12 = | −1.5845E−04 | −1.0165E−03 | −8.5441E−04 | −7.3682E−04 | −5.3099E−04 |
| A14 = | 4.2846E−05  | 1.2459E−04  | 6.8353E−05  | 8.0601E−05  | 4.1981E−05  |
| A16 = | −4.5537E−06 | −6.8951E−06 | —           | —           | —           |

| Surface # | 7 | 9 | 10 | 11 | 12 |
|---|---|---|---|---|---|
| k =   | 1.0205E+01  | 5.2319E+01  | −8.1041E+01 | −5.9267E+01 | 3.8975E+01  |
| A4 =  | −4.6349E−03 | 1.3968E−03  | −7.5243E−03 | −5.7489E−03 | 5.5664E−03  |
| A6 =  | −2.7397E−03 | 4.9288E−03  | −2.7362E−03 | 2.4213E−03  | −2.2239E−03 |
| A8 =  | −6.0193E−03 | −1.5515E−02 | −1.9786E−03 | −1.5683E−02 | −4.4545E−03 |
| A10 = | 4.6843E−03  | 1.1314E−02  | 2.9025E−03  | 1.3003E−02  | 2.2908E−03  |
| A12 = | −1.1750E−03 | −4.1215E−03 | −1.3980E−03 | −5.5431E−03 | −3.8207E−04 |
| A14 = | 1.0506E−04  | 7.9444E−04  | 3.0850E−04  | 1.4670E−03  | 1.7501E−05  |

TABLE 24-continued

| Aspheric Coefficients | | | | | |
|---|---|---|---|---|---|
| A16 = | — | −6.2760E−05 | −2.4805E−05 | −2.3765E−04 | 1.3123E−06 |
| A18 = | — | — | — | 2.1174E−05 | −1.1072E−07 |
| A20 = | — | — | — | −7.8659E−07 | — |

| Surface # | 13 | 14 | 15 | 16 | 17 |
|---|---|---|---|---|---|
| k = | 1.3886E+01 | 4.9829E+00 | −3.4862E−01 | −5.2894E+00 | −1.4545E+00 |
| A4 = | 4.2020E−03 | 3.8588E−03 | 1.7609E−02 | −3.6139E−03 | −2.1952E−02 |
| A6 = | −6.0026E−03 | −1.9188E−02 | −1.7029E−02 | 4.4258E−04 | −2.8605E−03 |
| A8 = | 4.4276E−03 | 1.1283E−02 | 6.2202E−03 | −9.3670E−04 | 1.0206E−03 |
| A10 = | −2.6780E−03 | −3.9646E−03 | −1.6760E−03 | 2.9282E−04 | −1.7572E−04 |
| A12 = | 8.5762E−04 | 8.5678E−04 | 3.0866E−04 | −5.2296E−05 | 2.1331E−05 |
| A14 = | −1.4053E−04 | −1.1104E−04 | −3.7734E−05 | 5.8943E−06 | −1.9024E−06 |
| A16 = | 1.1291E−05 | 8.3834E−06 | 2.8882E−06 | −3.9958E−07 | 1.2586E−07 |
| A18 = | −3.5223E−07 | −3.3945E−07 | −1.2247E−07 | 1.4644E−08 | −5.7417E−09 |
| A20 = | — | 5.6828E−09 | 2.1574E−09 | −2.2146E−10 | 1.5473E−10 |

| Surface # | 18 | 19 | 20 |
|---|---|---|---|
| k = | −1.2345E+01 | −5.8566E−01 | −2.3191E+00 |
| A4 = | 1.5954E−02 | −2.5148E−02 | −3.2946E−02 |
| A6 = | −1.3371E−02 | 6.1954E−03 | 7.2124E−03 |
| A8 = | 3.7887E−03 | −1.3434E−03 | −1.4145E−03 |
| A10 = | −7.2106E−04 | 2.1539E−04 | 2.1104E−04 |
| A12 = | 9.6056E−05 | −2.2521E−05 | −2.2224E−05 |
| A14 = | −8.8870E−06 | 1.5519E−06 | 1.6329E−06 |
| A16 = | 5.6276E−07 | −7.1699E−08 | −8.3768E−08 |
| A18 = | −2.3752E−08 | 2.2101E−09 | 2.9785E−09 |
| A20 = | 6.3478E−10 | −4.3754E−11 | −7.1682E−11 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | |
|---|---|
| f [mm] | 7.62 |
| Fno | 1.97 |
| HFOV [deg.] | 42.5 |
| V6 | 37.4 |
| V7 | 37.4 |
| Vmin | 18.4 |
| Nmax | 1.686 |
| V1/N1 | 36.31 |
| V2/N2 | 16.11 |
| V3/N3 | 10.91 |
| V4/N4 | 36.27 |
| V5/N5 | 36.27 |
| V6/N6 | 23.88 |
| V7/N7 | 23.88 |
| V8/N8 | 36.27 |
| V9/N9 | 36.44 |
| (Vi/Ni)min | 10.91 |
| (V2 + V3)/V1 | 0.79 |
| CTmax/CTmin | 3.26 |
| ΣCT/ΣAT | 1.67 |
| ΣAT/(T23 + T89) | 1.96 |
| ImgH/CTmax | 6.96 |
| (Rao + Rai)/(Rao − Rai) | −0.31 |
| (R17 + R18)/(R17 − R18) | 0.18 |
| |R17/R18| | 1.45 |
| f/f1 | 1.31 |
| f/f8 | 0.51 |
| (|P2| + |P3| + |P4| + |P5| + |P6| + |P7|)/(|P1| + |P8| + |P9|) | 0.46 |

| 12th Embodiment | |
|---|---|
| (TD × BL)/(ImgH × ImgH) | 0.17 |
| BL/TD | 0.14 |
| ImgH/BL | 6.60 |
| EPD/BL | 3.57 |
| f/EPD | 1.97 |
| Y92/Y31 | 3.58 |
| Yc72/f | 0.25 |
| Yc82/f | 0.25 |
| Yc92/f | 0.19 |
| SL/TL | 0.91 |
| TL/f | 1.16 |
| TL/ImgH | 1.24 |
| ImgH [mm] | 7.15 |
| TL [mm] | 8.88 |
| |f/R1| + |f/R2| | 3.10 |
| |f/R3| + |f/R4| | 2.00 |
| |f/R5| + |f/R6| | 1.17 |
| |f/R7| + |f/R8| | 0.42 |
| |f/R9| + |f/R10| | 0.39 |
| |f/R11| + |f/R12| | 0.93 |
| |f/R13| + |f/R14| | 2.27 |
| |f/R15| + |f/R16| | 3.96 |
| |f/R17| + |f/R18| | 2.06 |
| — | — |

13th Embodiment

Figure 25:
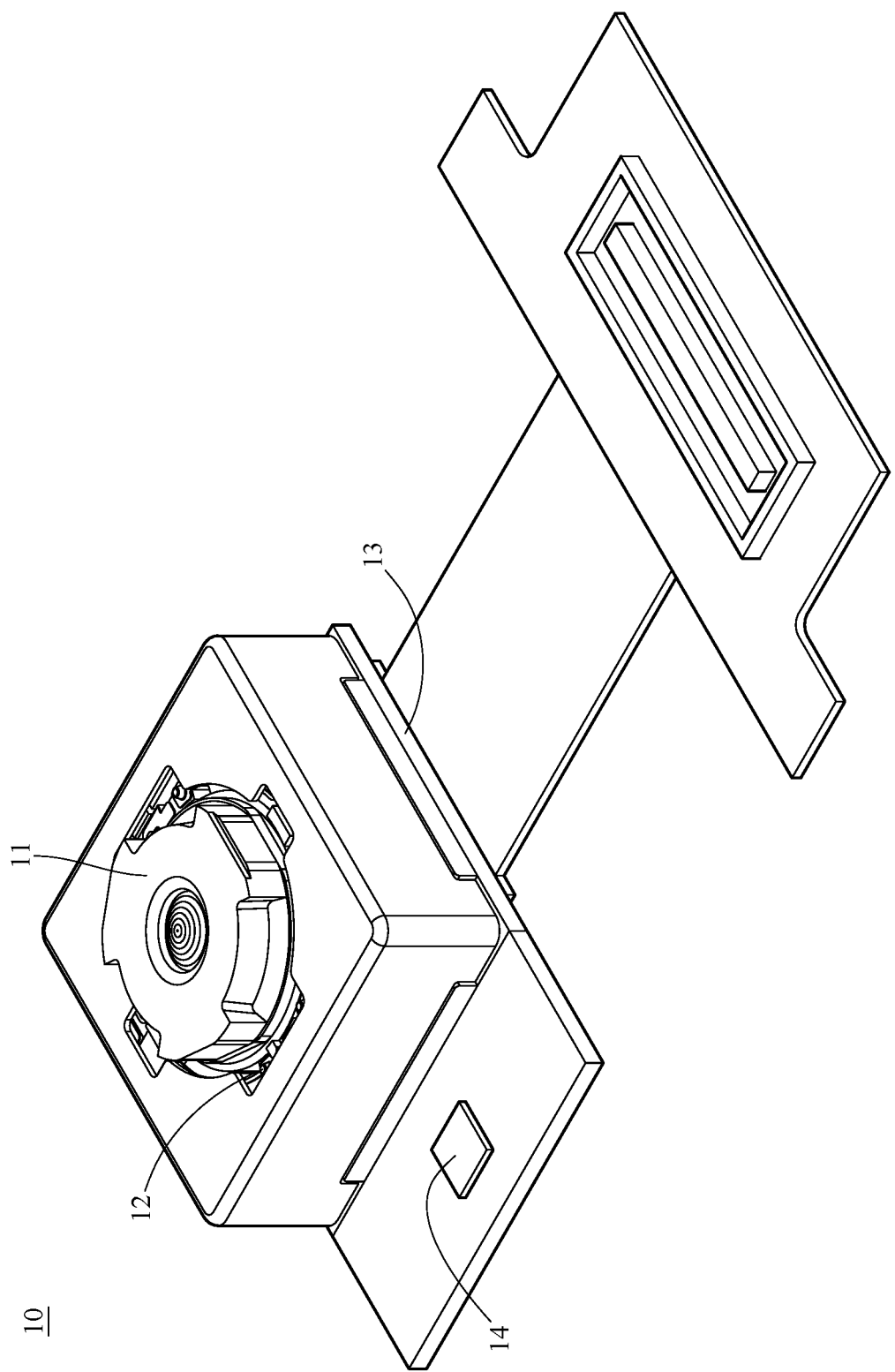
FIG. 25 is a perspective view of an image capturing unit according to the 13th embodiment of the present disclosure.

FIG. 25 is a perspective view of an image capturing unit according to the 13th embodiment of the present disclosure. In this embodiment, an image capturing unit 10 is a camera module including a lens unit 11, a driving device 12, an image sensor 13 and an image stabilizer 14. The lens unit 11 includes an optical lens assembly, a barrel and a holder member (their reference numerals are omitted) for holding the optical lens assembly, wherein the optical lens assembly can be the imaging optical lens assembly disclosed in the 1st embodiment. However, the lens unit 11 may alternatively be provided with the imaging optical lens assembly disclosed in other embodiments, the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing. Moreover, the image sensor 13 can have, for example, 40 million pixels or more. Therefore, it is favorable for providing users with proper image details.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

14th Embodiment

Figure 26:
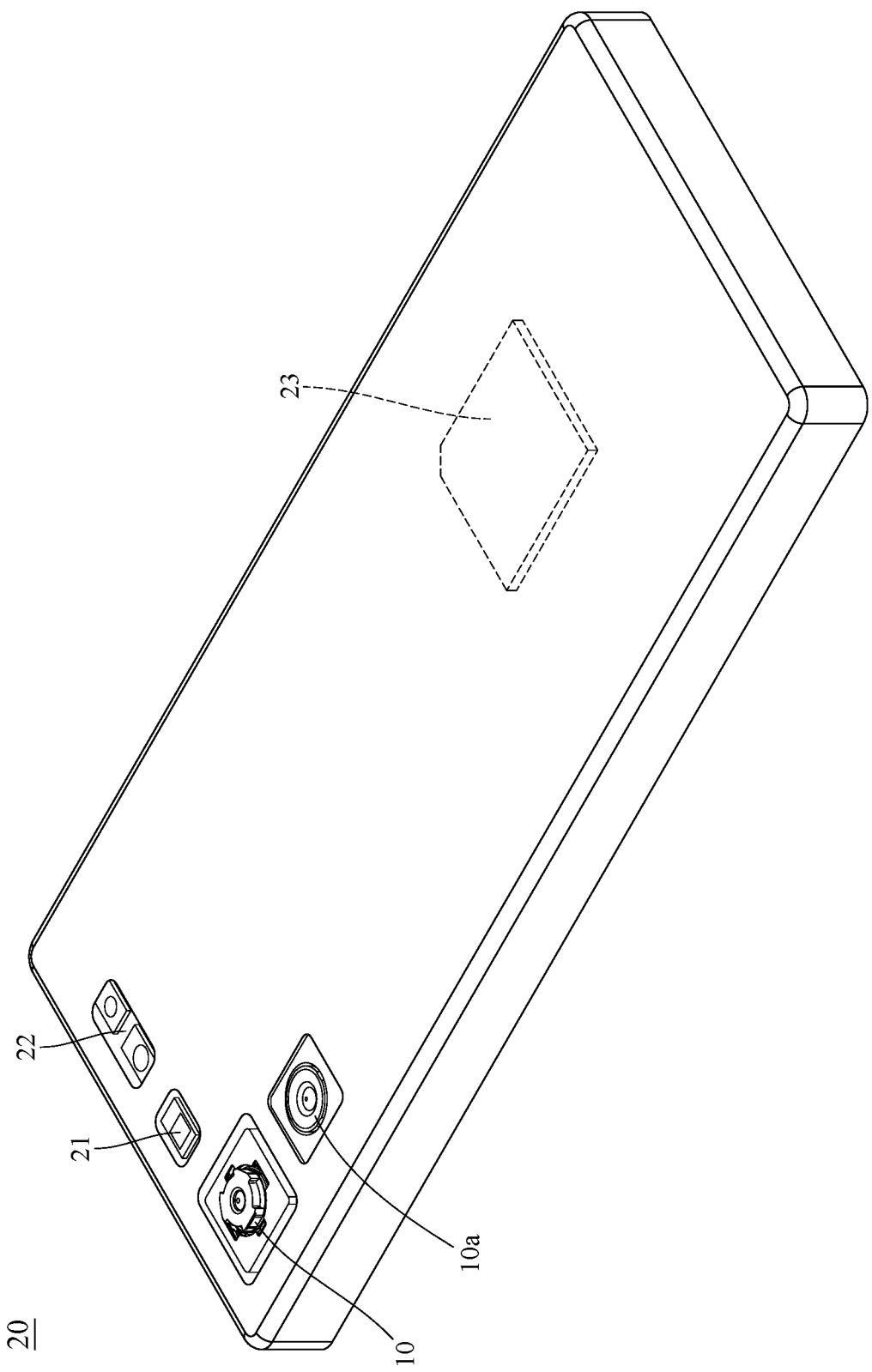
FIG. 26 is one perspective view of an electronic device according to the 14th embodiment of the present disclosure.
Figure 27:
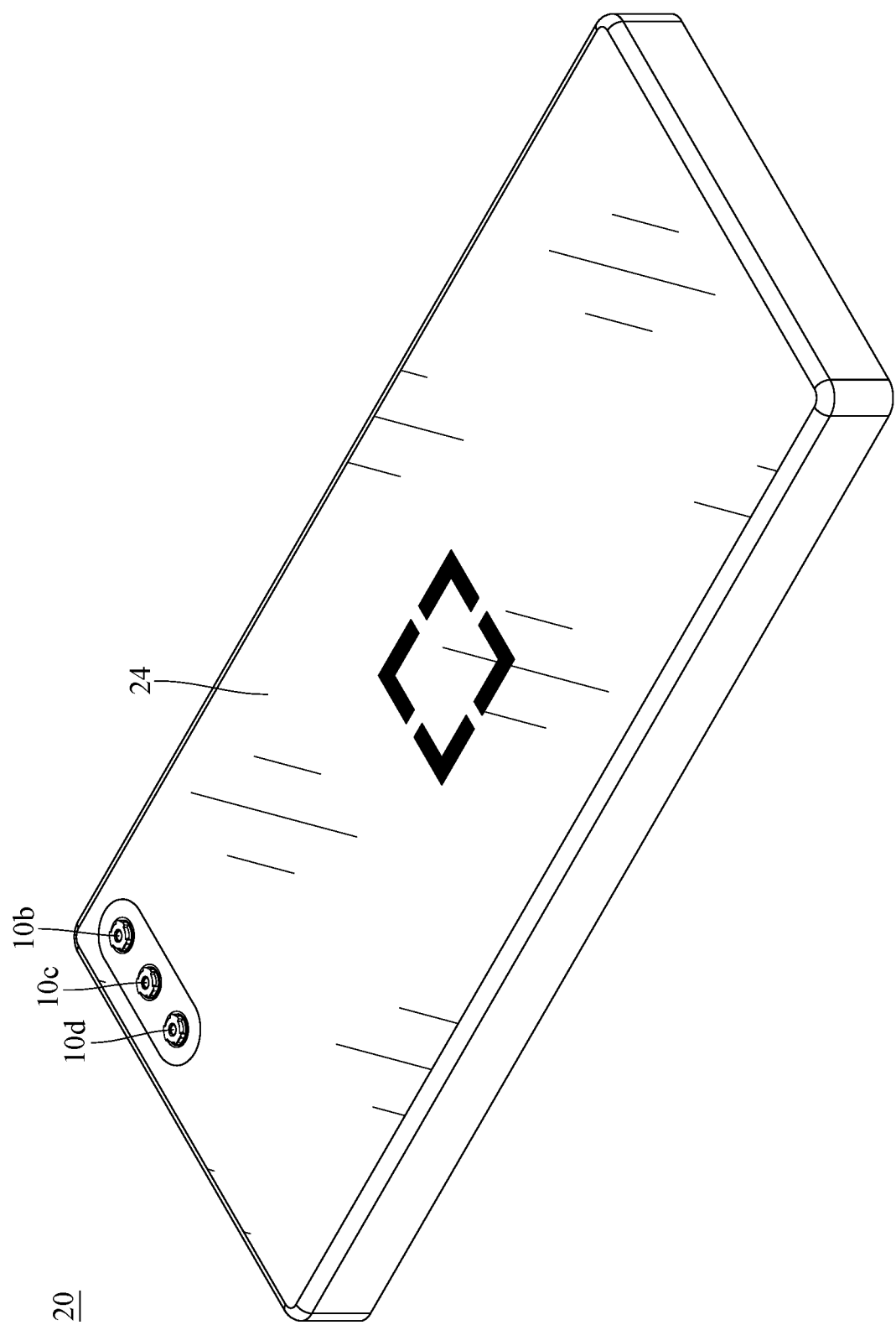
FIG. 27 is another perspective view of the electronic device in FIG. 26.
Figure 28:
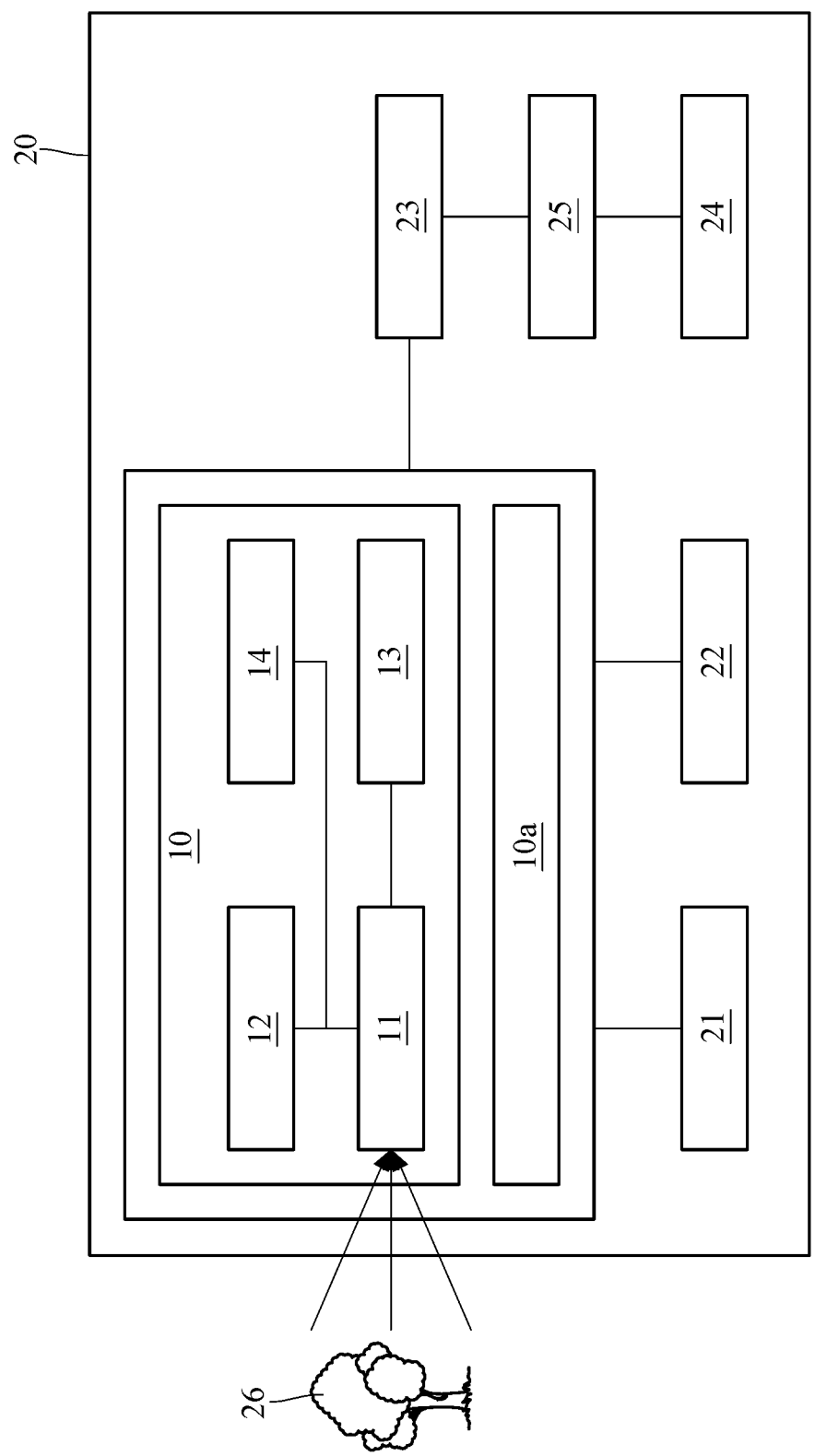
FIG. 28 is a block diagram of the electronic device in FIG. 26.

FIG. 26 is one perspective view of an electronic device according to the 14th embodiment of the present disclosure. FIG. 27 is another perspective view of the electronic device in FIG. 26. FIG. 28 is a block diagram of the electronic device in FIG. 26.

In this embodiment, an electronic device 20 is a smartphone including the image capturing unit 10 disclosed in the 13th embodiment, an image capturing unit 10a, an image capturing unit 10b, an image capturing unit 10c, an image capturing unit 10d, a flash module 21, a focus assist module 22, an image signal processor 23, a user interface 24 and an image software processor 25. The image capturing unit 10 and the image capturing unit 10a are disposed on the same side of the electronic device 20 and each of the image capturing units 10 and 10a has a single focal point. The image capturing unit 10b, the image capturing unit 10c, the image capturing unit 10d and the user interface 24 are disposed on the opposite side of the electronic device 20 and the user interface 24 is a display unit, such that the image capturing units 10b, 10c, 10d can be front-facing cameras of the electronic device 20 for taking selfies, but the present disclosure is not limited thereto. Furthermore, each of the image capturing units 10a, 10b, 10c and 10d has a configuration similar to that of the image capturing unit 10. In detail, each of the image capturing units 10a, 10b, 10c and 10d includes a lens unit, a driving device, an image sensor and an image stabilizer, and each of the lens unit includes an optical lens assembly, a barrel and a holder member for holding the optical lens assembly.

The image capturing unit 10 is a wide-angle image capturing unit, the image capturing unit 10a is an ultra-wide-angle image capturing unit, the image capturing unit 10b is a wide-angle image capturing unit, the image capturing unit 10c is an ultra-wide-angle image capturing unit, and the image capturing unit 10d is a ToF (time of flight) image capturing unit. In this embodiment, the image capturing units 10 and 10a have different fields of view. Moreover, a maximum field of view of the image capturing unit 10 and a maximum field of view of the image capturing unit 10a can differ by at least 20 degrees. Therefore, the electronic device 20 is favorable for capturing image details in various ranges so as to meet the requirement of various scenarios. In addition, the image capturing unit 10d can determine depth information of the imaged object. In this embodiment, the electronic device 20 includes multiple image capturing units 10, 10a, 10b, 10c and 10d, but the present disclosure is not limited to the number and arrangement of image capturing units.

When a user captures images of an object 26, the light rays converge in the image capturing unit 10 or the image capturing unit 10a to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the light rays may converge in the image capturing unit 10b, 10c or 10d to generate an image(s). The user interface 24 can be a touch screen or a physical button. The user is able to interact with the user interface 24 and the image software processor 25 having multiple functions to capture images and complete image processing. The image processed by the image software processor 25 can be displayed on the user interface 24.

15th Embodiment

Figure 29:
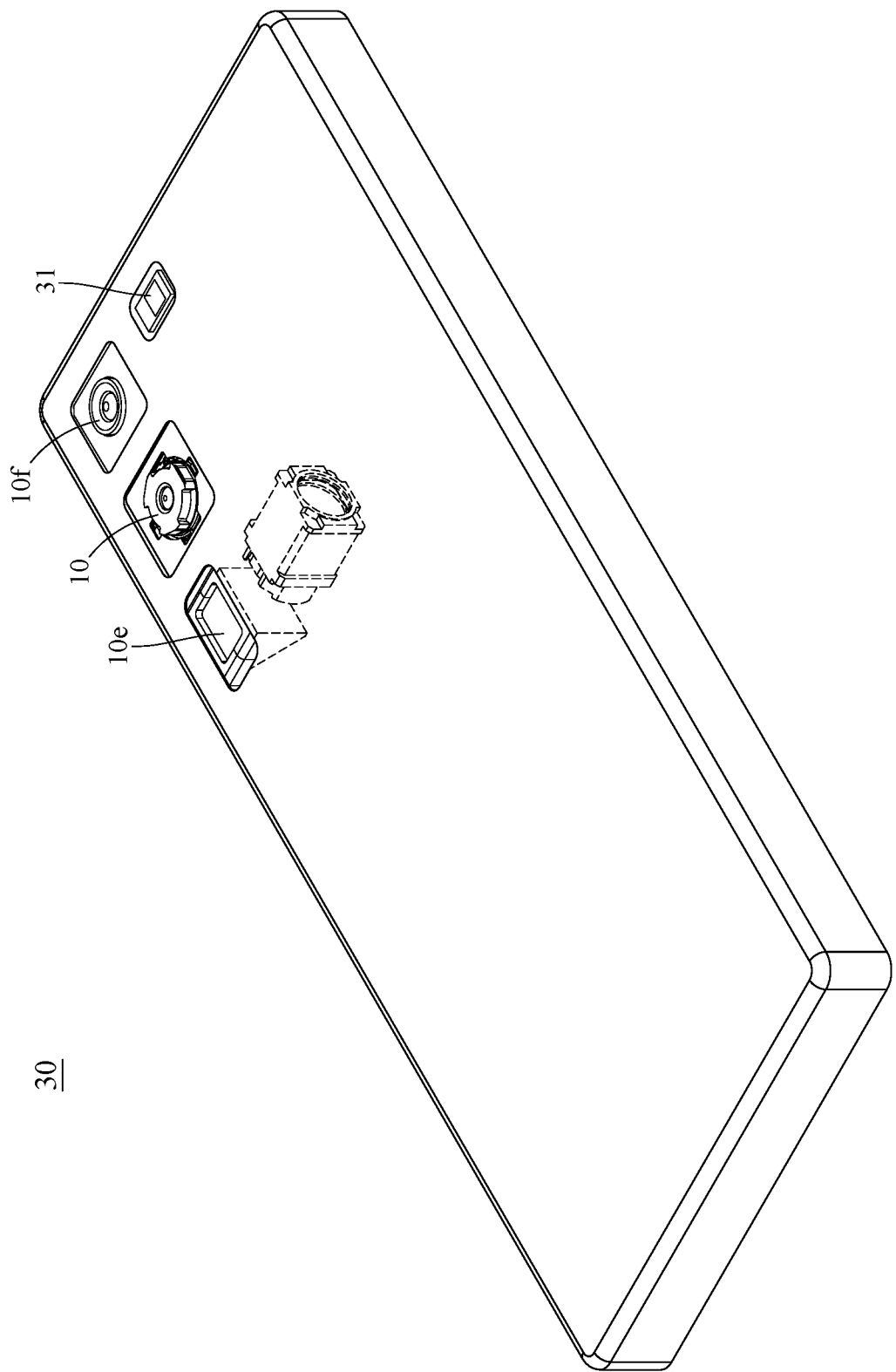
FIG. 29 is one perspective view of an electronic device according to the 15th embodiment of the present disclosure.

FIG. 29 is one perspective view of an electronic device according to the 15th embodiment of the present disclosure.

In this embodiment, an electronic device 30 is a smartphone including the image capturing unit 10 disclosed in the 13th embodiment, an image capturing unit 10e, an image capturing unit 10f, a flash module 31, a focus assist module, an image signal processor, a display unit and an image software processor (not shown). The image capturing unit 10, the image capturing unit 10e and the image capturing unit 10f are disposed on the same side of the electronic device 30, while the display unit is disposed on the opposite side of the electronic device 30. Furthermore, each of the image capturing units 10e and 10f has a configuration similar to that of the image capturing unit 10, so the details in this regard will not be provided again.

The image capturing unit 10 is a wide-angle image capturing unit, the image capturing unit 10e is a telephoto image capturing unit, and the image capturing unit 10f is an ultra-wide-angle image capturing unit. In this embodiment, the image capturing units 10, 10e and 10f have different fields of view. Moreover, half of the maximum field of view of the image capturing unit 10 can be larger than 35 degrees, and half of a maximum field of view of the image capturing unit 10e can be smaller than 25 degrees. That is, the maximum field of view of the image capturing unit 10 and the maximum field of view of the image capturing unit 10e can differ by at least 20 degrees. Moreover, the maximum field of view of the image capturing unit 10 and a maximum field of view of the image capturing unit 10f can also differ by at least 20 degrees. Therefore, it is favorable for effectively controlling the field of view of the image capturing unit 10e or 10f, such that the image capturing unit 10e or 10f has a proper imaging range so as to achieve more various applications and thus the electronic device 30 has various magnification ratios so as to meet the requirement of optical zoom functionality. Moreover, half of the maximum field of view of the image capturing unit 10e can also be smaller than 18 degrees. Therefore, the electronic device 30 is favorable for having camera modules with different functions so as to provide users with diverse photographing applications. Moreover, the image capturing unit 10e can be a telephoto image capturing unit having a reflector configuration. Therefore, it is favorable for adjusting the direction of optical axis, such that the total track length of the image capturing unit 10e is not limited by the thickness of the electronic device 30. Moreover, the reflector configuration of the image capturing unit 10e can be similar to, for example, one of the structures shown in FIG. 32 to FIG. 36 which can be referred to foregoing descriptions corresponding to FIG. 32 to FIG. 36 so the details in this regard will not be provided again. It is noted that when the reflector configuration of the image capturing unit 10e is similar to, for example, one of the structures shown in FIG. 34 to FIG. 36, the number of the reflectors is plural. Therefore, it is favorable for adjusting the direction of optical axis, such that the accommodating space of the image capturing unit 10e can be more effectively utilized. In this embodiment, the electronic device 30 includes multiple image capturing units 10, 10e and 10f, but the present disclosure is not limited to the number and arrangement of image capturing units. When a user captures images of an object, light rays converge in the image capturing unit 10, 10e or 10f to generate images, and the flash module 31 is activated for light supplement. Further, the subsequent processes are performed in a manner similar to the abovementioned embodiment, so the details in this regard will not be provided again.

16th Embodiment

Figure 30:
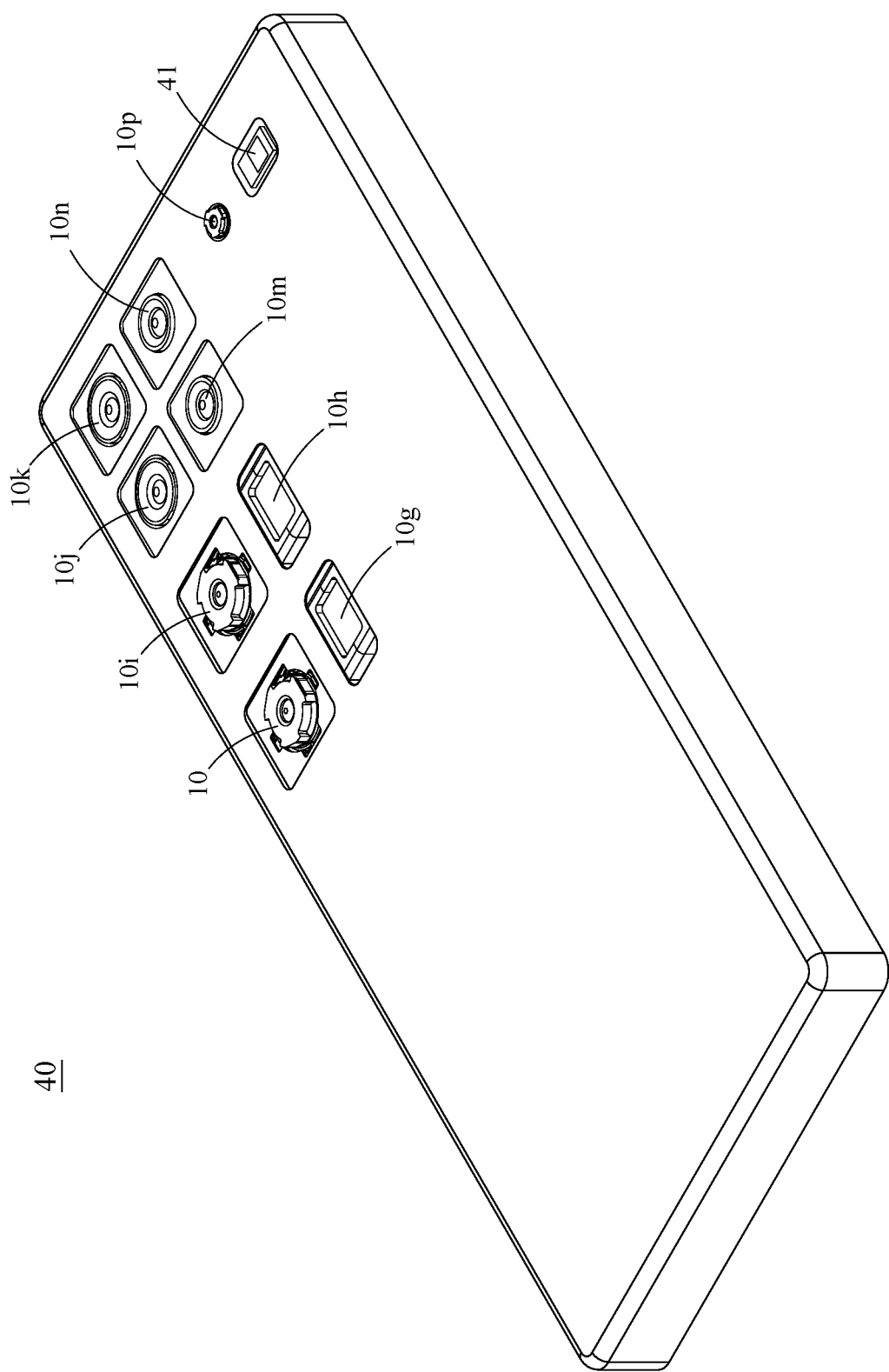
FIG. 30 is one perspective view of an electronic device according to the 16th embodiment of the present disclosure.

FIG. 30 is one perspective view of an electronic device according to the 16th embodiment of the present disclosure.

In this embodiment, an electronic device 40 is a smartphone including the image capturing unit 10 disclosed in the 13th embodiment, an image capturing unit 10g, an image capturing unit 10h, an image capturing unit 10i, an image capturing unit 10j, an image capturing unit 10k, an image capturing unit 10m, an image capturing unit 10n, an image capturing unit 10p, a flash module 41, a focus assist module, an image signal processor, a display unit and an image software processor (not shown). The image capturing unit 10, 10g, 10h, 10i, 10j, 10k, 10m, 10n and 10p are disposed on the same side of the electronic device 40, while the display unit is disposed on the opposite side of the electronic device 40. Furthermore, each of the image capturing units 10g, 10h, 10i, 10j, 10k, 10m, 10n and 10p has a configuration similar to that of the image capturing unit 10, so the details in this regard will not be provided again.

The image capturing unit 10 is a wide-angle image capturing unit, the image capturing unit 10g is a telephoto image capturing unit, the image capturing unit 10h is a telephoto image capturing unit, the image capturing unit 10i is a wide-angle image capturing unit, the image capturing unit 10j is an ultra-wide-angle image capturing unit, the image capturing unit 10k is an ultra-wide-angle image capturing unit, the image capturing unit 10m is a telephoto image capturing unit, the image capturing unit 10n is a telephoto image capturing unit, and the image capturing unit 10p is a ToF image capturing unit. In this embodiment, the image capturing units 10, 10g, 10h, 10m and 10n have different fields of view. Moreover, half of the maximum field of view of the image capturing unit 10 can be larger than 35 degrees, and half of a maximum field of view of the image capturing unit 10g, 10h, 10m or 10n can be smaller than 25 degrees. That is, the maximum field of view of the image capturing unit 10 and the maximum field of view of the image capturing unit 10g, 10h, 10m or 10n can differ by at least 20 degrees, such that the electronic device 40 has various magnification ratios so as to meet the requirement of optical zoom functionality. Moreover, half of the maximum field of view of the image capturing unit 10g or 10h can also be smaller than 18 degrees. Moreover, each of the image capturing units 10g and 10h can be a telephoto image capturing unit having a reflector configuration. Moreover, the reflector configuration of each of the image capturing unit 10g and 10h can be similar to, for example, one of the structures shown in FIG. 32 to FIG. 36 which can be referred to foregoing descriptions corresponding to FIG. 32 to FIG. 36 so the details in this regard will not be provided again. In addition, the image capturing unit 10p can determine depth information of the imaged object. In this embodiment, the electronic device 40 includes multiple image capturing units 10, 10g, 10h, 10i, 10j, 10k, 10m, 10n and 10p, but the present disclosure is not limited to the number and arrangement of image capturing units. When a user captures images of an object, the light rays converge in the image capturing unit 10, 10g, 10h, 10i, 10j, 10k, 10m, 10n or 10p to generate an image(s), and the flash module 41 is activated for light supplement. Further, the subsequent processes are performed in a manner similar to the abovementioned embodiments, so the details in this regard will not be provided again.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging optical lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising nine lens elements, the nine lens elements being, in order from an object side to an image side along an optical path, a first lens element, a second lens element, a third lens element, a fourth lens element, a fifth lens element, a sixth lens element, a seventh lens element, an eighth lens element and a ninth lens element, each of the nine lens elements having an object-side surface facing toward the object side and an image-side surface facing toward the image side, and a total number of lens elements in the imaging optical lens assembly is nine;

wherein the first lens element has positive refractive power, the second lens element has negative refractive power, the image-side surface of the third lens element is concave in a paraxial region thereof, the object-side surface of the seventh lens element is convex in a paraxial region thereof, and the image-side surface of the ninth lens element is concave in a paraxial region thereof and has at least one inflection point;

wherein a curvature radius of the object-side surface of the ninth lens element is R17, a curvature radius of the image-side surface of the ninth lens element is R18, an axial distance between the object-side surface of the first lens element and an image surface is TL, and a maximum image height of the imaging optical lens assembly is ImgH, and the following conditions are satisfied:

$-0.90 < (R17+R18)/(R17-R18) < 2.50$; and $0.90 < TL/ImgH < 1.35$.

2. The imaging optical lens assembly of claim 1, wherein the object-side surface of the second lens element is convex in a paraxial region thereof, the image-side surface of the second lens element is concave in a paraxial region thereof, and at least four lens elements of the imaging optical lens assembly are made of plastic material.

3. The imaging optical lens assembly of claim 1, wherein the image-side surface of the eighth lens element is concave in a paraxial region thereof and has at least two inflection points, and the image-side surface of the ninth lens element has at least two inflection points.

4. The imaging optical lens assembly of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, a refractive index of the i-th lens element is Ni, a minimum value of Vi/Ni is (Vi/Ni)min, and the following condition is satisfied:

$7.0 < (Vi/Ni)min < 11.80$, wherein $i=1,2,3,4,5,6,7,8$ or $9$.

5. The imaging optical lens assembly of claim 1, wherein an Abbe number of the sixth lens element is V6, an Abbe number of the seventh lens element is V7, and the following conditions are satisfied:

$10.0 < V6 < 40.0$; and $10.0 < V7 < 40.0$.

6. The imaging optical lens assembly of claim 1, wherein at least one lens surface of each of at least three lens elements of the imaging optical lens assembly has at least one inflection point;

wherein a focal length of the imaging optical lens assembly is f, a focal length of the eighth lens element is f8, and the following condition is satisfied:

$0.65 < f/f8 < 1.50$.

7. The imaging optical lens assembly of claim 1, wherein the curvature radius of the object-side surface of the ninth lens element is R17, the curvature radius of the image-side surface of the ninth lens element is R18, and the following condition is satisfied:

$-0.50 < (R17+R18)/(R17-R18) < 1.50$.

8. The imaging optical lens assembly of claim 1, wherein the curvature radius of the object-side surface of the ninth lens element is R17, the curvature radius of the image-side surface of the ninth lens element is R18, and the following condition is satisfied:

$0.25 < |R17/R18| < 2.50$.

9. The imaging optical lens assembly of claim 1, wherein the maximum image height of the imaging optical lens assembly is ImgH, an axial distance between the image-side surface of the ninth lens element and an image surface is BL, a focal length of the imaging optical lens assembly is f, a focal length of the first lens element is f1, and the following conditions are satisfied:

$5.0 < ImgH/BL < 20.0$; and $0.40 < f/f1 < 3.80$.

10. The imaging optical lens assembly of claim 1, wherein a maximum effective radius of the object-side surface of the third lens element is Y31, a maximum effective radius of the image-side surface of the ninth lens element is Y92, and the following condition is satisfied:

$2.80 < Y92/Y31 < 4.50$.

11. The imaging optical lens assembly of claim 2, wherein the object-side surface of the first lens element is convex in a paraxial region thereof, and the image-side surface of the eighth lens element is concave in a paraxial region thereof;

wherein an Abbe number of the first lens element is V1, an Abbe number of the second lens element is V2, an Abbe number of the third lens element is V3, an entrance pupil diameter of the imaging optical lens assembly is EPD, an axial distance between the image-side surface of the ninth lens element and an image surface is BL, and the following conditions are satisfied:

$0.10 < (V2+V3)/V1 < 0.90$; and $3.2 < EPD/BL < 18.0$.

12. The imaging optical lens assembly of claim 4, wherein a vertical distance between a non-axial critical point on the image-side surface of the seventh lens element and an optical axis is Yc72, a vertical distance between a non-axial critical point on the image-side surface of the eighth lens element and the optical axis is Yc82, a vertical distance between a non-axial critical point on the image-side surface of the ninth lens element and the optical axis is Yc92, a focal length of the imaging optical lens assembly is f, and the following conditions are satisfied:

$$0.02<Yc72/f<0.80;$$

$$0.02<Yc82/f<0.80; \text{ and}$$

$$0.02<Yc92/f<0.80.$$

13. An image capturing unit, comprising:
the imaging optical lens assembly of claim 1; and
an image sensor disposed on an image surface of the imaging optical lens assembly and having 40 million pixels or more.

14. An electronic device, comprising at least two image capturing units disposed on a same side of the electronic device, and the at least two image capturing units comprising:
a first image capturing unit, comprising the imaging optical lens assembly of claim 1 and an image sensor disposed on an image surface of the imaging optical lens assembly; and
a second image capturing unit, comprising an optical lens assembly and an image sensor disposed on an image surface of the optical lens assembly;
wherein a maximum field of view of the first image capturing unit and a maximum field of view of the second image capturing unit differ by at least 20 degrees.

15. An imaging optical lens assembly comprising nine lens elements, the nine lens elements being, in order from an object side to an image side along an optical path, a first lens element, a second lens element, a third lens element, a fourth lens element, a fifth lens element, a sixth lens element, a seventh lens element, an eighth lens element and a ninth lens element, each of the nine lens elements having an object-side surface facing toward the object side and an image-side surface facing toward the image side, and a total number of lens elements in the imaging optical lens assembly is nine;
wherein the first lens element has positive refractive power, the ninth lens element has negative refractive power, the object-side surface of the ninth lens element is concave in a paraxial region thereof, and the image-side surface of the ninth lens element is concave in a paraxial region thereof and has at least one inflection point;
wherein a curvature radius of the object-side surface of the ninth lens element is R17, a curvature radius of the image-side surface of the ninth lens element is R18, a maximum value among central thicknesses of all lens elements of the imaging optical lens assembly is CTmax, a minimum value among central thicknesses of all lens elements of the imaging optical lens assembly is CTmin, and the following conditions are satisfied:

$$-0.70<(R17+R18)/(R17-R18)<0.43; \text{ and}$$

$$1.0<CTmax/CTmin<6.0.$$

16. The imaging optical lens assembly of claim 15, wherein the sixth lens element has negative refractive power, the object-side surface of the seventh lens element is convex in a paraxial region thereof, and the image-side surface of the seventh lens element is concave in a paraxial region thereof.

17. The imaging optical lens assembly of claim 15, wherein the eighth lens element has positive refractive power, the object-side surface of the eighth lens element is convex in a paraxial region thereof, and the image-side surface of the eighth lens element is concave in a paraxial region thereof.

18. The imaging optical lens assembly of claim 15, wherein each of at least four lens elements of the imaging optical lens assembly has an Abbe number smaller than 40.0;
wherein an axial distance between the image-side surface of the ninth lens element and an image surface is BL, an axial distance between the object-side surface of the first lens element and the image-side surface of the ninth lens element is TD, and the following condition is satisfied:

$$0<BL/TD<0.25.$$

19. The imaging optical lens assembly of claim 15, wherein a focal length of the imaging optical lens assembly is f, an entrance pupil diameter of the imaging optical lens assembly is EPD, a minimum value among Abbe numbers of all lens elements of the imaging optical lens assembly is Vmin, and the following conditions are satisfied:

$$0.80<f/EPD<2.0; \text{ and}$$

$$8.0<V\text{min}<20.0.$$

20. The imaging optical lens assembly of claim 15, wherein a sum of axial distances between each of all adjacent lens elements of the imaging optical lens assembly is EAT, an axial distance between the second lens element and the third lens element is T23, an axial distance between the eighth lens element and the ninth lens element is T89, and the following condition is satisfied:

$$1.20<\Sigma AT/(T23+T89)<2.50.$$

21. The imaging optical lens assembly of claim 15, wherein a refractive power of one lens element is a ratio of a focal length of the imaging optical lens assembly to a focal length of the said lens element, a refractive power of the first lens element is P1, a refractive power of the second lens element is P2, a refractive power of the third lens element is P3, a refractive power of the fourth lens element is P4, a refractive power of the fifth lens element is P5, a refractive power of the sixth lens element is P6, a refractive power of the seventh lens element is P7, a refractive power of the eighth lens element is P8, a refractive power of the ninth lens element is P9, and the following condition is satisfied:

$$0.10<(|P2|+|P3|+|P4|+|P5|+|P6|+|P7|)/(|P1|+|P8|+|P9|)<1.0.$$

22. An imaging optical lens assembly comprising three lens groups, the three lens groups being, in order from an object side to an image side along an optical path, a first lens group, a second lens group and a third lens group, the first lens group comprising three lens elements, the second lens group comprising three lens elements, the third lens group comprising three lens elements, and each of all lens elements of the imaging optical lens assembly having an object-side surface facing toward the object side and an image-side surface facing toward the image side;
wherein the three lens elements of the first lens group comprise a first lens element located closest to the object side and a second lens element located adjacent to the first lens element on an image side of the first lens element, the first lens element has positive refractive power, the second lens element has negative refractive power, and there is no intervening element between the first lens element and the second lens element;

wherein at least one lens surface of at least one lens element of the second lens group has at least one inflection point;

wherein the three lens elements of the third lens group comprise a front-side lens element located closest to the second lens group and a last lens element located closest to the image side, the image-side surface of the front-side lens element is concave in a paraxial region thereof, and the image-side surface of the last lens element is concave in a paraxial region thereof and has at least one inflection point;

wherein the imaging optical lens assembly further comprising an aperture stop, in addition to the required three lenses the third lens group further comprises an air lens element located between the last lens element and a lens element located adjacent to the last lens element on an object side of the last lens element, a curvature radius of an object-side surface of the air lens element is Rao, a curvature radius of an image-side surface of the air lens element is Rai, an axial distance between the aperture stop and an image surface is SL, an axial distance between the object-side surface of the first lens element and the image surface is TL, and the following conditions are satisfied:

$-25.0 < (Rao+Rai)/(Rao-Rai) < 10.0$; and $0.73 < SL/TL < 0.95$.

23. The imaging optical lens assembly of claim 22, wherein a focal length of the imaging optical lens assembly is f, an entrance pupil diameter of the imaging optical lens assembly is EPD, a maximum value among refractive indices of all lens elements of the imaging optical lens assembly is Nmax, and the following conditions are satisfied:

$0.80 < f/EPD < 2.0$; and $1.66 < Nmax < 1.78$.

24. The imaging optical lens assembly of claim 22, wherein each of at least four lens elements of the imaging optical lens assembly has an Abbe number smaller than 40.0; wherein a maximum image height of the imaging optical lens assembly is ImgH, and the following condition is satisfied:

$4.50 \text{ [mm]} < ImgH < 10.0 \text{ [mm]}$.

25. The imaging optical lens assembly of claim 22, wherein an axial distance between the object-side surface of the first lens element and the image-side surface of the last lens element is TD, an axial distance between the image-side surface of the last lens element and an image surface is BL, a maximum image height of the imaging optical lens assembly is ImgH, and the following condition is satisfied:

$0.05 < (TD \times BL)/(ImgH \times ImgH) < 0.30$.

26. The imaging optical lens assembly of claim 22, wherein an Abbe number of one lens element of the imaging optical lens assembly is Vi, a refractive index of the said lens element is Ni, a minimum value of Vi/Ni is (Vi/Ni)min, and at least one lens element of the imaging optical lens assembly satisfies the following condition:

$7.0 < (Vi/Ni)min < 11.80$;

wherein the axial distance between the object-side surface of the first lens element and the image surface is TL, and the following condition is satisfied:

$4.0 \text{ [mm]} < TL < 10.0 \text{ [mm]}$.

27. The imaging optical lens assembly of claim 22, wherein a sum of central thicknesses of all lens elements of the imaging optical lens assembly is ΣCT, a sum of axial distances between each of all adjacent lens elements of the imaging optical lens assembly is ΣAT, the axial distance between the object-side surface of the first lens element and the image surface is TL, a focal length of the imaging optical lens assembly is f, and the following conditions are satisfied:

$1.20 < \Sigma CT/\Sigma AT < 2.0$;

$0.80 < TL/f < 1.30$.

28. The imaging optical lens assembly of claim 22, wherein the curvature radius of the object-side surface of the air lens element is Rao, the curvature radius of the image-side surface of the air lens element is Rai, and the following condition is satisfied:

$-15.0 < (Rao+Rai)/(Rao-Rai) < 0.50$.

29. The imaging optical lens assembly of claim 22, wherein a focal length of the imaging optical lens assembly is f, a curvature radius of an object-side surface of one lens element of the imaging optical lens assembly is Ro, a curvature radius of an image-side surface of the said lens element is Ri, and at least one lens element of the imaging optical lens assembly satisfies the following condition:

$|f/Ro|+|f/Ri| < 0.50$.

30. The imaging optical lens assembly of claim 22, wherein a maximum image height of the imaging optical lens assembly is ImgH, a maximum value among central thicknesses of all lens elements of the imaging optical lens assembly is CTmax, and the following condition is satisfied:

$5.0 < ImgH/CTmax < 15.0$.

31. The imaging optical lens assembly of claim 22, wherein the object-side surface of each of at least two lens elements of the first lens group is convex in a paraxial region thereof, the image-side surface of each of the at least two lens elements of the first lens group is concave in a paraxial region thereof, the object-side surface of each of at least two lens elements of the third lens group is convex in a paraxial region thereof, and the image-side surface of each of the at least two lens elements of the third lens group is concave in a paraxial region thereof.

* * * * *